(12) United States Patent
Sobol et al.

(10) Patent No.: US 12,375,366 B2
(45) Date of Patent: Jul. 29, 2025

(54) METHOD AND SYSTEM FOR CONNECTIVITY AND CONTROL OF INDUSTRIAL EQUIPMENT USING A LOW POWER WIDE AREA NETWORK

(71) Applicant: CareBand Inc., Chicago, IL (US)

(72) Inventors: Adam G. Sobol, Dayton, OH (US); Paul Sheldon, Arlington Heights, IL (US); Harish Natarahjan, Hoffman Estates, IL (US); Joseph T. Kreidler, Arlington Heights, IL (US); Brian A. Donlin, Chicago, IL (US); Jon G. Ledwith, Palatine, IL (US); Patrick J. McVey, Wheeling, IL (US); Ross D. Moore, Winnetka, IL (US); Peter Nanni, Algonquin, IL (US); Dwayne D. Forsyth, Deer Park, IL (US); Todd Sobol, Dayton, OH (US); John D. Reed, Dayton, OH (US); Reid B. Erekson, Arlington Heights, IL (US); Sam H. Viesca, Lafayette, CO (US)

(73) Assignee: Careband Inc., Chicago, IL (US)

(*) Notice: Subject to any disclaimer, the term of this patent is extended or adjusted under 35 U.S.C. 154(b) by 467 days.

(21) Appl. No.: 17/975,208

(22) Filed: Oct. 27, 2022

(65) Prior Publication Data

US 2023/0046739 A1    Feb. 16, 2023

Related U.S. Application Data

(63) Continuation-in-part of application No. 17/236,358, filed on Apr. 21, 2021, now Pat. No. 11,503,434.
(Continued)

(51) Int. Cl.
*H04L 41/16*    (2022.01)

(52) U.S. Cl.
CPC .................................. *H04L 41/16* (2013.01)

(58) Field of Classification Search
CPC ....................................................... H04L 41/16
(Continued)

(56) References Cited

U.S. PATENT DOCUMENTS 8,903,416 B1 * 12/2014 Perkins .................. H04L 67/12
340/572.1
9,652,955 B1 * 5/2017 Ray ....................... H04W 4/023
(Continued)

*Primary Examiner* — April G Gonzales
(74) *Attorney, Agent, or Firm* — John D. Reed

(57) ABSTRACT

A personal area network that includes a wearable electronic device, a system and methods of using the personal area network that includes a wearable electronic device. The wearable electronic device can act as an aggregator of the data that is being acquired by the one or more sensors and from other devices that are within wireless signal range of the personal area network in order to send some or all of the data over a wireless low power wide area network to remote locations within a larger network for subsequent processing, user notification, analysis of location-determination, contact tracing or the like. Data may flow in a bidirectional manner between the wearable electronic device and at least some of the other devices within the personal area network. In one form, the aggregated data may be used to provide information related to one or more operational parameters of an industrial asset and, if necessary, take control-based action in order to adjust one or more such operational parameters. In one form, a communication network formed by the wearable electronic device is used within an industrial setting in order to perform such data acquisition, processing and related control.

21 Claims, 20 Drawing Sheets

Related U.S. Application Data

(60) Provisional application No. 63/101,273, filed on Apr. 22, 2020.

(58) Field of Classification Search
USPC .......................................................... 455/41.2
See application file for complete search history.

(56) References Cited

U.S. PATENT DOCUMENTS

| | | | |
|---|---|---|---|
| 9,722,803 B1* | 8/2017 | Ellingson | H04L 9/30 |
| 9,928,359 B1* | 3/2018 | Vargas | G06F 21/78 |
| 10,244,392 B2 | 3/2019 | Caracas et al. | |
| 10,335,060 B1* | 7/2019 | Kahn | A61B 5/7246 |
| 10,341,343 B2 | 7/2019 | Bauer et al. | |
| 10,532,266 B2* | 1/2020 | Genova | H04W 4/21 |
| 11,070,467 B1 | 7/2021 | Shukla | |
| 11,147,459 B2* | 10/2021 | Sobol | A61B 5/0002 |
| 11,162,983 B2 | 11/2021 | Bolouri-Saransar | |
| 11,215,646 B2 | 1/2022 | Balid et al. | |
| 11,978,555 B2* | 5/2024 | Sobol | G16H 50/30 |
| 2007/0287923 A1* | 12/2007 | Adkins | A61B 5/02438 |
| | | | 600/485 |
| 2011/0234397 A1* | 9/2011 | Fetzer | G08B 25/016 |
| | | | 340/539.13 |
| 2011/0245633 A1* | 10/2011 | Goldberg | A61B 5/165 |
| | | | 600/323 |
| 2015/0143125 A1* | 5/2015 | Nix | H04L 9/0861 |
| | | | 713/171 |
| 2015/0244699 A1* | 8/2015 | Hessler | H04W 12/062 |
| | | | 726/7 |
| 2015/0334554 A1 | 11/2015 | Song et al. | |
| 2015/0350857 A1* | 12/2015 | Lim | H04W 4/80 |
| | | | 455/41.2 |
| 2016/0018278 A1* | 1/2016 | Jeter, II | G16H 40/63 |
| | | | 340/665 |
| 2016/0139273 A1* | 5/2016 | Sobol | A61B 5/1112 |
| | | | 342/357.52 |
| 2016/0142868 A1* | 5/2016 | Kulkarni | H04W 4/80 |
| | | | 455/456.5 |
| 2016/0173359 A1* | 6/2016 | Brenner | A61B 5/02438 |
| | | | 709/224 |
| 2016/0174022 A1 | 6/2016 | Nhu | |
| 2016/0270126 A1* | 9/2016 | Adams | H04W 76/50 |
| 2016/0294828 A1* | 10/2016 | Zakaria | H04L 63/0876 |
| 2016/0314255 A1* | 10/2016 | Cook | G06F 16/906 |
| 2017/0006003 A1 | 1/2017 | Zakaria et al. | |
| 2017/0006595 A1* | 1/2017 | Zakaria | H04L 67/025 |
| 2017/0006606 A1 | 1/2017 | Matsuo et al. | |
| 2017/0013569 A1* | 1/2017 | Braxton | G08B 21/0263 |
| 2017/0017822 A1* | 1/2017 | Zimmerman | G06K 7/1452 |
| 2017/0053267 A1* | 2/2017 | Abel | G06Q 20/4018 |
| 2017/0109656 A1* | 4/2017 | Cook | G06N 5/02 |
| 2017/0134171 A1* | 5/2017 | Woxland | H04W 12/086 |
| 2017/0163685 A1* | 6/2017 | Schwartz | H04W 12/088 |
| 2017/0173262 A1* | 6/2017 | Veltz | G16H 20/17 |
| 2017/0193787 A1* | 7/2017 | Devdas | G08B 25/005 |
| 2017/0202484 A1* | 7/2017 | Al-Shaery | A61B 5/08 |
| 2017/0208426 A1* | 7/2017 | Komoni | H04W 4/80 |
| 2017/0237719 A1* | 8/2017 | Schwartz | G06F 21/602 |
| | | | 713/153 |
| 2017/0272842 A1 | 9/2017 | Touma et al. | |
| 2018/0001184 A1* | 1/2018 | Tran | G16H 50/20 |
| 2018/0014150 A1 | 1/2018 | Elias | |
| 2018/0042513 A1* | 2/2018 | Connor | A61B 5/369 |
| 2018/0085058 A1* | 3/2018 | Chakravarthi | G16H 40/67 |
| 2018/0160907 A1* | 6/2018 | Verma | G06Q 50/22 |
| 2018/0168464 A1* | 6/2018 | Barnett, Jr. | A61B 5/6861 |
| 2018/0247713 A1* | 8/2018 | Rothman | A61B 5/02055 |
| 2018/0330293 A1* | 11/2018 | Kulkarni | G06K 7/10366 |
| 2018/0332434 A1* | 11/2018 | Kulkarni | H04W 4/35 |
| 2018/0375849 A1* | 12/2018 | Koskimies | H04L 9/3234 |
| 2019/0057189 A1* | 2/2019 | Frederickson | G08B 21/043 |
| 2019/0147721 A1* | 5/2019 | Avitan | G06F 1/3209 |
| | | | 340/573.1 |
| 2019/0150134 A1* | 5/2019 | Kakinada | H04W 16/14 |
| | | | 370/330 |
| 2019/0197864 A1 | 6/2019 | Hui et al. | |
| 2019/0208363 A1 | 7/2019 | Shapiro | |
| 2019/0312752 A1 | 10/2019 | Nogueira-Nine et al. | |
| 2019/0349426 A1 | 11/2019 | Smith et al. | |
| 2020/0178906 A1* | 6/2020 | Bevan | A61B 5/02055 |
| 2020/0268261 A1* | 8/2020 | Ikegami | H04W 4/70 |
| 2022/0080235 A1* | 3/2022 | Sobol | A62C 3/0214 |
| 2022/0120790 A1 | 4/2022 | Balid et al. | |

\* cited by examiner

CONTACT REPORT

CASE: ANN
COVID-19 STATUS: CONFIRMED
DATE OF THE SYMPTOM ONSET: JUNE 5
EXPECTED INFECTIOUS PERIOD: JUNE 3 – ONGOING

| CONTACT | CONTACT DATE(S) | CONTACT TYPE | AVG DAILY CONTACTS | AGE RANGE | OTHER RISK FACTORS |
|---|---|---|---|---|---|
| CHARLY | JUNE 5<br>JUNE 3 | CLOSE PROXIMATE | 3 | 65-74 | NO |
| BETTY | JUNE 5 | DIRECT | 4 | 75-84 | YES |
| ALFRED | JUNE 4 | PROXIMATE | 3 | 75-84 | NO |
| ROSA | JUNE 4<br>JUNE 2 | CLOSE | 11 | <65 | NO |

FIG. 8

METHOD AND SYSTEM FOR CONNECTIVITY AND CONTROL OF INDUSTRIAL EQUIPMENT USING A LOW POWER WIDE AREA NETWORK

CROSS REFERENCE TO RELATED APPLICATIONS

This application claims priority to and is a continuation-in-part of pending U.S. patent application Ser. No. 17/236,358 that was filed on Apr. 21, 2021 that in turn claims priority to U.S. Provisional Application Ser. No. 63/101,273 that was filed on Apr. 22, 2020.

The present disclosure relates generally to a wearable electronic device and corresponding personal area network (PAN) for monitoring data pertaining to and received by a wearer of the device, and more particularly to a PAN where the wearable electronic device automatically and wirelessly communicates such data to a larger network through low power wide area network (LPWAN) connectivity to provide location-based safety and health solutions.

BACKGROUND

The relatively recent emergence of the Internet of Things (IoT) has made it possible for sensor-based devices to collect unprecedented amounts of data. Unfortunately, traditional telecommunication architectures such as a cellular one using a smartphone—sometimes in conjunction with a shorter-range network and protocols such as a local area network (LAN) that may include Bluetooth (including its low-energy (BLE) variant), radar-based or WiFi or related networks based on ANT™, Infrared Data Association (IrDA), radio-frequency identification (RFID), Zigbee, Z-Wave or the like—are not capable of acting as an intermediary for promptly and efficiently offloading the generated data to a remote location where the information contained within the data may be put to use. For example, data collected from endpoint IoT devices often requires long-range transmission capability while also being power-limited. While some of the aforementioned protocols may meet a limited number of power requirements, they are incapable of long-range (that is to say, a kilometer or more) signal transmission. Similarly, cellular-based protocols may satisfy long-range requirements, but their high power consumption make them prohibitive for devices that need long battery life. As such, without a significant redesign and rebuild of the hardware, issues such as cost, security, battery power, bandwidth utilization or the like may hamper the ability of IoT-compatible devices to connect to an end user of the collected data through these limiting intermediaries on their way to an internet protocol (IP)-based network. Moreover, in cases where these devices are being used in medical or related health-care situations, they may have already been subjected to rigorous FDA medical device approval and clearance in their current embodiments. At least in these situations, it may be difficult, expensive and time-consuming to repurpose the devices to be able to serve populations of people using them, particularly for such people who may have neither ready access nor inclination to connect via LAN, cellular or other traditional telecommunication architectures.

A PAN allows communication between a larger network (such as the internet) and one or more end user devices. The PAN needs a way to get the data that is coming from these devices to the larger network and that may use or otherwise manage the data, including storage, cleansing, training and inference for analysis and related end-use. Traditionally, such connection necessitates additional infrastructure within the PAN in the form of high-bandwidth, comprehensive communication protocols. These protocols typically leverage licensed parts of the spectrum through an extensive array of wired or hybrid networks, including those associated with a public switched telephone network (PSTN) or mobile wireless network such as those that operate under the $3^{rd}$ Generation Partnership Project (3GPP) and their related standards such as Long-Term Evolution (LTE) or the Global System for Mobile Communications (GSM). The corresponding additional cost and complexity associated with such infrastructure is in many cases prohibitively expensive and inconvenient for the user of the PAN.

Contact tracing is the process of identifying individuals who may have been exposed to a contagious disease or related communicable agent, typically through another infected individual, animal or other source. A non-exhaustive list of such diseases includes tuberculosis, as well as vaccine-preventable infections such as measles, sexually transmitted infections, blood-born infections, some serious bacterial infections, viruses and novel infections such as the coronavirus that produces COVID-19, SARS-COV or the like. With contact tracing, once a person has been identified as having a confirmed case of a communicable disease, proximity information (which may be thought of as a subset of location information) may be gathered on other individuals who may have had sufficient interaction with the confirmed person so that these other individuals may in turn be monitored for signs or symptoms associated with infection of the disease Known approaches of determining the location of persons under a contact tracing analysis involve the use of conventional cellular-based devices and communication protocols similar to the aforementioned IoT and PAN scenarios. The challenges or limitations with such devices and approaches may include: the inability to get fine (that is to say, granular) indoor location information; the use of an active rather than passive process for the application software which in turn necessitates that it is always operational rather than merely residing in the background; and the consumption of significant amounts of battery power and the need for universally unique identifiers (UUIDs) in order for the receiving device to know which other broadcasting device to listen for, particularly if the other device does not intend on advertising to the public.

SUMMARY

With the foregoing in mind, the authors of the present disclosure have developed a PAN that may be used to collect data from nearby sensors or other devices and then wirelessly send the data to a larger network without having to rely upon cellular infrastructure as an intermediary telecommunication platform. Understanding that a sensor-enabled PAN needs a way to get the data that their sensors have collected to a remote location for subsequent management, storage or use of such data, the authors of the present disclosure discovered a simple low-cost communication network that allows wireless connectivity and data transfer between the PAN and the remote location using LPWAN as the intermediary.

The authors of the present disclosure have further developed the PAN to be a particularly efficacious way to perform real-time disease identification and propagation monitoring. By tracking the location of infected persons using the wearable electronic device PAN and LPWAN disclosed herein, significant reductions in disease spread may be achieved through one or more of interrupting ongoing transmission of the disease, alerting contacts to the possibility of infection, offering preventative counseling or prophylactic care, assisting in diagnosis, counseling and treatment to already-infected individuals to help prevent their reinfection, as well to learn about the epidemiology of a disease in a particular population. As such, in situations where time is of the essence, the devices, systems and methods disclosed herein for identifying contacts allow decision-makers to ensure that infected persons do not interact with others in order to reduce or eliminate further spread. In this way, a disease outbreak and spread may be traced quickly as a way to assist public health officials with more adequately addressing the spread of an infection, even in regions or areas that do not have significant existing communication infrastructure.

The PAN disclosed herein uses the wearable electronic device to act as a coordinator, reconfigurator or aggregator for various devices within a larger system in order to form an end-to-end approach to track and trace contacts, document outbreaks and manage cases, as well as to inform employers, visitors and staff (such as those associated with hospitals, senior living facilities or related businesses that provide health care and related services) for of a potential exposure. In another context, the PAN may be employed for other forms of socialization and measuring that operate in a manner analogous to contact tracing, such as for people-to-people, as well as for workplace scenarios such as people-to-staff or people-to-boss. Details associated with a comprehensive embodiment of such wearable electronic device and its associated LPWAN may be found in US Published Application 2019/0209022 entitled WEARABLE ELECTRONIC DEVICE AND SYSTEM FOR TRACKING LOCATION AND IDENTIFYING CHANGES IN SALIENT INDICATORS OF PATIENT HEALTH that corresponds to pending U.S. patent application Ser. No. 16/233, 462 that was filed on Dec. 27, 2018, is owned by the Assignee of the present disclosure and the entirety of which is incorporated herein by reference. In one form, the PAN and methods disclosed herein include some or all of the components and associated functionality associated with the wearable electronic device that is disclosed in US Published Application 2019/0209022.

In one form, the LPWAN is based on a LoRa chipset with its chirp spread-spectrum radio-frequency (RF) signal generation such that the devices and systems disclosed herein may utilize compatible stack protocols such as LoRaWAN (which is IEEE 802.15.4g-compliant) as a way to establish a PAN-to-IP network communication channel. More particularly, when viewed within the context of an IP suite conceptual model in general and the transmission control protocol (TCP) and the IP in particular, the LoRa chipset defines the physical layer (PHY) while LoRaWAN defines the Media Access Control (MAC) layer (as well as the network layer and other layers) to define the basic architecture for a full-stack protocol for use as the intermediary between the wearable electronic device and the end-use IP-based network. In this way, the PAN can leverage inexpensive sensors, beacons and associated components that are situated in nearby data-acquisition devices that are within the communication range of the PAN in order to aggregate the information contained within these other devices, yet take advantage of only requiring the single master (that is to say, source node) device to perform the downstream communication functions. In one form, nearby sensors that are on other devices that are within communication range of the PAN, as well as on-body sensors of the wearer, could send data to the master device for subsequent conveyance via LPWAN to the larger network. In this way, the PAN as disclosed herein may be used in conjunction with an individual or group of individuals to communicate and exchange data that in turn may be analyzed for determination of one or more characteristics of the person or people associated with the wearable device or devices.

By using a LoRa-based approach to communicating acquired data between the PAN and a wirelessly remote end-use application as disclosed herein, the authors of the present disclosure have found that certain expenses and infrastructural complexities associated with conventional high-bandwidth cellular-based approaches, including those that may use one or more of the LTE, GSM, code division multiple access (CDMA), time division multiple access (TDMA), Universal Mobile Telecommunications System (UMTS), General Packet Radio Service (GPRS), Voice over IP (VoIP) or the like, may be reduced or eliminated.

According to a first aspect of the present disclosure, a PAN that uses a wearable electronic device as a source node is disclosed. The wearable electronic device includes a wireless communication module configured to receive at least one incoming signal from a remote device, a non-transitory computer readable medium, a processor electrically coupled to the non-transitory computer readable medium and a set of machine codes stored in the non-transitory computer-readable medium and operated upon by the processor. The set of machine codes includes a machine code to cause the wireless communication module to receive from a mobile beacon of a one or more peripheral nodes that are within range of the PAN at least device identifier information that uniquely identifies the mobile beacon and associated peripheral node, and event data associated with the peripheral node. The set of machine codes also includes a machine code to cause the wireless communication module to transmit the received event data using an LPWAN protocol. In one form, the PAN is used for one or more of testing, contact tracing, proximity monitoring and geofencing.

According to a second aspect of the present disclosure, a wearable electronic device is disclosed. In one form, the wearable electronic device is used for one or more of testing, contact tracing, proximity monitoring and geofencing.

According to a third aspect of the present disclosure, a non-transitory computer readable medium that has executable machine code that upon execution on a machine causes the machine to operate a PAN. In one form, the resulting PAN is used for one or more of testing, contact tracing, proximity monitoring and geofencing.

According to a fourth aspect of the present disclosure, a method of monitoring an individual with a wearable electronic device is disclosed. In one form, the method is used for one or more of testing, contact tracing, proximity monitoring and geofencing.

BRIEF DESCRIPTION OF THE SEVERAL VIEWS OF THE DRAWINGS

The following detailed description of specific embodiments of the present disclosure can be best understood when read in conjunction with the following drawings, where like structure is indicated with like reference numerals and in which:

FIG. 8 depicts a contact report shown by a notional display and that is used with the PAN disclosed;

Figure 1:
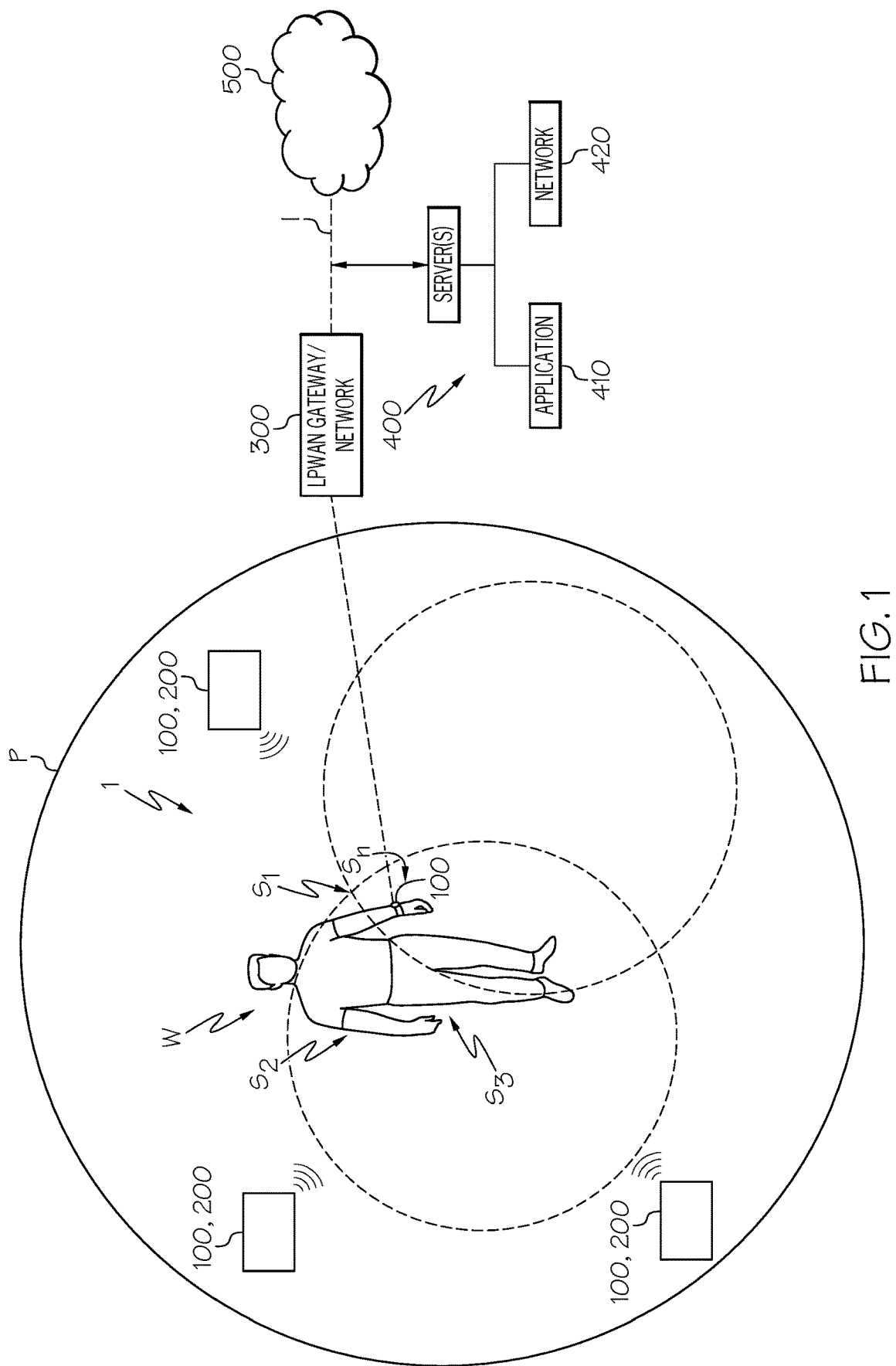
FIG. 1 depicts a simplified view of wireless signal connectivity between a wearable electronic device that forms a PAN and the internet through an LPWAN gateway or network, as well as how the PAN may be used to form a geofence, all according to one or more embodiments shown or described herein.

It will be appreciated that for the sake of clarity, elements depicted in the drawings are not necessarily to scale, and that certain elements may be omitted from some of the drawings. It will further be appreciated that certain reference numerals may be repeated in different figures to indicate corresponding or analogous elements.

DETAILED DESCRIPTION

Figure 2:
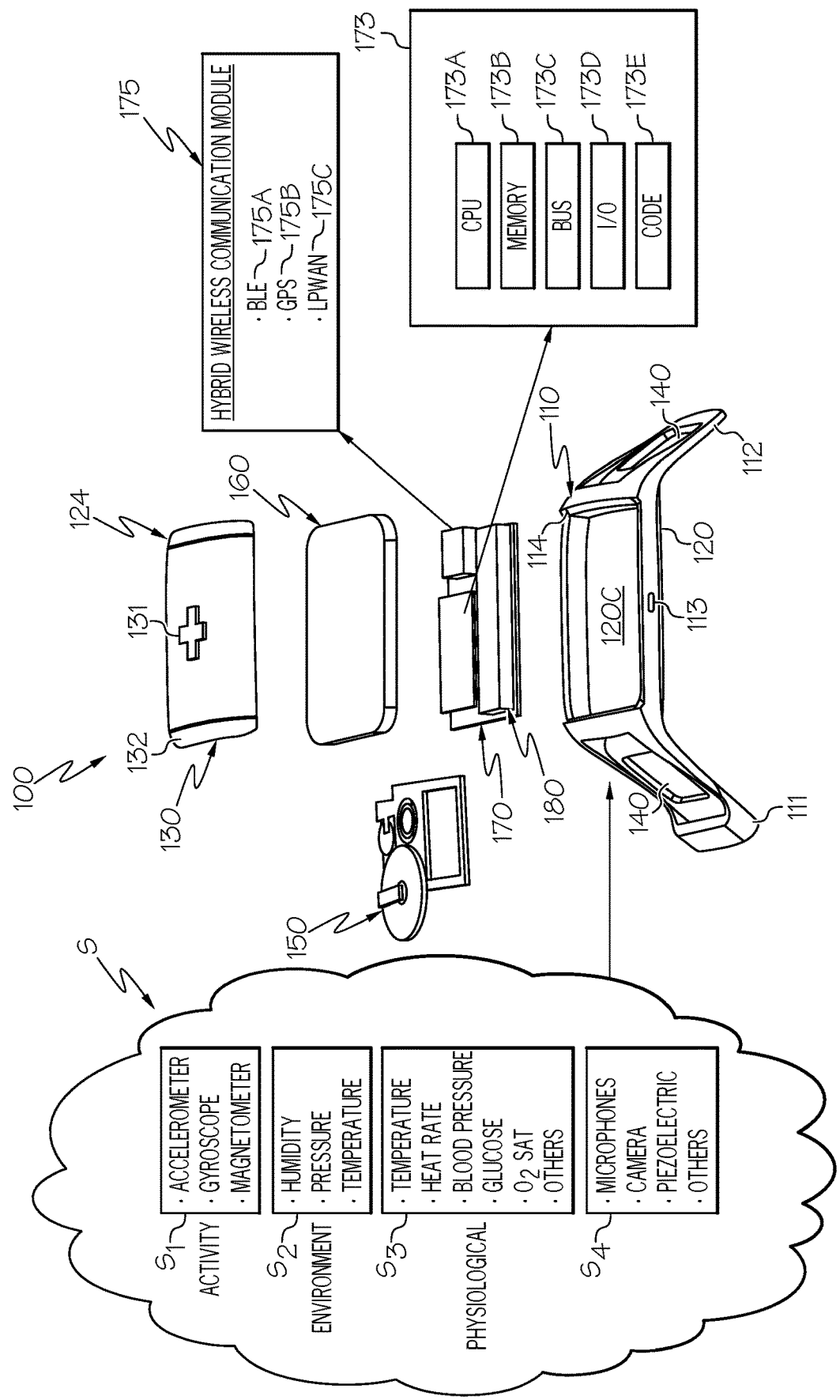
FIG. 2 depicts an exploded upper perspective view of the wearable electronic device of FIG. 1, as well as a block diagrammatic representation of its logic device, various sensors and hybrid wireless communication module.

The disclosed devices, systems and methods allow for real-time tracking through a PAN to provide data-informed insights of people and activities that are within communication range of the PAN. While much of the present disclosure emphasizes the wearable electronic device, PAN and peripheral components and systems for use in providing information pertaining to the potential or actual spread of a virus or related disease that if left unchecked could to cause an epidemic, pandemic or the like, it will be appreciated that such devices, components and systems may be used for other applications as well, such as for acquiring other forms of location, environmental, activity, physiological (LEAP) or other data associated with the individual to whom the wearable electronic device is attached. For example, accelerometer data may be grouped as activity data, while heart rates, blood oxygenation, cardiac, temperature, incontinence (such as through diaper moisture sensing) may be grouped as physiological data, temperature, humidity and barometric pressure may be grouped as environmental data; all of these are directly-measurable forms of data. It will be appreciated that other types of data may be derived, such as through analysis or computation, including that arising out of conducting machine learning analyses such as those discussed herein; one example of such derived data may include activities of daily living (ADL) data that in one form is correlated to accelerometer data through machine learning. Likewise, some data may have both direct and derived attributes, such as location data that may be both relative and absolute via radio signal strength indication (RSSI) variables derived therefrom. It will be appreciated that these and other forms of data (such as depicted in FIG. 2) may be subjected to additional analysis in order to perform one or more of the contact tracing, proximity monitoring, geofencing or related activities disclosed herein. The PAN disclosed herein refers to the interconnection of peripheral information technology devices, sensors, beacons or the like (individually or collectively referred to as peripheral nodes) that are within the environment of an individual user that is associated with the wearable electronic device (also referred to as a source node). In one non-limiting form, such peripheral nodes are within about ten meters of the source node.

The prevention of communicable disease spread may be enhanced through a combination of functions that are within the capability of the PAN. Such functions include—among others—testing, contact tracing, proximity monitoring and geofencing. While clinical-based testing of an individual is beyond the scope of the present disclosure, the authors herein have additionally determined that the acquisition of various types of sensed data by the wearable electronic device—in conjunction with on-device real-time analysis based on such data—can accurately predict whether the individual being monitored by such device has a high likelihood of contracting the communicable disease. This in turn can lead to the device, PAN and system to perform additional activities relating to one or more of location tracking, contact tracing, proximity monitoring and hotspot detection, as well as corresponding informing functions of such likelihood through dashboards, reports, messages or the like that can be conveyed to caregiver, employees, family, friends, public health policy organizations or the like on a mobile device, computer screen or the like. In one form, the inclusion of one or more beacons (such as in a hospital, retirement community, assisted living community or related healthcare facility) may be used to promote additional location tracking; this latter form is particularly useful for hotspot detection, that is, to know within a building where the sites are where the most contact between people has been occurring. Once these hotpots (such as bathrooms, or break rooms, random hallways or the like) and their corresponding levels of increased risk are identified, the resulting information can be of use for planning, risk avoidance or related measures.

In one form, the contact tracing may include logging interaction details of the individual being monitored, including details associated with elapsed time, distance, device identifiers or the like. In this way, and using validated exposure notification protocols, suitable interaction recording and associated notifications may be made by one or more of the devices, PAN and system. In one form, geofencing or related zone monitoring may include sending or receiving notifications when the individual being monitored enters or exits a designated, geofenced area. In one form, proximity monitoring may include sending or receiving device alerts (such as through audible, visual or haptic means) when the wearable electronic device is within a preset distance (for example, six feet, per current Centers for Disease Control (CDC) guidelines) of another such device. In one form, when two wearable electronic devices such as those disclosed herein experience an interaction where they come within such preset distance, the devices are configured to exchange data (such as through anonymized tokens or the like), where such data may include the duration of the interaction and the date and time of the interaction. This information is then sent to a remote location (such as a secure cloud-based location) where it can be retrieved in the event that a disease outbreak has been detected. As mentioned elsewhere, device and system-based operations associated with these activities are in one form automated.

In one form, the proximity monitoring may include the detection of other devices in order to ensure that minimum distances are being maintained, as well as providing visual, haptic, audio or related alerts, warnings or the like when such minimums have been breached to serve as a reminder to adhere to social distancing guidelines. In one form, machine learning (including on-device machine learning) may be used to help with such proximity monitoring. As previously mentioned, information gleaned from proximity monitoring may be thought of as a subset of location information; however, it does not necessarily mean that proximity monitoring is the same as location tracking. For example, in situations where increased security or user privacy may be important to the users of other devices within the PAN, if the beacons or other sources of RF signals being transmitted from such other devices do not include GNSS, their own static geofences or other sources of absolute (or quasi-absolute) frame of reference locationing, then the proximity information acquired by the central device within the PAN becomes more anonymized, due at least in part to its ever-changing (that is to say, dynamic) nature.

In one form, hotspot detection may include having the wearable electronic device cooperate with adjacent (that is to say, those within wireless signal communication range) beacons to gain a more accurate representation of indoor location and interpersonal interaction. In one form, the identity of the people making such interactions may be anonymized, while still allowing a system administrator (such as those associated with a nursing home, assisted living community, group home or the like) the ability to monitor the interactions and adjust protocols accordingly.

In one form, a dashboard or other display-based approach may be used to provide various organization management functions. For example, when the organization is a place of employment, place of public accommodation, healthcare facility or other entity where groups of people can be expected to congregate, the dashboard may be made to provide notification functions, as well as the results of analytic-based assessments (such as those from one or more machine learning algorithms as is discussed in more detail herein), as a way to view organization-wide risks, create and track infection cases, send automatic messages (such as short message system (SMS), push or voice notifications), as well as—in the case of a healthcare facility—to manage staff, residents and visitors. In configurations where machine learning is being used to analyze data collected by the wearable electronic device and its associated PAN, one form involves using the machine learning model to evaluate a health condition of an individual being monitored. In a more particular form, such evaluation is taking place at the edge (that is to say, on the device). Likewise, regardless of whether such machine learning takes place at the edge (that is to say, on the wearable electronic device) or in a remote computer, server or other platform or system, the analysis or inference produced therefrom may be made analyzing the health condition of an individual being monitored, perform contact tracing on infected persons, perform proximity monitoring or other related functions. In another form, other uses beside health condition evaluation may be performed by the device, PAN and system disclosed herein. For example, sensing and associated analysis, reporting or the like may be used to help evaluate an environmental issue around the person being monitored, such as in an industrial or related setting where high levels of a gas or dangerous chemical may be present. It is understood that all such uses and scenarios are within the scope of the present disclosure.

In one form, a notional display such as a mobile phone screen, tablet screen, computer screen or the like may be used to present notification, warnings or the like. For example, an API loaded onto the mobile phone of an employee of a healthcare facility may provide summary information, testing recommendations or the like in order to give employees access to risk levels based on sensed interactions. In addition, an analysis of historical or past interactions may be presented, as can a list of resource such as local healthcare providers, testing center locations and hours of operation. In addition, it allows the person to manage his or her bubble. Within the present disclosure, such a bubble may be a user interface or related component on an a mobile or website-based application programming interface (API) that allows the individual to see the number of interactions and risk level of a group of other people (such as friends, family, co-workers or the like) with which the individual may have frequent encounters. In one form, the bubble also can serve as a safegroup whereby the people in that bubble are known contacts and may categorized differently that other people (such as a random stranger) that is outside such group. One form of different categorization may include not counting the people in the group in the same way for contact tracing purposes, while another form may include assigning a different risk level or priority level to people in the group than outside the group owing to known behavior or interaction patterns. In a related way, this may allow the selective disabling of certain functions (such as social distancing alerts) of the device for people in the bubble when they are near each other.

Referring first to FIG. 1, a system 1 is shown in the form of a network-based or network-accessible computing platform configured to perform various data acquisition activities associated with the operation of a PAN P. In one form, system 1 may be referred to as a network-capable computing platform to perform software as a service (SaaS), cloud services, on-demand computing, platform computing, data center computing or the like. A wearable electronic device (also referred to herein as a source node) 100 is used as a central part of the PAN P and may be affixed to a wearer W so that data related to one or more of the wearer W location, environment, activity and physiological (LEAP) attributes may be collected by sensors $S_1, S_2, S_3 \ldots S_n$ or other devices (collectively referred to as peripheral nodes or end nodes) 200 in order to be wirelessly conveyed to the internet I through at least one LPWAN gateway 300 (also referred to herein as gateway 300, only one of which is shown) and then to the cloud 500. In one form, the internet I may include—among other things—various servers 400 that in turn may be made up of various network servers 410, application servers 420 or the like, all of which are understood by those skilled in the art as being useful in order to establish backhaul connectivity throughout the internet I. In one form, the network server 410 may perform various transmission functions, such as—among other things—acknowledgement of a transmission, selection of which of several gateways 300 is to be used for sending any necessary downlink transmissions to the wearable electronic device 100 or gateway 300, as well as for eliminating duplicate receptions. In one form, the network server 410 may receive uplink transmissions from multiple gateways 300, but might only send downlink transmissions to a single one of such gateways 300. Likewise, application server 420 may function as a computing nerve center for system 1 to run protocols and interfaces, such as web-based APIs or the like in order to perform LoRa-based message handling and archiving, end user identification, notification-sending rules, security and software or firmware upgrades, among other functions. Within the present context, the servers 400, internet I and cloud 500 may form the backhaul that, depending on the configuration, may be situated at one of numerous geographic locations, including a geographically remote location with respect to PAN P, and that all such variants are deemed to be within the scope of the present disclosure. In one form, server 400 may include built-in redundancy features. For example, communication between the wearable electronic device 100 and the gateway 300 may be configured such that up to six different LoRaWAN network credentials may be stored. This in turn permits hopping between credentials to take place seamlessly such that network 300 or server 400 isn't available (such as through a loss in connectivity), the data acquired through the PAN P and transmitted by the wearable electronic device 100 is still conveyed to its end use destination. Such functionality may also work in situations when a private network between the various components is being employed (such as for a nursing home, hospital, assisted living facility or the like) and there becomes a need to switch to a public network (such as that provided by internet service providers (ISPs) for example).

The use of LoRa-based chipsets, coupled with various protocols and system architectures such as those associated with a wireless telecommunication protocol such as LoRaWAN, allows long-range, low-power communication for low-to-medium bandwidth data requirements such as those being delivered from PAN P in general and the wearable electronic device 100 in particular to such backhaul while taking advantage of (in one form) a star network topology (more particularly, a star-of-stars protocol) such that the gateways 300 act as a transparent bridge between one or more wearable electronic devices 100 and the backhaul. Within the present disclosure, in a star-of-stars topology, the various wearable electronic devices 100 are wirelessly coupled to one or more of the gateways 300 via single-hop LoRalink, while the gateways 300 are connected (such as through the internet I, for example) to a common network server 400 (such as server 400). In fact, the star-based topology is consistent with the LoRaWAN protocol in that the protocol does not support direct communication between the wearable electronic devices 100. As mentioned elsewhere, such data acquisition—as well as related analysis and wireless transmission of such data—is performed automatically. Within the present disclosure, such automated operation may include having the wearable electronic device 100 join an LPWAN network (such as a Helium Hotspot or related peer-to-peer wireless network, for example) that encompasses one or more of the gateways 300, forwarding the data that was received by the gateway 300 to the internet-based servers 400 such that the network server 410 will forward the data to a backend (such as AWS IoT Core, for example) for one or more of recordation, processing, analysis or the like, and enable frontend APIs to retrieve the recorded, processed, analyzed data such that a localized report of contact tracing data may be presented to the individual associated with the wearable electronic device 100, family members, caregivers, public health and policy centers, government agencies or other interested people or institutions. In one form, the LPWAN network is configured to offer cryptographic proof of the transmission of various data (such as time and location) from the wearable electronic device 100 to the gateway 300; such proof may be in the form of permanent recordation on a distributed ledger such as Blockchain.

In one form, the LPWAN signal used to convey data collected by the wearable electronic device 100 is predominantly used in a one-way flow of such information in an uplink manner to the gateway 300, while in another form, two-way (that is to say, bidirectional) mode of communication that includes downlinks is possible. In this latter mode, information that is generated, processed or otherwise acquired from a remote location such as the backhaul server 400, cloud 500 or the like may be returned to the PAN P through the wearable electronic device 100 in its capacity as the master device within the PAN P. Also in this latter mode, and consistent with any of Classes A (ALOHA-style), B (with time-synchronized, scheduled receiving slots to promote additional downlink capacity and lower latency) or C (where downlink and associated wearable electronic device 100 ability to receive transmissions is on substantially all of the time) communication, some form of downlink may also be employed in order to establish security updates, data transmission (i.e., received packet) acknowledgement, other over-the-air (OTA) updates, activations or the like. Significantly, this provides the opportunity for the wearable electronic device 100 to change its class dynamically depending on the level of data being shared via the PAN P. For example, if more data is required in a particular downlink, the wearable electronic device 100 could switch to a Class C device for more frequent or more bidirectional modes of communication, after which it can then switch back to a Class A or Class B mode after either completion of the transmission, a set amount of time specified or by default. Furthermore, the use of downlink capability is such that a downlinked inquiry can be made of the wearable electronic device 100 to have it in turn inquire of the devices in the PAN P for data, as well as to give it instructions about what data is to be received at the backend. Considerations for choice of class may be based on various operational considerations such as power usage (which corresponds to battery life), duty cycle and latency requirements, message content and broadcasting status (that is to say, unicast versus multicast), situation exigency, threshold-exceeding movement, communication-initiation source or the like. Moreover in such downlink communication, an application server 420 that is part of the backhaul server 400 may communicate with a network server 410 that is also part of the backhaul server 400 and that in turn sends each downlink message to a single gateway 300 that then transmits the message to the wearable electronic device 100. Furthermore in this latter mode, the gateway 300 may act as a duplicating, packet-forwarding device by first receiving LPWAN radio signals from events recorded and stored in the wearable electronic device 100 and then forwarding them to the backhaul server 400. In this mode of operation, the wearable electronic device 100 is capable of encrypting and decrypting packets, as well as be observant of duty cycles and perform network authentication functions.

As previously discussed, in one form where the signal transmission protocol is based on LoRaWAN, various functionalities are enabled, including the ability of a large number of the wearable electronic devices 100 to be monitored simultaneously, the ability to engage in adaptive data rate (ADR) transmission (which can reduce the need for signal-hopping), the ability to have bidirectional end-to-end communication, OTA software or firmware upgrades, range-versus-message duration tradeoffs, more accurate localization and the ability to roam between gateways 300 without a disruption in connectivity in a manner that substantially mimics the movement of a mobile telephone between cell towers. Furthermore, communication between the wearable electronic device 100 and the gateway 300 may be configured such that up to six different LoRaWAN network credentials may be stored to allow seamless (that is to say, automatically and without a substantial break in connectivity) hopping between credentials, as well as public-private network switching, depending on the circumstance or need. When multiple credentials are used, they may be further set up to prioritize a particular order, such as first, second, third and so on. In one form, each gateway 300 can serve numerous (for example, in excess of a thousand or more) wearable electronic devices 100. Having multiple gateways 300 may be helpful in establishing a star topology for a network formed between such gateways 300 and the PAN P through one or more of the wearable electronic devices 100. By having this bidirectional capability, the wearable electronic device 100 and associated PAN P can—in addition to operating in a passive mode for monitoring location, activity, behavior or the like—operate in an interactive way with other components within the system 1 or other devices within a particular environment, including within the PAN P itself.

In this latter form, the bidirectional exchange of information within the PAN P between the wearable electronic device 100 as the source node and the remaining peripheral nodes 200 (whether in the form of beacons, other wearable electronic devices 100, sensors $S_1$, $S_2$, $S_3$ . . . $S_n$ or the like and all of which are in signal communication with the source node) may be used to conduct handshaking between them. Such handshaking, as well as the repeated bidirectional communication between source and peripheral nodes 100, 200 within the PAN P, ensures that a substantial entirety of the data being transmitted back and forth actually reaches its intended destination. For example, by including a checksum or related algorithmic function, potential errors in the transmission of the data may be readily identified and corrected. Thus, in situations where integrity of the data is required or otherwise important, data acquired by and contained by the peripheral node or nodes 200 may only be removed from its internal queue of data once the peripheral node has been assured from the source node 100 that the data has been correctly received and processed. Such assurance may use checksum or other suitable algorithms in responses from the source node 100 to the peripheral node 200 after data transmission. By way of example when the intra-PAN P wireless transmission is using a BLE-based protocol, BLE indications from the peripheral node 200 (as a BLE server) are made to the source node 100 as a BLE client as a way to establish suitable acknowledgment rather than mere notification; this in turn results in confirmed data transmissions. The use of a cyclic redundancy check (CRC) and parity check may further help to ensure transmitted data validity, while the assurance of specific types of data may similarly be undertaken in the form of a data assurance transmission method, algorithm or the like.

Within the present disclosure where health, medical and related disease-spread information may be transmitted both within the PAN P and between the PAN P and gateway 300, servers 400, cloud 500 or other outside systems, networks or the like through the bidirectional wireless signal communications discussed herein, data validity measures such as these are particularly beneficial. As discussed elsewhere, the use of bidirectional intra-PAN P communication may further help with power management functions. For example, active transmission of data from the peripheral node 200 to the source node 100 is initiated by the source node and can be made to only occur when the source node 100 can reasonably assume that transmission is needed and that the transmission will succeed based on its internal state, measured values of its environment and the peripheral node 200. In other words, the source node 100 will not connect to download data from the peripheral node 200 unless it detects a sufficient signal strength from the peripheral node 200, and for a sufficient amount of time. This in turn may include the use of machine code to prioritize certain kinds of peripheral nodes 200, as well as prioritizing based on how much data the source node 100 can detect has been backlogged by the peripheral node 200. This has the effect of minimizing wasted dataflow traffic and the concomitant unnecessary usage of battery power by both source and peripheral nodes 100, 200.

This relatively high degree of interactive (rather than merely passive) involvement enabled by bidirectional communication that is used to ensure validity of the data being transferred in turn allows for the formation of a self-configuration network (or a self-organizing network (SON)) such that the PAN P may manage itself. By way of example, machine code that is discussed in more detail herein may cause the PAN P to perform at least one of configuration, registration and calibration. This in turn enables various updates to the same, including those to software or firmware, including to the peripheral node or nodes 200. Non-limiting examples of configuration updates may include those for the selective engagement or disengagement of certain functions (such as a panic button on the wearable electronic device 100), LPWAN power level changes, such as to get extended distance or range versus extended battery life and changing request and response status between the source and peripheral nodes 100, 200 to acquire certain forms of LEAP data, among others. In this last example, by assuring bidirectional communication between the source and peripheral nodes 100, 200, the PAN P enables requests for a particular peripheral device 200 to acquire a measurement, such as an electrocardiogram (EKG) reading or the like. Such targeted (rather than indiscriminate) requesting is especially beneficial for measurements that are taken at peripheral devices 200 that consume larger amounts of power during the measurements but low power during idle as a way to conserve battery power. In another use for self-administered configuration changes, restrictions may be made on the number or type of possible networks that can join the PAN P; this has the effect of conserving power on the various peripheral devices 200. In addition, further measures may be undertaken to ensure proper data transmission within the PAN P. For example, data transmission from the peripheral node (or nodes) 200 to the source node 100 is only allowed to occur when the signal strength threshold between them is great enough to ensure complete transmission and when the data to be transmitted can be assured to be completed in full (such as through checksum or other suitable algorithms). It will be appreciated that these are but a few examples of how the bidirectional communication between the source node of the wearable electronic device 100 and the peripheral nodes 200 promotes a SON.

Within the present disclosure, registration could be achieved by placing the wearable electronic device 100 in close proximity with a measurable parameter of interest (such as a heartbeat being sensed by a heart rate monitor) for a short period of time (for example, around five seconds) in situations where near-field communication (NFC) or related wireless communication is enabled. Registration could also be conducted through a registration process, through an exchange of keys back and forth or through a BLE connection that accepts the two devices as a part of the PAN P of the source node 100. Likewise, calibration could be applicable to numerous features. In one form, the source node 100 may be used to calibrate or configure one or more of the peripheral nodes 200. Using the previously-discussed detection of heart rate as an example, calibration of the heart rate monitor may take place such that it monitors for a duration (for example two hours) at predetermined rate (for example, every one minute) after which it reverts back to its default monitoring rate. Self-calibration is also possible in that in a situation where a sensor or related device may have to adjust to a new, updated standard, it can reset, balance out and then confirm that it was calibrated to the new standard, as well as send a status update upon completion. In a similar manner, the bidirectional nature of the communication between the source and peripheral nodes 100, 200 may be used to conduct diagnostic tests, system information or related status updates for the various components that make up the PAN P, such as when such diagnostics, tests or status information is transmitted to the source node 100 from the one or more peripheral nodes 200. For example, an error code or an update (such as an update on the number of battery charge cycles or an indication that it is time for some predictive or preventative maintenance of a particular device) may be transmitted in order to allow machine code (such as that resident on the wearable electronic device 100) to conduct an analysis, prepare a report or the like.

Furthermore, data compression may take place on the wearable electronic device 100 before sending such data to the gateway 400 and backhaul. As discussed elsewhere within the present disclosure in conjunction with a machine learning workflow 1000, one form of such data compression may be in the form of data cleaning in general, with a more particular form being dimensionality reduction. As a corollary, native intelligence on the wearable electronic device 100 helps to promote some measure of self-backhauling, which is beneficial in situations where access to the backhaul server 400 is not available. Moreover, such bidirectional capability may help with registration of the various devices, such as through short range RFID, BLE or NFC connectivity. In one form, the registration may be event-based.

In one form, the sensors $S_1, S_2, S_3 \ldots S_n$ may be distributed over various places on or adjacent the wearer W such that they are physically distinct components that are separate from the wearable electronic device 100, while in another, the sensors $S_1, S_2, S_3 \ldots S_n$ may be contained within the wearable electronic device 100, while in still another, some of the sensors $S_1, S_2, S_3 \ldots S_n$ may be separate components while others are part of the wearable electronic device 100. In yet another form, one or more of the sensors $S_1, S_2, S_3 \ldots S_n$ may form autonomous or semi-autonomous data-collecting devices. Within the present disclosure, a sensor detects events or changes within the environment in which it is placed, and may record, indicate, forward or otherwise respond to a particular physical property that is being measured. Depending on the configuration, and as will be discussed in more detail as follows, in one form, communication between the various sensors $S_1, S_2, S_3 \ldots S_n$ and the wearable electronic device 100 may be thought of as an intra-PAN construction, while in another as an inter-PAN construction where the former is that which takes place within the PAN P while the latter is that which takes place outside of the PAN P. It will be appreciated that both variants are deemed to be within the scope of the present disclosure. By way of example, in one form, an inter-PAN communication may be formed between the wearable electronic device 100 and sensors $S_1, S_2, S_3 \ldots S_n$ and other devices external to the PAN P, while in another form, a substantial majority or entirety of the acquired data may be conveyed to the wearable electronic device 100 from devices that form part of the PAN P. Moreover, in configurations where one or more of the various sensors $S_1, S_2, S_3 \ldots S_n$ are physically distinct components that are separate from the wearable electronic device 100, they may be made to establish signal communication with the wearable electronic device 100 through one or more short-range or very short-range radio signals using a suitable NFC, or in the alternative through one or more short-range protocols or wireless interfaces such as Bluetooth, WiFi, Zigbee, BLE, 6LoWPAN, IrDa, RFID or the like.

In one form, the sensors $S_1, S_2, S_3 \ldots S_n$ form so-called "smart devices" in that they are made IoT-compatible through suitable RF connection such that data that they acquire may be conveyed based on certain triggering criteria. In one form, the acquired data may be conveyed based on triggering criteria established by logic contained within the sensors $S_1, S_2, S_3 \ldots S_n$ or wearable electronic device 100, while in another form via logic contained within the gateway 300, servers 400 or cloud 500. In one form, such triggering may involve the transmission of previous measurements that may have been acquired by—and locally stored upon memory contained within-one or more of the sensors $S_1, S_2, S_3 \ldots S_n$. Regardless of where such logic is situated, it will be appreciated it may exist in a known form, such as through a software development kit (SDK) or the like, and that in addition to performing various calculations and event-triggering or event-responding activities, may also detect and interpret wireless and related radio broadcasts that take place between the various components that make up PAN P.

Examples of how various triggering events may be used to initiate action by the wearable electronic device 100 include text, call or e-mails from outside sources, as well as certain threshold-exceeding or time-based events. Within the present disclosure, events are those situations, conditions, locations or related measurable quantities that may have an impact on contact tracing, proximity monitoring, geofencing or related functionality associated with the wearable electronic device 100, system 1 or PAN P. These events and triggers may take place regardless of whether the wearer W is being monitored for location, health and related physiological data, contact tracing, ambient environment conditions, activity or purposes as may be discussed herein. As shown in exemplary form, example, sensors $S_1, S_2, S_3 \ldots S_n$ may include chemical sensors, radiation sensors, accelerometers (such as to detect vibrations, falls, extreme movements or the like), cathodic protection sensors (such as for pipelines or other remote or hard-to-reach locations where the use of a LoRaWAN-based approach would be particularly beneficial), various physiological sensors (including temperature sensors that may include infrared (IR) or related thermal imaging functionality) and others that may be signally coupled to the servers 400 through a public or private LoRa-based network that establishes wireless communication between the wearable electronic device 100 and the gateway 300.

In one form, the sensors $S_1$, $S_2$, $S_3$ . . . $S_n$ can receive communication from the LPWAN through the gateway 300, but can only send information to the LPWAN through the wearable electronic device 100. In this way, the common device credentials associated with each of these and other components within PAN P gives the appearance to the LPWAN that the PAN P is a single device. In another form, the sensors $S_1$, $S_2$, $S_3$ . . . $S_n$ may possess some measure of both send and receive communication with the LPWAN through the wearable electronic device 100. By way of example for this latter configuration, the wearable electronic device 100 may send out a signal to wake up a first sensor $S_1$ in order to initiate a task such as to first clear a memory (not shown) in sensor $S_1$ and then to have sensor $S_1$ start performing its particular data-acquisition process, such as measuring heart rate, $O_2$ saturation or the like. Additionally, time limits (for example, one minute) may be placed on the length of time for sensor $S_1$ to acquire the data, after which it may then be instructed to transmit the acquired data back to the wearable electronic device 100. In certain operating modes such as the one associated with the form where one or more of the sensors $S_1$, $S_2$, $S_3$ . . . $S_n$ may possess some measure of both send and receive communication from the LPWAN, certain commands (such as that to clear and retest) need not include having to route such commands through the wearable electronic device 100 for handling other than for the purpose of having it act as the communication gateway. Likewise, in certain operating modes such as the one associated with the form where one or more of the sensors $S_1$, $S_2$, $S_3$ . . . $S_n$ may possess only send communication capability to the LPWAN, the wearable electronic device 100 may take on a more comprehensive role as the command handler.

In one form, the data generated by the one or more of the sensors $S_1$, $S_2$, $S_3$ . . . $S_n$ and that is delivered to or otherwise managed by the wearable electronic device 100 may be delivered directly from the wearable electronic device 100 to the cloud 500 through the gateway 300. This obviates the need for intervening infrastructure such satellites (either terrestrial, space-based or nano satellite-based) or a cellular tower, thereby allowing a wireless connection to be established between the PAN P and an end user of the data on the cloud 500 through the internet I without the presence between the wearable electronic device 100 and the cloud 500 of a cell phone, mobile phone, smartphone or the like, while reducing—if not outright eliminating—the need for WiFi. Such a configuration is particularly suitable in situations where analytics, predictions or the like based on such acquired data needs to take place in real-time or near real-time situations such as infectious disease contact tracing, wearer W wandering, health monitoring, location determination or the like. In this way, the insights gleaned from the acquired data may be more quickly put into a form suitable for decision-makers or other interested individuals.

Within the present disclosure, it is understood that the cloud 500 may exist in two forms. First, it may be on the internet I such that it is reached by the gateway 300 through the server 400. Second, it could be locally transferred from the gateway 300 to an intranet or to a specific server (neither of which are shown). Either variant of cloud 500 cooperation with the wearable electronic device 100 and gateway 300 is within the scope of the present disclosure.

Depending on the extent of physical connectivity between the sensors $S_1$, $S_2$, $S_3$ . . . $S_n$ and the wearable electronic device 100, the latter may be configured to be coupled to the wearer W in various form factors, including wrist-worn (as shown), bandage, article of clothing, or other on-body format, as well as attachable to the wearer W through an external device attached onto a belt clip, in a pocket, on a necklace, on a shoe, helmet, hardhat, safety glasses or the like, in addition to being affixable to a purse, backpack, a subcutaneous implantable (that in one form may be charged like a pacemaker) or the like. Additionally, the wearable electronic device 100 may be configured as a smartwatch, a smartband, smartring or the like, while the sensors $S_1$, $S_2$, $S_3$ . . . $S_n$ may either on the wearable electronic device 100 or placed somewhere on or adjacent the wearer W, such as through nearby a sensor patch, embedded in or on the clothing, as a subcutaneous implantable sensor (such as a thermometer, insulin detector that—as mentioned previously—can be charged like a pacemaker) or the like. Furthermore, the wearable electronic device 100 and PAN P may be used in various applications, including by way of example and not by limitation: insulin devices, wearable heart rate patches, seizure-monitoring apparati, body-mounted sensors for falls, smart clothing or as an add-on product.

In one form, the wearable electronic device 100 acts as the aggregator or master node of the PAN P, while sensors $S_1$, $S_2$, $S_3$ . . . $S_n$ or other external devices 200 may act as peripheral data-acquisition nodes, and as such are also referred to herein (depending on the context) as peripheral nodes, peripheral devices, BLC-capable devices, beacons, mobile beacons or the like. In one non-limiting form, the external devices 200 may include personal digital assistants (PDAs), mobile telephones, personal computers (PCs), laptop computers, mobile phones, fitness trackers, headphones, heart rate monitors or other radio-equipped platforms, as well as IoT-based beacons, radio-equipped sensors such as the sensors $S_1$, $S_2$, $S_3$ . . . $S_n$ all of which may form part of an individual's living or work space. Within the present disclosure, one or more additional wearable electronic devices 100 may also be included among these PAN-compatible devices when they are not acting in their capacity as the source node or master aggregator of PAN P. Within the present context, many if not all of these peripheral devices will include BLE or other short-range protocol modes of transmission. Likewise, many or all of the peripheral device may include locationing functionality through GNSS or related satellite-based inertial frame of reference positioning system sources, as well as relative locationing functionality through triangulation or related cooperation with other similar devices. It will be understood that even in situations where one or more of the sensors $S_1$, $S_2$, $S_3$ . . . $S_n$ are integral with (that is to say, forms a part of) the wearable electronic device 100, they may still be considered to be peripheral nodes for functional purposes. In acting as the master or aggregator node, the first or primary wearable electronic device 100 manages communication between the sensors $S_1$, $S_2$, $S_3$ . . . $S_n$ and the LPWAN gateway 300, as well as various management, control and network access and connectivity functions as a way to connect one or more endpoints to a broader network. Within the present disclosure, this aggregator capability allows such wearable electronic device 100 to operate as a full function device (FFD) which—in addition to other functionality—allows it to be configured to have a full infrastructure network access protocol, as well as full control and user plane functionality, including the ability to adaptively change data rates or the like. In this way, application-specific data may be conveyed in MAC frames between various end node devices and the network server 410. Likewise, the MAC frames may be used to transmit control plane data between the end nodes and the network server 410. The structure of the signal and data (that is to say, the payload being carried) may be established within known frameworks within the various headers or control frames as is known in the art. Moreover, various known network-joining strategies and infrastructure may be used within the LPWAN network that includes gateway 300, including—among other things—the use of network address (NwkAddr), application extended unique identifier (AppEUI), device extended unique identifier (DevEUI), application key (AppKey) and the IP address-like device address (DevAddr). To enhance security of the wearable electronic device 100, the AppKey (which is subject to the 128 bit Advanced Encryption Standard, (AES) with public key and private key components), as well as the derived application payload encryption key (AppSKey) and the MAC commands and application payload key (NwkSKey) may receive additional security through their use with—or incorporation into—a secure element. In one form, such a secure element may be thought of as a processor-based physical module with cryptographic code capability to cooperate with a suitably configured API. It will be appreciated that in the use of a secure element, IoT-specific and LPWAN-specific considerations may be made in the design thereof to account for data payload limitations within the communication link. In such circumstance, some form of adaptive cryptographic keys may be used to be responsive to expect future upgrades to IoT devices such as the sensors $S_1 \ldots S_n$ or the peripheral nodes in the form of BLE beacons 200 to ensure additional security of LPWAN IoT communications such as those discussed herein.

In one form, one or more of the various data-acquisition nodes (which in one form may be the same as, or form a part of the peripheral nodes 200) such as those associated with one or more of the sensors $S_1$, $S_2$, $S_3$ . . . $S_n$, BLE-capable devices 200 or the like may do more than merely passively acquire data. For example, one or more of these nodes may further include active features. Thus, for instance, if the first sensor $S_1$ (which in one form may be an accelerometer, gyroscope or the like) detects that the wearer W has fallen, the sensor $S_1$ in combination with the wearable electronic device 100 may send out a signal to a braking device that is affixed to a walker or related mobility aid (not shown) that is known to be associated with—and currently being used by—the wearer W in order to engage the brakes and stop or reduce additional movement of such mobility aid.

Communication (both one-way and two-way, depending on the need) between the PAN P and the gateway 300, servers 400, internet I or cloud 500, also allows for ease of parameter reconfiguration within the wearable electronic device 100 through suitable files, instructions or related updates from one or more backhaul sources that either form part of or are otherwise connected to the gateway 300, servers 400, internet I or cloud 500. As such, the PAN P may operate in two different link modes: first as a link between it and the LPWAN; and second as a link between the wearable electronic device 100, sensors $S_1$, $S_2$, $S_3$ . . . $S_n$ (and optionally other components-such as the BLE-capable devices 200 that may be cooperative with the wearable electronic device 100) within the PAN P.

In one form, the wearable electronic device 100 as an FFD may act as an intermediary between two more or more of the sensors $S_1$, $S_2$, $S_3$ . . . $S_n$ in order to deliver a function without having to backhaul the information to the cloud 500. For example, in such a configuration, the other external devices such as the BLE-capable devices 200 may transmit data to the wearable electronic device 100 which then determines that one or more of the data content, signal strength or other parameter of interest is too low to be of value. This in turn may cause the wearable electronic device 100 to provide some indicia of a potential problem with the acquired data or signal, such as through vibration of a haptic motor, flashing light, audible alarm or the like, as well as possibly communicating back to the BLE-capable device 200 of interest for a similar alert or alarm at the local site of the particular BLE-capable device 200. Relatedly, in situations where the data being offloaded from the sensors $S_1$, $S_2$, $S_3$ . . . $S_n$ to the wearable electronic device 100 may be present in various forms, including summary data, continuous data or the like, the wearable electronic device 100 may contain configured or pre-set parameters stored in its memory to allow it to determine what type, frequency, size or other attributes of the data to send through the LPWAN gateway 300 and what data to ignore. In addition, these parameters could be adjusted somewhere within other parts of the system 1 (such as the servers 400) as needed based upon current and future desired performance implementations of the wearable electronic device 100. Due to limited resources of—among other things—memory and power, the ability of the wearable electronic device 100 in one form to discriminate between various types of data allows it to allocate resources in an efficient manner to ensure the correct type of data gets transmitted rather than indiscriminately sending all sensed data.

By way of example, predetermined actions may be initiated by the wearable electronic device 100 based on the data acquired from the sensors $S_1$, $S_2$, $S_3$ . . . $S_n$ or other peripheral devices 200. Furthermore, such acquired data need not be related to the particular functionality of the wearable electronic device 100, PAN P and system 1, such as when they are configured to perform contact tracing or the like. For example, if a detected heart rate of the wearer W is very low, then the wearable electronic device 100 could initiate an action to call emergency services instead of sending data to the cloud 500.

In a similar way, various other data discrimination or filtering protocols may be established within the wearable electronic device 100 and PAN P. For example, in more densely-populated situations, a list of people or maximum number of other devices the wearable electronic device 100 can "listen in" on may be included, such as by a lookup table or the like in the memory of the wearable electronic device 100. This could be configurable based on various needs, including user input, device capacity, mode of operation or the like. Thus, for example, if the wearer W is on a train, it may be undesirable for every nearby BLE-capable device 200 to share data with the wearable electronic device 100. In one form, the wearable electronic device 100 could prioritize other wearable electronic devices 100 or BLE-capable devices that are within the PAN P, as well as on the nature of the information that these other devices carry. In one form, one could adjust the distance the PAN P is around the wearer W, or the number of devices it is monitoring for new data or the people of those devices.

Figure 10:
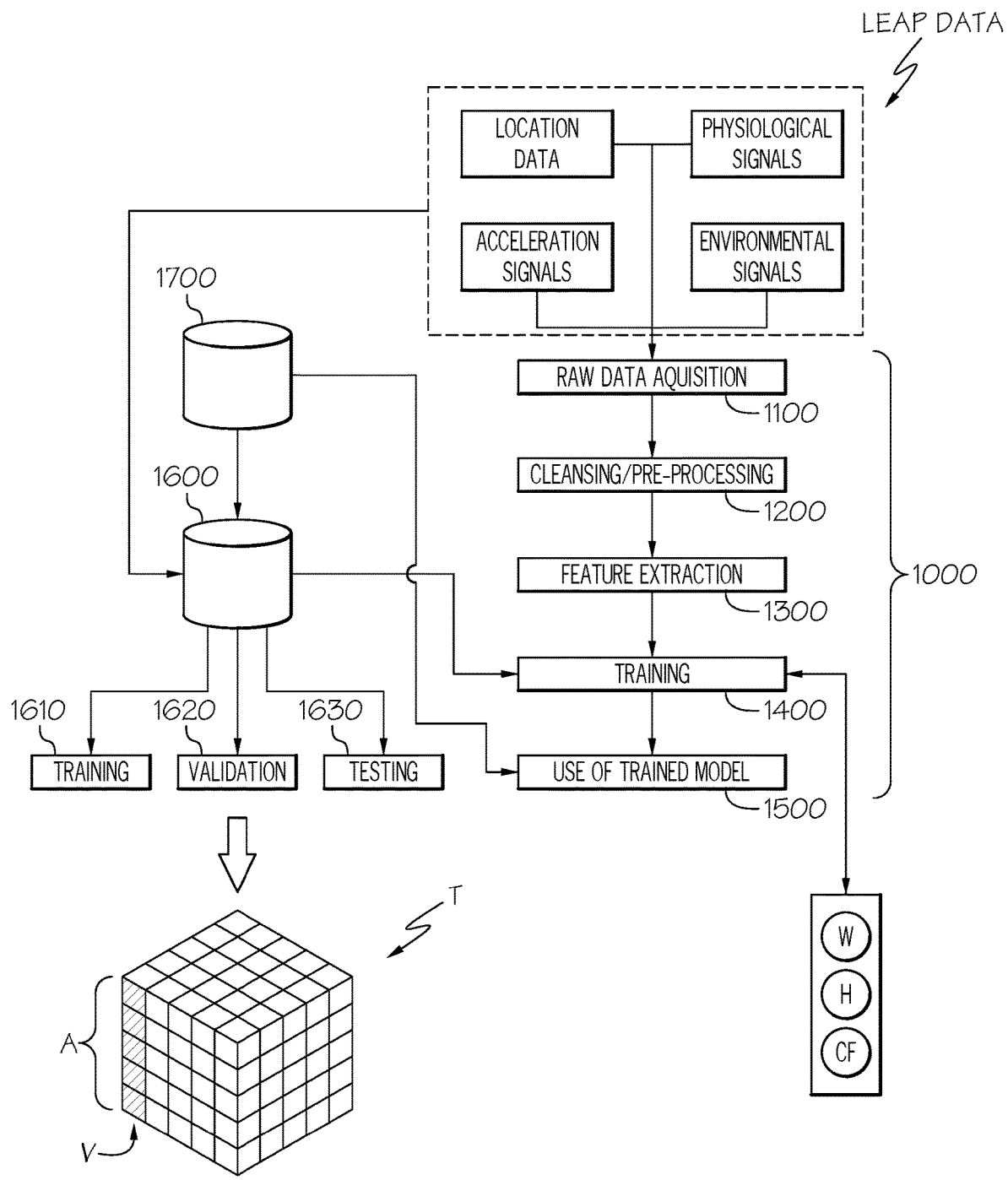
FIG. 10 depicts a program structure in the form of a flow diagram of how the wearable electronic device may be used to develop a machine learning model according to one or more embodiments shown or described herein.

In addition to allowing the wearable electronic device 100 to determine certain data acquisition functions based on need, computational capabilities of the various parts of system 1 may be configured based on data processing needs, including how such computational capacity (including data storage, operation of one or more parts of the machine learning workflow 1000 of FIG. 10, for example) needs may be met either locally at the wearable electronic device 100 or remotely in other parts of the system 1. In a similar manner, the authors of the present disclosure anticipate that such computational and data storage capacity will become significantly greater in the future as their underlying chipsets and peripheral equipment adapt and improve over time, possibly allowing for increasing amounts of computation to take place locally on the wearable electronic device 100. In addition, when coupled to machine learning capability, the wearable electronic device 100 may be tailored to adjust to the behavior of the wearer W, as well as to optimize its operation (including battery power usage) for efficiency during a particular mode of operation.

In one form, the PAN P is configurable to maintain certain preset or other prescribed parameters. For example, in one form, such parameters may include those which are set by an end user such as a physician, caregiver, data analyst, system administrator or the like. Thus, in addition to being used for contact tracing, the PAN P may be used to provide real-time information on maintaining social distancing or the like in order to fulfill at least a portion of its proximity monitoring function. In another form, the PAN P may be configured for resource management, such as the frequency of transmission between the wearable electronic device 100 as the FFD and the larger (IP) network or other backhaul infrastructure, as well as the adjustment of power-consuming functions (which could be initiated either on the wearable electronic device 100 or by a remote user, either automatically or by a system administrator) such as those tied to frequency or immediacy of certain data requirements, as well as for energy use throttling in situations where excessive energy use has been identified. Similarly, the use of on-board memory within the wearable electronic device 100 could be adjusted depending on the needs of the data being acquired, in addition to time-sequencing and prioritization of such data such as a preference to get the most recent data and deleted older data that could not be transmitted with a particular time allotment.

While in one form the topology between the PAN P and backhaul is configured in a star-based configuration, other topologies within the PAN P that may be supported include mesh/peer-to-peer (P2P), cluster trees or the like. As such, at least at the less granular system 1 level, there may be hybrid topology attributes, while at the more granular level, the topologies exhibit their own unique characteristics. In one form, this helps promote how the wearer W of the wearable electronic device 100 may serve as the focal point for communications within PAN P while also allowing such wearer W to serve as a caregiver for patients. By way of example in a hospital, residential care facility or the like, a nurse may have his or her wearable electronic device 100 configured as an FFD in order to monitor numerous patients within the facility who may be wearing their own FFD or RFD devices that are signally operating within the PAN P. Additional details of the wearable electronic device 100 acting as part of a star topology may be found in the previously-discussed US Published Application 2019/0209022, while more details of a mesh-based topology will be discussed herein relating to a geofencing capability of PAN P. Moreover, the wearable electronic device 100 may be configured to have different capabilities, depending on the end use. For example, it can be configured to include one or more of indoor location tracking, outdoor activity tracking, activity monitoring, touch-activated buttons (including, for example, a panic button), wireless charging and advanced sensor fusing (for gesture recognition). One such use depicted by the notional interaction of FIG. 1 between the wearable electronic device 100 and various telecommunication infrastructure is for use for triangulation or related location-determining or communication services.

Referring next to FIG. 2, in one form, the cooperation of the sensors $S_1, S_2, S_3 \ldots S_n$, wearable electronic device 100 and LPWAN gateway 300 form system 1 that is configured for use in tracking the spread of a contagious disease. In a known disease outbreak situation, the location wearer W may have been identified as having been infected with (or at least exposed to) the contagious disease. Likewise, other people who may not be suspected as having been infected may be outfitted with or otherwise have ready access to the one or more BLE-capable devices 200 with which low data content messages may be sent or received. In such capacity, the BLE-capable device or devices 200 form a reduced function device (RFD) that in contrast to the FFD functionality of the wearable electronic device 100 can only transmit to the PAN P (such as to the wearable electronic device 100) rather than both transmit and receive within the PAN P. As such in this form, the RFD that is embodied in the BLE-capable device 200 serves the role of a simple switch or sensor that in one form may emulate the functionality of the one or more of sensors $S_1, S_2, S_3 \ldots S_n$ disclosed herein and that have no routing functionality. In such capacity, the peripheral node or nodes 200 cannot serve as the PAN P coordinator or master in the manner of the wearable electronic device 100.

A logic device 173 includes a processor 173A, executable instructions stored in a non-transitory computer readable medium (such as memory) 173B, bus 173C, input/output 173D and machine code 173E that in one form may reside on memory 173B. Significantly, the machine code 173E is predefined to perform a specific task in that it is taken from a machine language instruction set known as the native instruction set that may be part of a shared library or related non-volatile memory that is specific to the implementation of the processor 173A and its particular Instruction Set Architecture (ISA). In such circumstance, the ISA acts as an interface between the hardware of the processor 173A and the system or application software through the implementation of the machine code 173E that is predefined within the ISA. The machine code 173E imparts structure to the successive architectures of processor 173A, logic device 173, PCB assembly 170 and wearable electronic device 100, specifically in the form of a program structure that may be made up of a set of one or more individual codes. Individual portions of the machine code 173E, such as the machine code to cause a wireless communication module 175 to receive location or event data from a mobile beacon of a peripheral node 200 or the signally cooperative sensors $S_1 \ldots S_n$ and to transmit the received data using an LPWAN protocol form finite, tangible and identifiable structural limitations to the logic device 173, the hybrid wireless communication module 175 and wearable electronic device 100. Within the present disclosure, and absent any specific indication to the contrary, the term "event data" may include one or both of sensor-derived parameters from the sensors $S_1 \ldots S_n$ and location-derived data from various sub-modules 175A, 175B and 175C of the hybrid wireless communication module 175.

The hybrid wireless communication module 175 is made up of at least first, second and third wireless communication sub-modules 175A, 175B and 175C. The wireless communication module 175 is hybrid in the sense that it employs various forms of wireless signal receiving and transmitting. For example, the signals being transmitted from the beacons 200 as peripheral nodes can be received by a BLE, WiFi, RFID, NFC or related short-range signal-compatible radio that makes up a part of the first wireless communication sub-module 175A, while locationing signals being transmitted by a GNSS or related satellite-based source are received by the radio that makes up a part of the second wireless communication module 175B, and a third wireless communication sub-module 175C includes a radio for outgoing (that is to say, transmitted) LPWAN signals from the wearable electronic device 100 and the gateway 300. It will be appreciated that any combination of two or more of these different wireless communication approaches (as well as their related signal transmission protocols) may be within the scope of such hybrid wireless communication. Together, the logic device 173 and its structural components may cause the third wireless communication sub-module 175C to preferentially transmit the data received by the first wireless communication sub-module 175A when the wearable electronic device 100 is within a predetermined distance from a source of a signal emanating from the corresponding BLE beacon or other peripheral node 200, as well as cause the third wireless communication sub-module 175C to preferentially transmit the data received by the second wireless communication sub-module 175B when the wearable electronic device 100 is beyond the predetermined distance from a source of the BLE beacon 200 signal.

Within the present disclosure, the BLE-capable devices 200 may either form part of a larger system 1 that is based upon the PAN P and wearable electronic device 100, or in another form as an RFD that the PAN P and wearable electronic device 100 have access to and knowledge of its complete configuration. For example, in this latter form, the PAN P and wearable electronic device 100 may have significant identification information of the person assigned to the BLE-capable device 200 that is acting as the RFD. In addition, in situations where one or more of the wearable electronic devices 100 are within communication range with one another, their cooperation could provide indicia of them encountering the same population of BLE-capable devices 200. As such, contact tracing, proximity monitoring and related tracking may be performed on both healthy and already-infected people within a larger population with a greater degree of certainty. In situations such as this, additional security may in one form be achieved through an additional layer of encryption that would apply to devices and components such as the one or more BLE-capable devices 200 or other wearable electronic devices 100 that are within the communication range of PAN P.

In situations where enhanced levels of user privacy may be required (and in addition to the previously-discussed keys), recordkeeping of the sensed data could be achieved through additional anonymizing steps in order to correlate particular device ownership without the use of sensitive personal data (such as social security numbers, residence addresses, personal health data or the like). In one form, the BLE-capable devices 200 communicate a fingerprint or related device-specific data package, indicia or signature, such as the UUID, personal UUID, RSSI-based transmission protocol or the like. In one form, a rotating UUID may be used, where a beacon associated with a particular peripheral node 200 may broadcast an identifier that changes periodically. As long as some form of resolving service is coupled to the beacon to share an encryption key between them, such identifier can be resolved to stable, useful information. In one form, these devices could communicate a fingerprint/signature including UUID, personal UUID, RSSI information or the like as part of a recognition process. In one form, verification of the messages would be sourced through the wearable electronic device 100 and forwarded to the gateway 300 servers 400 and to the cloud 500. In addition, post-processing of the data may occur at various ones of these locations along the way, depending on the intended end-use of such data, computational requirements, time, expense or the like. Thus, in situations where the data may need to be anonymized and where at least a portion of such data is acquired by third-party BLE-capable devices 200, cooperative agreements may be formed by working with the manufacturers of such BLE-capable devices 200 to correlate security, wearer ownership, data anonymity or the like prior to contacting or otherwise notifying authorities of a potential disease outbreak. In this way, these third-parties may be thought of as a list of so-called "trusted vendors", particularly in situations where third-party variants of the BLE-capable devices 200 are not advertising or otherwise broadcasting to the public. Such an arrangement would allow the wearable electronic device 100 and the trusted vendor to communicate freely in the transfer of information that could be helpful in mitigating the spread of a virus or other contagious disease. In one form, such free exchange of information may take place at the cloud 500 where personal information would be transferred using high cyber-security assurance such as that available through known encryption technologies. It would also allow the wearable electronic device 100 to filter the noise of other devices and only focus on the ones of value or that are involved in the system. In another form, the security may be affected at the PAN P level such that encryption may take place between the BLE-capable devices 200 and the wearable electronic device 100 in an autonomous fashion.

Figure 3:
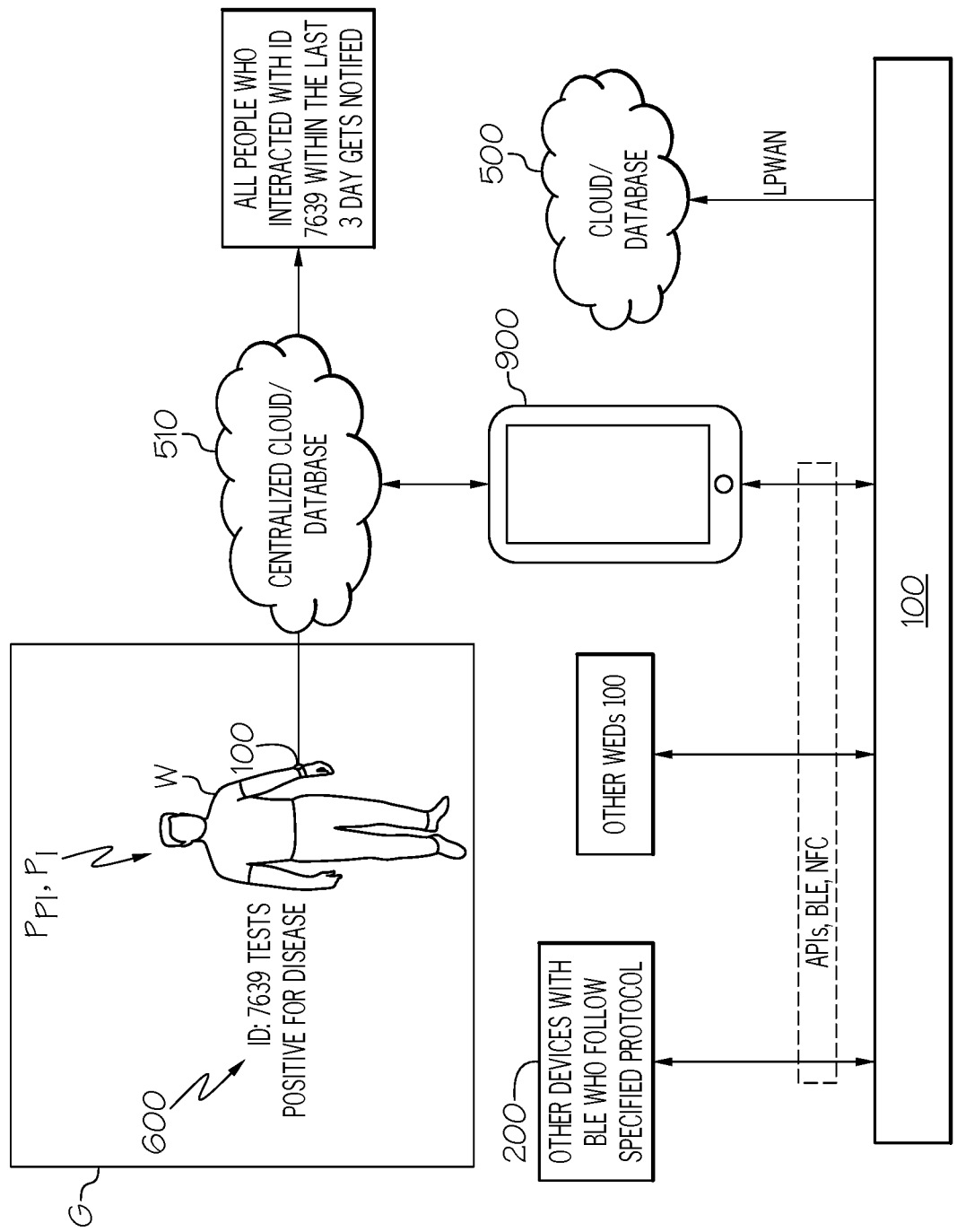
FIG. 3 depicts a simplified view of using the PAN of FIG. 1 to track a wearer that may or may not have been identified as being infected with a contagious disease.

Referring next to FIG. 3, in operation, the wearable electronic device 100 acts as the source (that is to say, primary, central or aggregator) node that dictates the operation of the PAN P can detect the presence of other wearable electronic devices 100 and BLE-capable devices 200 (collectively, the peripheral nodes) that are in the vicinity using BLE beaconing and scanning. Upon receipt of information (such as numerous positive ID tests for a given disease such as COVID-19 or the like), the wearer W may be considered at-risk as a possibly infected person $P_{PI}$ or infected person $P_I$.

In one form of contact tracing, instead of streaming all interaction data to a central database and querying that database when there is a confirmed (or otherwise positive) case and then notifying other people within a given at-risk population, the process may proceed in the reverse in a manner generally similar to computer virus software detection and reporting. As can be seen, the nature of communication between the wearable electronic device 100 and other devices such as mobile phones, other wearable electronic devices 100, BLE-enabled devices such as the BLE-enabled devices 200 that are discussed herein, NFC devices, other devices with suitably-equipped communication protocols and cloud 500 (which in one form may include numerous databases with which to store the acquired data from sensors $S_1, S_2, S_3 \ldots S_n$) is such that these other devices may serve as beacons. The dual direction shown by the arrows indicates that information taken from these other sources could be sent to the other wearable electronic devices 100. Various databases contained within the cloud 500 may include a centralized database 510 and a more specific database 520 that can cooperate with the data that is collected by the sensors $S_1, S_2, S_3 \ldots S_n$) and received through LPWAN from the wearable electronic devices 100, as well as with data taken from other sources as will be discussed next.

Continuing with the computer virus analogy, periodically (for example, every week, every month or the like), the centralized database 510 may be used to store information pertaining to all of the known virus cases, such as through digital signatures 600. Through suitable algorithmic or related analysis, the cloud 500 may in effect scan itself and the centralized database 510 to determine from all of the digital signatures 600 which ones meet a certain criteria, notably those where a particular virus or other infectious disease is confirmed (rather than merely suspected). Based on this analysis, the cloud 500 instructs the centralized database 510 to push a list of the digital signatures 600 of infected persons $P_I$ down to the more specific database 520. In this way, instead of having the centralized database 510 maintain of all of the interaction data of every individual everywhere, the more specific database 520 may be used to contain information pertaining to only the confirmed cases of infected persons $P_I$. Then every so often, display devices 900 (such as the mobile phone shown) will get an update of the list of confirmed cases within a given area (for example, within 10 miles of a GNSS location of the display device 900). Each display device 900 may then store an individual's personal interaction data and compare the confirmed cases with a history of that individual's personal interaction data. If a positive match is identified, an alert may be generated to bring to the attention of the individual associated with the display device 900 the need to get tested. In one form as shown, the display device 900 may also share this information through known telecommunication protocols to the wearable electronic device 100 to alert its wearer W.

In one form, a table of secure history of acquired data from a recent period (for example, from the last 14 days) may be stored in memory on the specific cloud database 520, after which periodic updates of confirmed cases of infection may be transmitted back to the wearable electronic devices 100 for an alert to be generated. In this way, the overall configuration depicted in FIG. 3 allows the system 1 to be adapted for performing contact tracing or proximity monitoring on one or more infected persons $P_I$ using peripheral devices 200 and the two-way communication between them and the wearable electronic device 100.

Thus, in this version as shown, the display devices 900 (as well as their telecommunication equivalents such as watches, tablets, personal digital assistants (PDAs) or the like) act as a beacon broadcasting and transmitting a suitable protocol such as Bluetooth, BLE or other IEEE 802.15.4-compatible modes of communication, particularly those configured for mesh-based interactivity. It is understood that BLE can be within such phone or smart device, thereby allowing such devices to act as the aforementioned beacons in the manner of the peripheral nodes 200. In such circumstance, the wearable electronic device 100 senses the RSSI or related beacon-based signal and converts it to a distance, as well as receives an anonymous token or related UUID to help identify the device from which the transmitted signal is being received. This information (about who the person is, and distance to the wearable electronic device 100, person-to-person or the like) may then be sent to the specific database 520 and then to the centralized database 510. If an individual within the population contracts a certain infectious disease (such as COVID-19 that is spread by the coronavirus), then the centralized database 510 is notified after which a notification may be sent to people who were interacted with during a certain time with the individual within the population that has contracted such disease. In one form, the LPWAN message that is transmitted from the wearable electronic device 100 to the specific database 520 could be to a Bluetooth gateway that then uses a LoRa-based or LoRa-supported) backhaul, as well as to other backhauls, such as WiFi or cellular, if needed.

By the operation of the system 1 in the manner depicted in FIG. 3, the disease rather than the person is being tracked. In that way, the functionality differs from that of tracking the location of an individual wearer W as discussed elsewhere herein, as well as in US Published Application 2019/0209022.

A geofence G may be formed around the various devices that make up PAN P as a way to provide privacy-enabled virtual location boundary alerts when other devices (including other wearable electronic devices 100 being worn by other individuals) move beyond or within a pre-established range. As shown, the geofence G may define various locations within its boundaries at a particular site, including that of the wearable electronic device 100 as a source node location, a range or distance (such as an RSSI or related straight-line distance) from the wearable electronic device 100, a communication range of the various non-source (that is to say, peripheral) nodes 200 within the PAN P, transmission times for message information, hop limits or the like. In one form, the geofence G may be defined as a static one to surround a physical structure within a given site, such as a building or similar structure. Although the geofence G is notionally shown having a rectangular boundary, it will be appreciated that such shape is non-limiting, and that geofence G may be defined as having any shape, whether geometrical or arbitrary. In another form, the geofence G may be defined as a dynamic geofence G consistent with the mobile nature of the wearable electronic device 100. Thus, unlike a static geofence G, the dynamic version of the geofence G may adapt to changing circumstances, which in turn provide a more accurate representation of other devices coming and going out of the PAN P. Geofence G may acquire location information for the source node wearable electronic device 100 or the non-source/peripheral nodes 200 through absolute or relative frames of reference. For example, an absolute frame of reference includes those available through a global navigation satellite system (GNSS), while a relative frame of reference includes those from localized sources such as RSSI, RFID, multi-beacon triangulation or the like.

In one form, the wearer W need not have been an infected person $P_I$, but instead could be anyone in a community, locality or region of interest. In such a circumstance, the wearer W may be able to track elderly individuals, children, physically or mentally handicapped persons or other people of interest in large, dense crowds such as at sporting events, cultural, religious or civic gatherings, or the like. In these high human density environments, the venue could be populated with multiple gateways 300 using their well-known positions and triangulation methods in order to help monitor the location of an at-risk population or other people of interest. Such a configuration may also be useful in establishing absolute (or near-absolute) location for contact tracing, quarantine monitoring and enforcement or the like in situations where the risk of a contagious disease spread is imminent or identified. In such circumstance, the wearable electronic device 100 could pick up any signals from nearby peripheral devices 200 as the wearer W moves about. In such a scenario, the wearable electronic device 100 acts as a mobile aggregator of BLE signals that it is receiving from these RFID-emulating BLE-capable devices 200, ingesting data and then conveying such data via the LPWAN gateway 300. In one form, the wearable electronic device 100 could ingest data in one of various ways, such as (i) encountering another wearable electronic device 100 that is within communication range, (ii) as a BLE-capable device 200 that in one form may function similar to a nurse call ID beacon, room beacon, elopement beacon or the like and (iii) as another external BLE-capable device 200 with fingerprint/signature capability through RSSI, UUID or the like. In the configurations depicted in both FIGS. 2 and 3, distance or relative location between the wearable electronic device 100 and one or more other wearable electronic devices 100 and peripheral devices 200 may be determined through various algorithmic approaches, such as coordinate transformation computations that use various RSSI, triangulation or trilateration approaches.

If the wearer W has been identified as having a particular condition such as a contagious disease that may require some measure of quarantining, and has in fact been confined to their home, a geofencing (or virtual boundary) capability of the wearable electronic device 100 can be employed in order to provide data (suitably transformed into distance or location) that is useful to an end user. This in turn allows wearers of BLE-capable and related peripheral nodes 200 to be signaled through the PAN P that they may be at heightened risk for infection through proximity to the infected wearer's wearable electronic device 100. Likewise, governmental authorities or other decision-makers may be signaled that other such wearers of the BLE-capable devices 200 may be at risk. In one form, when family members must self-segregate, PAN P could help alert other members of the family that they are getting too close to one another; as mentioned elsewhere within the present disclosure, such alerting may take place through haptic motors, visual or audio alarms. In a similar manner, nursing home, group home or prison population segregation may be better enforced. As such, besides using the wearable electronic device 100 for analyzing the change in an individual's health condition (including infected portions of a given population), other applications, such as for firefighters, schools (particularly those that deal with autistic children), military personnel, construction workers, police officers, emergency medical technicians (EMTs) and prison inmates or the like are also within the scope of the present disclosure. References in the present disclosure to the various forms of the wearable electronic device 100, as well as to the previously-mentioned aspects, are meant to indicate that such forms or aspects may include one or more particular features, structures or related characteristics particular to the end-use need, but that each such form or aspect need not necessarily include all such particular features, structures or characteristics, and that any claimed combination of such features, structures or characteristics in part or in their entirety as described herein is has a basis in—and is therefore deemed to be within the scope of—the present disclosure.

In one form, the static version of the geofence G may be enabled by beacons placed at points of ingress or egress, such as doors or windows. In another form, beacons may be placed on adjoining properties, such as on a neighbor's residence. In one form, such alerting as to a breach (whether ingress or egress) of the geofence G may again be through haptic, visual or audio means within the PAN P, as well as having the information sent to the backhaul after which a text message is then generated and sent to the person or persons of interest, keeping in mind that such an approach is slower than when sending the message exclusively within the PAN P. In one form, the peripheral devices 200 disclosed herein may possess the necessary beacon capability, while in another form, stationary or other mobile beacons as discussed in US Published Application 2019/0209022 may be used to assist the wearable electronic device 100 and PAN P in its geofencing functionality. It will be appreciated that while the beacons that may make up one or more of the peripheral devices 200 are generally understood within the present disclosure to be of a mobile variant (in that they may be affixed to a person, animal, robotic drone, or other readily-movable host), there is no need that all such beacons must be. For example, one or more of the beacons may be stationary (such as those that are affixed a building wall, or on permanently-installed equipment), and that either variant is within the scope of the present disclosure.

As mentioned previously, PAN P may in one form be configured to have mesh topology for use in the geofence G and related tracking. Within the present disclosure, a node within a mesh network is any signal connection point that can receive, generate, store or transmit message information along one or more routes that are defined within the network. Regardless of whether each node is a source node or a non-source mode, it is clear from the figure that they may be situated at different locations within PAN P. The wearable electronic device 100 generates messages and related information for exchange with these one or more non-source nodes 200 within the geofence G as long as these non-source nodes 200 are within communication range of the wearable electronic device 100. In response, one or more of the BLE-capable devices 200 and one or more sensors $S_1$, $S_2$, $S_3$ . . . $S_n$ may be made to respond to the geofenced information such that they can then transmit such information for reception to other BLE-capable devices 200 and one or more sensors $S_1$, $S_2$, $S_3$ . . . $S_n$ that are within a communication range of the particular non-source node 200 that is initially receiving the information from the wearable electronic device 100. Moreover, when configured as a mesh network, the various BLE-capable devices 200 and remote sensors $S_1$, $S_2$, $S_3$ . . . $S_n$ may assume additional hierarchical attributes; for example, a first of the BLE-capable devices 200 may receive the geofenced message information from the wearable electronic device 100 and then retransmit such information for reception by one or more other downstream non-source BLE-capable devices 200 that are within communication range of the first non-source BLE-capable device 200. In addition, the first of the BLE-capable devices 200 may determine whether its location is within the geofence G.

As previously mentioned, location or position information of the BLE-capable devices 200 and remote sensors $S_1$, $S_2$, $S_3$ . . . $S_n$ relative to the boundary of geofence G may be determined by various indoor or outdoor approaches, such as through (at least in outdoor geofence G situations) GNSS or related global positioning system (GPS), information provided by one or more fixed beacons or other approaches as disclosed in US Published Application 2019/0209022, while an indoor equivalent to geofence G may rely upon RSSI, triangulation or other known means. Based on information received from one or all forms of such indoor and outdoor sources, the location of the BLE-capable devices 200 and remote sensors $S_1$, $S_2$, $S_3$ . . . $S_n$ relative to the boundary of the geofence G may be ascertained with a relatively high degree of accuracy.

In one form, the wearable electronic device 100 could be placed on a robotic device (such as a drone or autonomous vehicle) in its data aggregation capacity. Such an approach could be particularly beneficial for situations where a disease outbreak is either suspected or already underway, thereby reducing unnecessary exposure of health-care workers and other personnel that are either tracking or responding to the outbreak.

Figure 4:
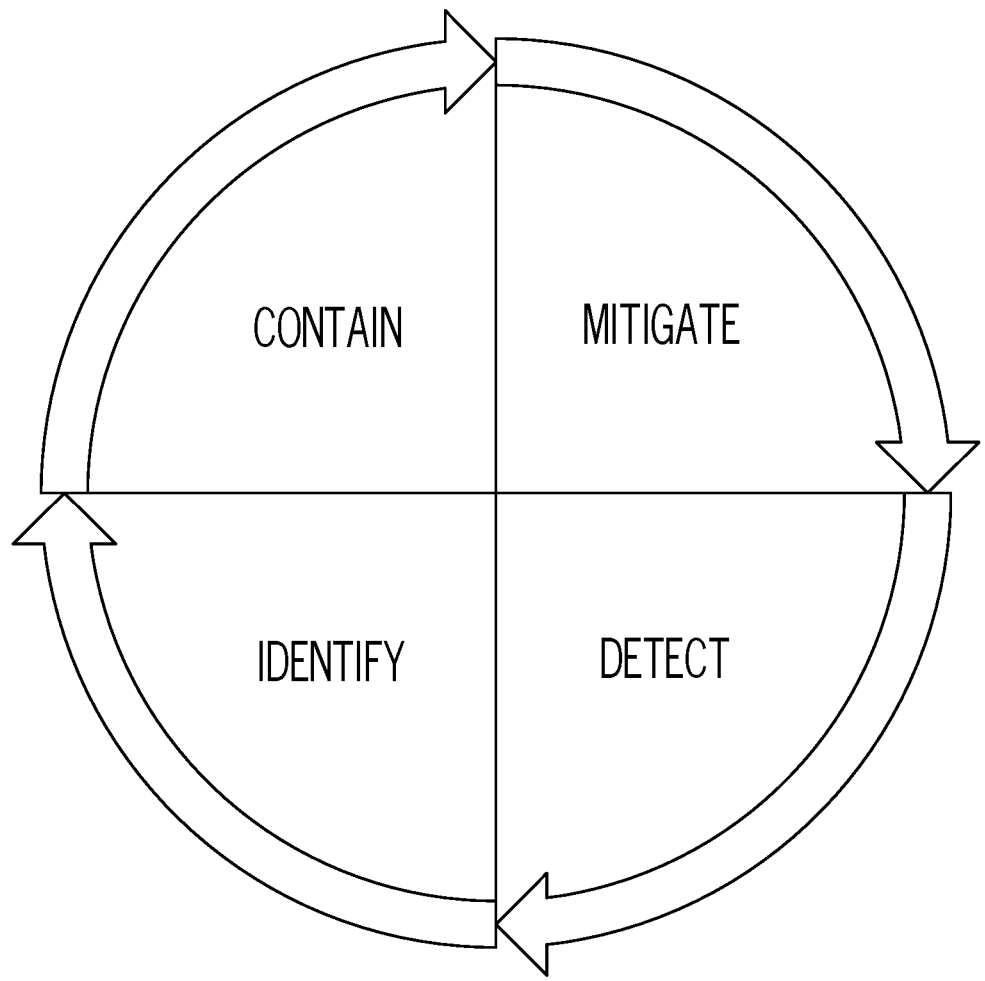
FIG. 4 depicts a perpetual circle showing a summary of strategies used to control the spread of a contagious disease and that includes identification and testing functions that can be performed by the PAN discussed herein.

Referring next to FIG. 4, a perpetual circle showing how to control the spread of a communicable disease or related event through a combination of mitigation, detection, identification and containment. The identification component of the perpetual circle can be in the form of contact tracing and other functions discussed herein through the use of the wearable electronic device 100, system 1 and PAN P. With the knowledge gained through the identification component, mitigation activities such as the use of personal protective equipment (PPE), adhering to social distancing guidelines and (in the case of individuals who are in a group environment) visitor control. Likewise, detection may include the use of testing, temperature screening and symptom monitoring. Lastly, containment may be in the form of isolating exposed individuals and quarantining positive cases. Because the wearable electronic device 100 may be used to track and perform contact tracing, while the dashboard 700 and contact report 800 (both as discussed as follows) may be used to document and inform interested individuals.

Figure 5A:
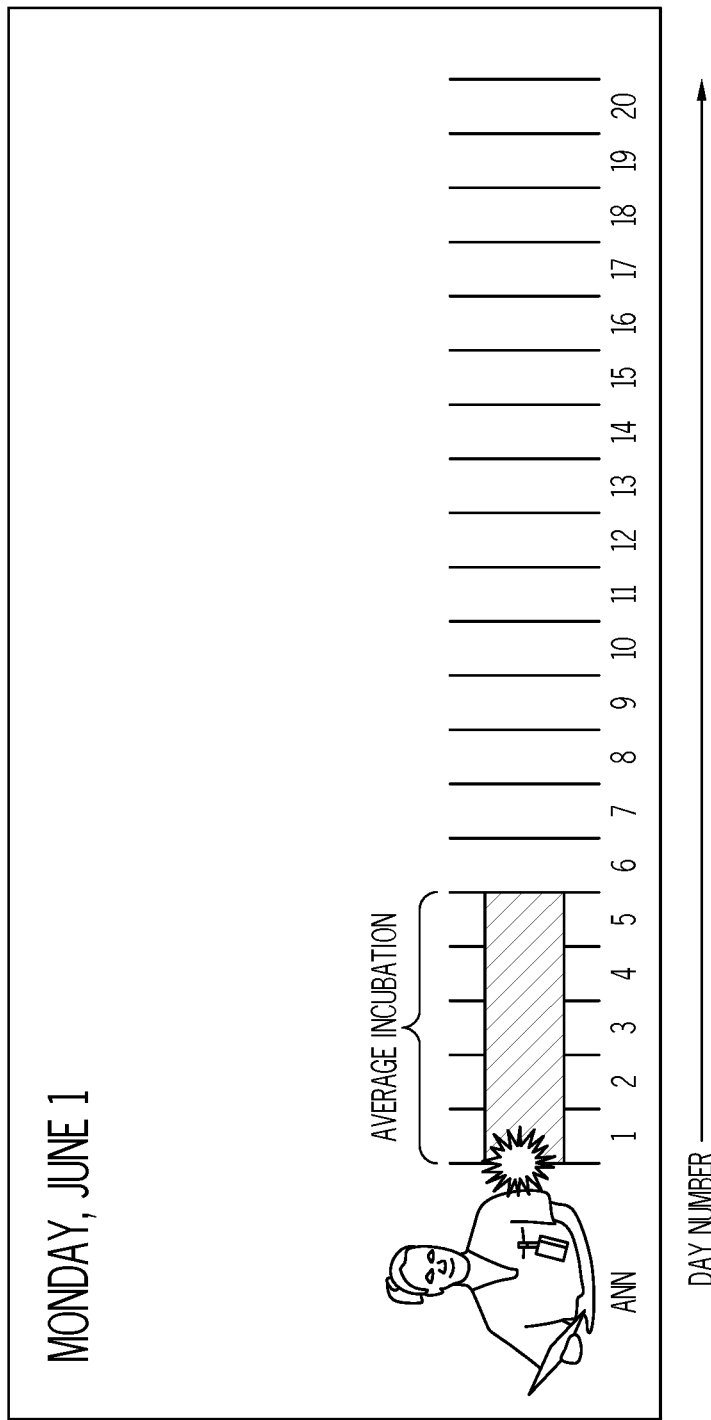
FIGS. 5A through 5D depict a conventional sequence of events of how an employee of a health care or related facility may infect at-risk residents of such facility to a contagious disease.
Figure 5B:
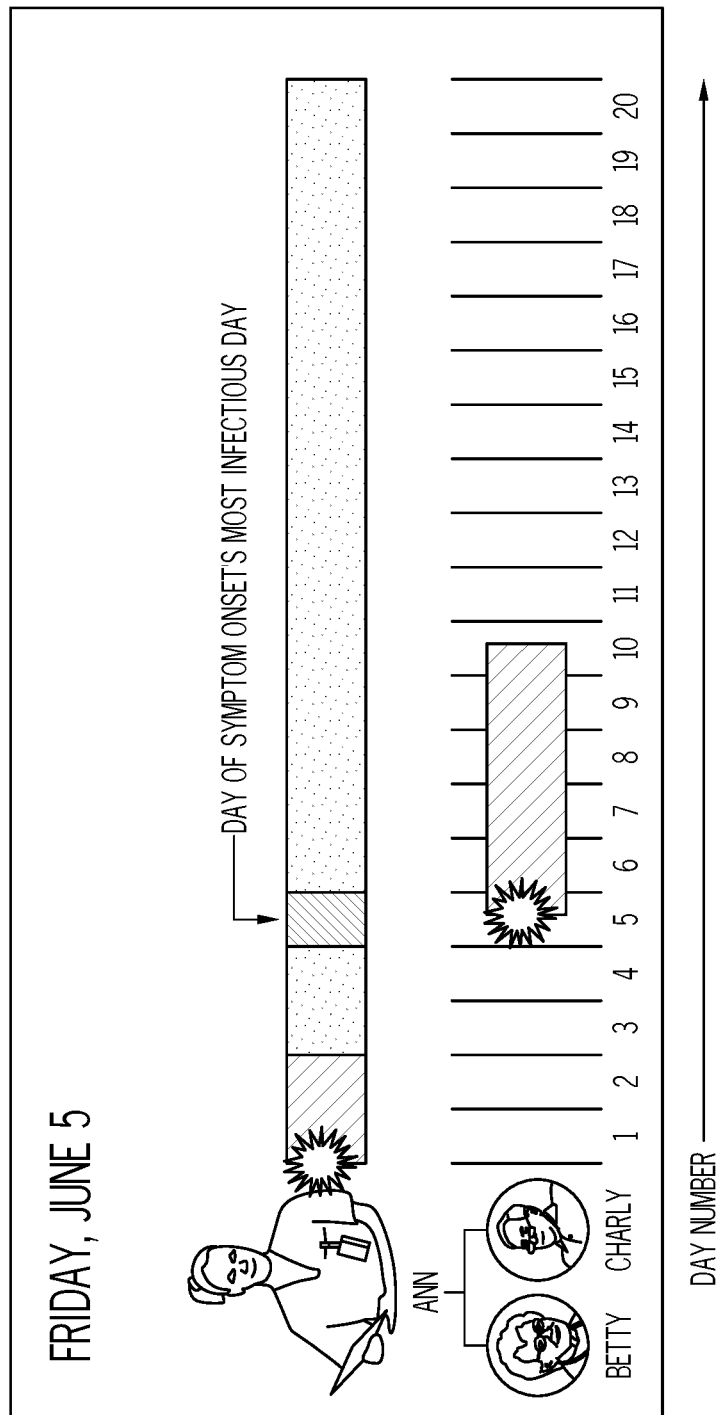
Figure 5C:
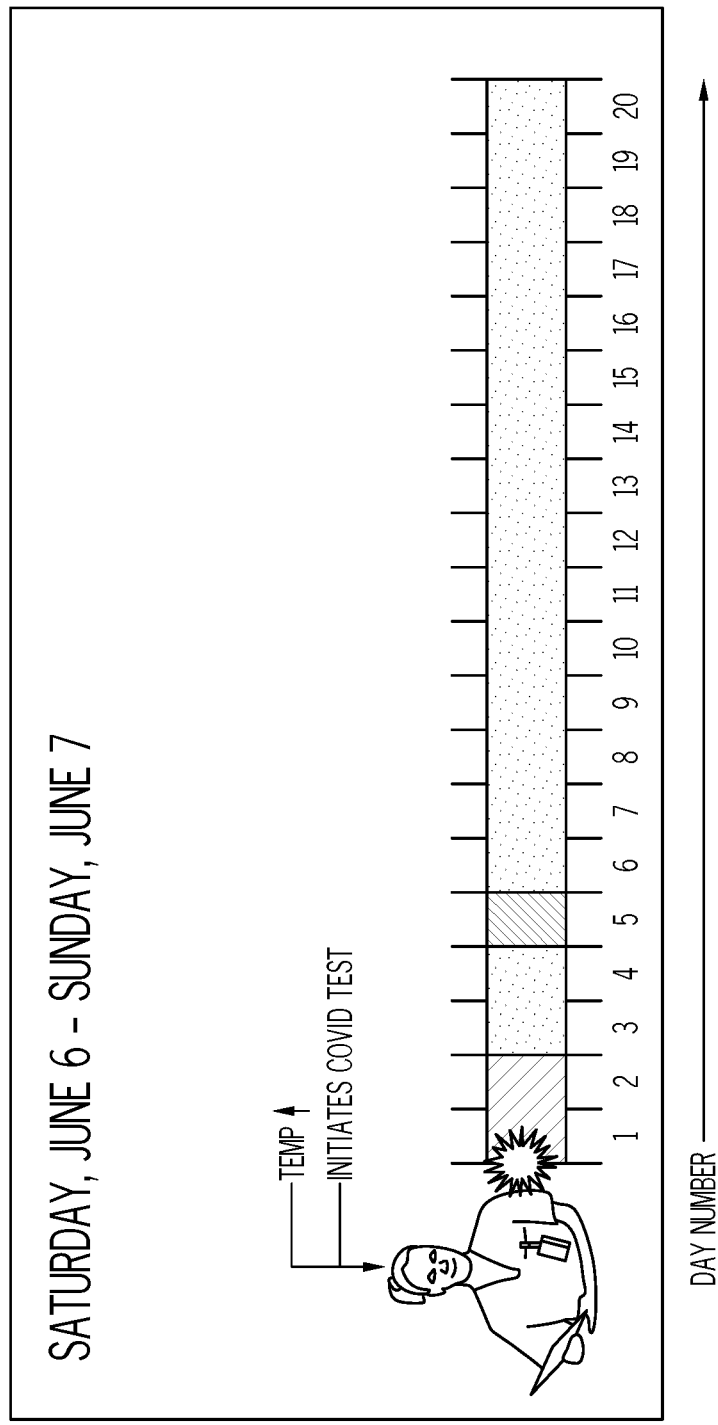
Figure 5D:
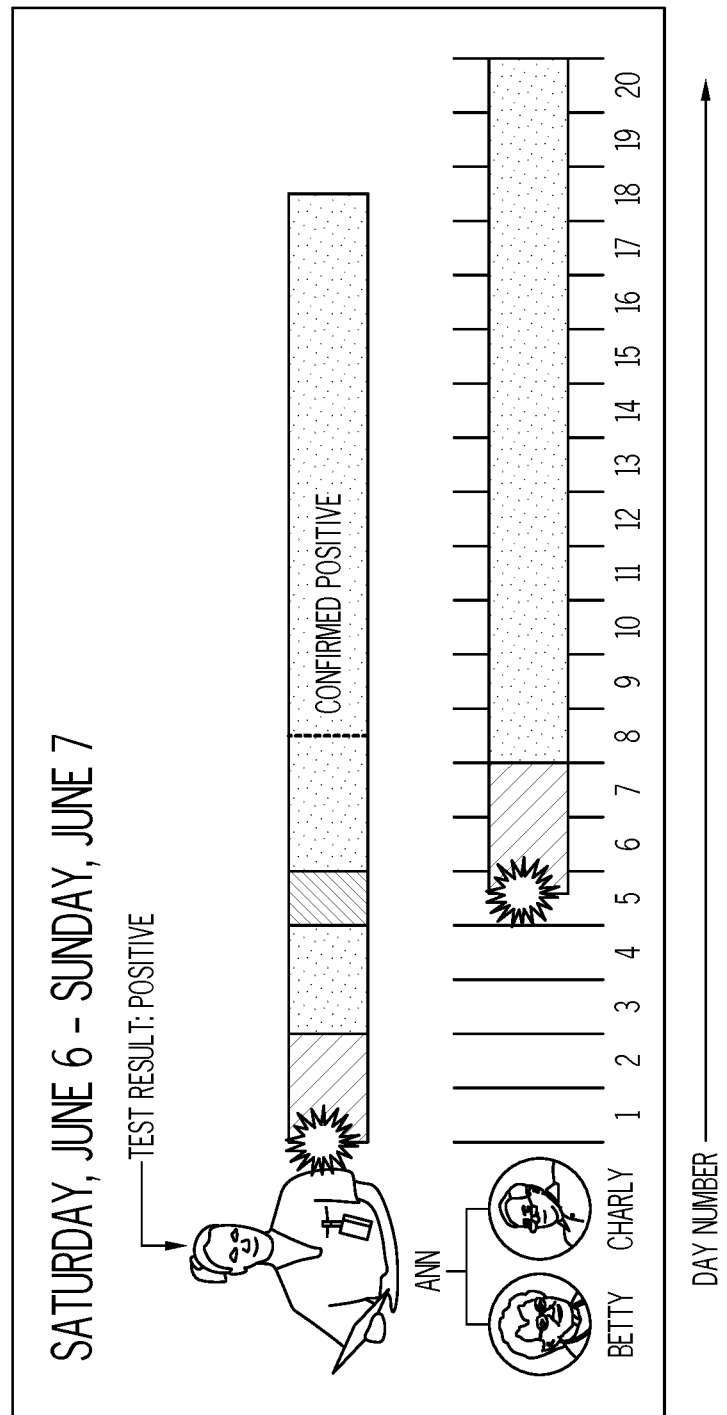

Referring next to FIGS. 5A through 5D, an example of a conventional approach to performing contact tracing is shown. Referring first to FIG. 5A, Ann, a nurse at Daisy Senior Living Facility, is exposed to SARS-CoV-2 on Monday, June 1. This is indicated as Day 0 on the horizontal timeline. It has been previously reported that due to known incubation periods, it may take approximately five days for Ann to begin developing any symptoms. Referring next to FIG. 5B, by Friday, June 5, Ann notices a runny nose and sore throat that she attributes to her allergies. Her temperature at this time is normal. While she doesn't realize it, this is the day that Ann is most infectious. Referring next to FIG. 5C, by Saturday morning, Ann has developed a fever and suspects that she may have COVID-19. She alerts her supervisor at Daisy Senior Living and goes for a COVID test. Unfortunately, her COVID test results will take a few days and the Director of Nursing that is in charge of contact tracing will not be back at Daisy Senior Living until Monday. Referring next to FIG. 5D, Ann's test comes back positive, and the Director of Nursing interviews Ann and also reviews last week's nursing assignments for the residents in order to determine who may have been exposed. During the interview, Ann recalls helping Charly with dinner but does not recall her brief but direct contact with Betty.

Referring next to FIGS. 6 through 9 in conjunction with FIGS. 1 and 3, use of the wearable electronic device 100 to overcome the shortcomings of the conventional contact tracing of FIGS. 5A through 5D is shown. In particular, by automating the contact tracing process, large teams of people, along with the concomitant potential for missed or incorrectly assessing a potential disease-spreading scenario are reduced or avoided. In this way, the accuracy with which contact tracing, proximity monitoring and hotspot detection on an infected person $P_I$ (such as Ann from the example discussed in conjunction with FIGS. 5A through 5D) is shown. In one form, it is important to keep data associated with the potentially infected person $P_{PI}$ confidential and secure, as not all cases identified as being potentially infected are in fact infected. Moreover, in certain circumstances, it may be important to keep data associated with the infected person $P_I$ similarly confidential and secure. One way to determine if an individual is infected is to subject the individual to testing or other procedures. Upon testing and the attainment of certain metrics (some of which may be determined by the machine learning models and analysis discussed herein), the potentially infected person $P_{PI}$ may be labeled or otherwise identified as testing positive and thus designated as an infected person $P_I$. In any event, all individuals who have been tested may be given a digital signature 600.

Figure 6:
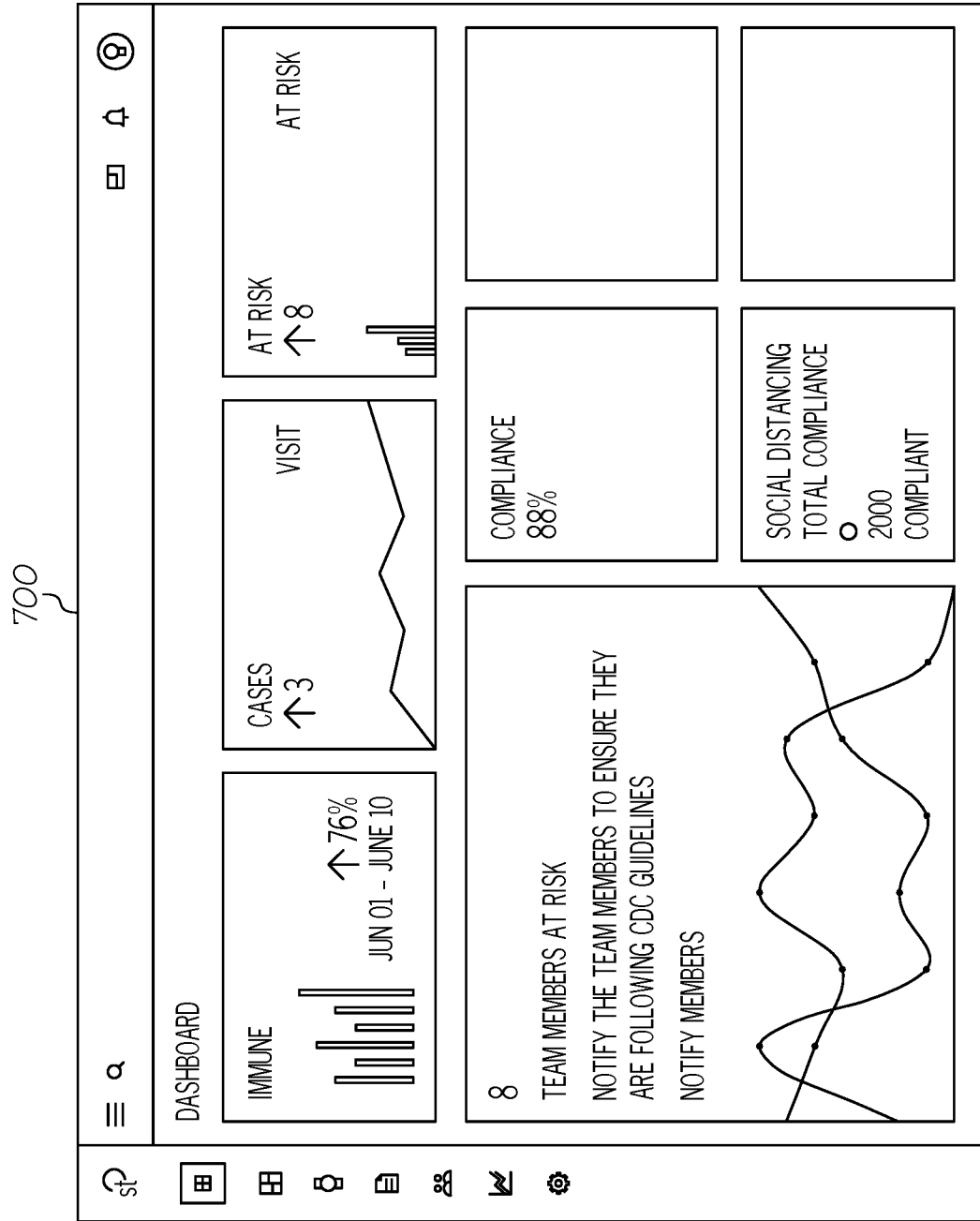
FIG. 6 depicts a notional dashboard used with the PAN disclosed herein to provide organization management for persons who may be at elevated risk of potential exposure to a contagious disease.

Referring with particularity to FIG. 6, a dashboard 700 may be used to provide displayed-based information of an event or analysis (including machine learning analysis) of an event. In one form, the dashboard 700 is configured as a web-based enterprise dashboard that can be customized (such as for a system administrator) to better manage devices, users, reports or the like. In one form, the dashboard 700 may be used for registration functions, including configuring an event-based registration such that attributes associated with people, locations, timing, incidents, adjacent environment and related content for a particular situation may be collected, recorded and categorized so that profiles may be generated for subsequent use. In one form, the dashboard 700 may be used to provide user-defined rules for the detection, proximity monitoring, contact tracing and hotspot monitoring discussed herein. In this way, when a disease outbreak occurs within a local community, the system 1 automatically generates a report of all individual that were within certain criteria thresholds such as one or more of minimum distancing, duration or the like.

Figure 7:
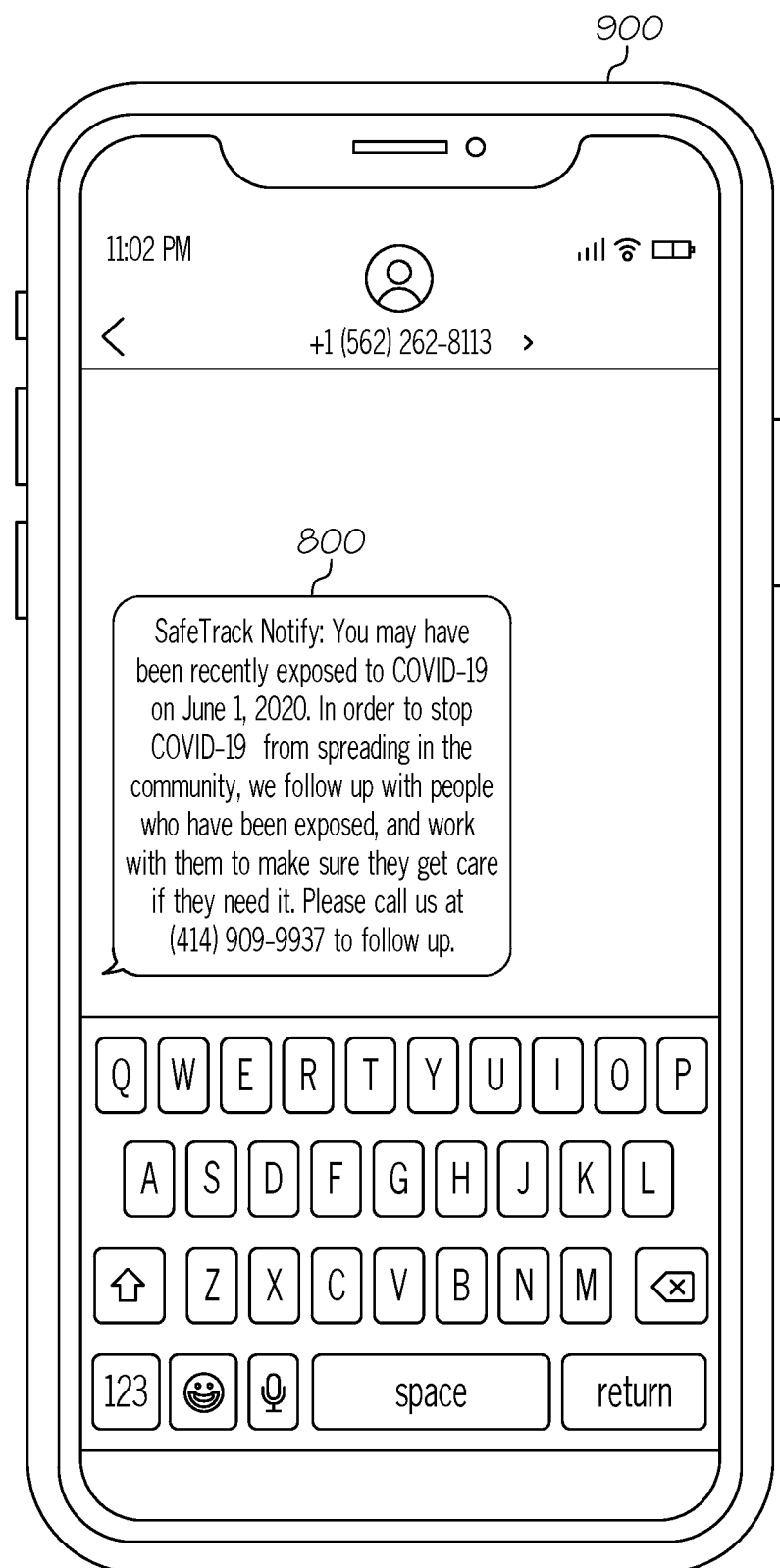
FIG. 7 depicts a notional display such as a mobile phone screen and that is used with the PAN disclosed herein to provide a notification to the one viewing the display that they may be at elevated risk of potential exposure to a contagious disease.

Referring with particularly to FIG. 7, a contact report 800 may be generated and sent to the display device 900 (such as a mobile phone screen or the like) for viewing. In one form, the dashboard 700 of FIG. 6 may be used to help configure information provided to the display device 900. For example, if the display device 900 is an employee's mobile telephone, a mobile API can be used to work in conjunction with the dashboard 700 to provide employee access to risk levels based on identified interactions, analyze past interactions, provide testing resources, healthcare provider contact information or the like. In one form, the report can be run for a specific case or group of contacts. The report 800 can be made to connect with an electronic medical record (EMR) or a case management software. The report 800 may also aggregate or display information from a nearby public health authority (PHA) or related organization that is tracking the spread of particular disease. In this way, once a case of an identified or identifiable disease occurs, the system 1 can automatically notify all close contacts through e-mail, SMS, texts, telephone calls or the like. In one form, additional functionality such as periodic check-ins with the infected person $P_I$, visitor management or the like is also provided.

Referring with particularly to FIG. 8, the contact report 800 may be in the form of a notification 810 that may be generated and sent to the display device 900 that is presently within the infected person's PAN P. In one form, the same display device 900 may receive the message if such display device 900 was determined to have been within the infected person's PAN P of the infected person $P_I$ within a preset prior time frame. In one form, use of one or more of the wearable electronic device 100, system 1 and PAN P automatically identifies direct contacts, close contacts and proximate contacts. By way of example in a healthcare facility context where nurses and other employees that are expected to have interaction with patients or residents have access to the information being generated by such wearable electronic device 100, system 1 and PAN P, such information may be used to allow the nurse or other employee to quickly generate the contact report 800 or its associated notification 810.

Figure 9:
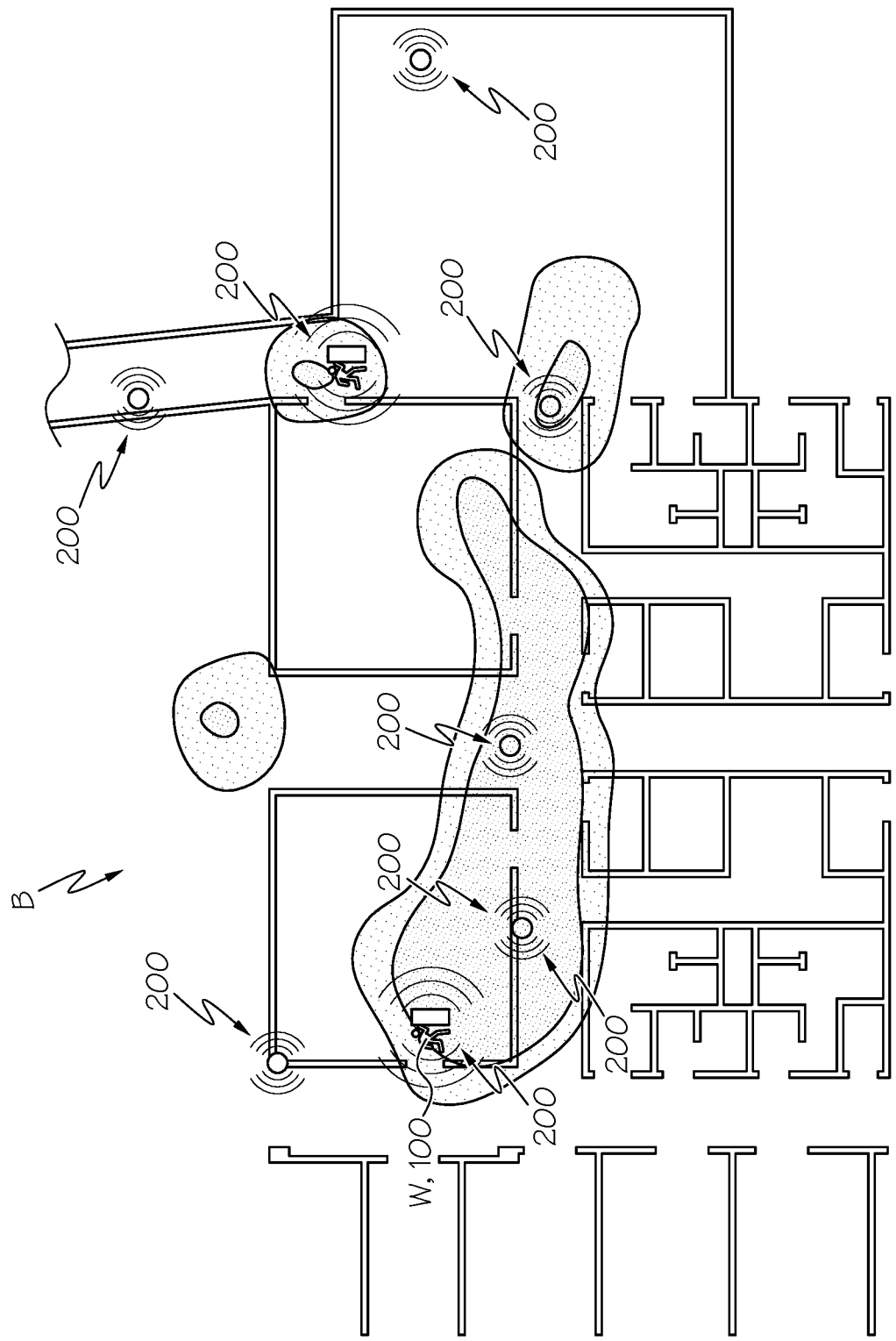
FIG. 9 discloses a room-based indoor tracking within a multi-room building where both point-of-departure warnings and color-coded representations of locations within the building of an individual that is being monitored with the wearable electronic device of FIG. 2.

Referring with particularity to FIG. 9, a thermal map hot-spot is shown overlaid on a multi-room building B. This shows the frequency with which a wearer W that is associated with the wearable electronic device 100 spends in a particular location, where such amount can be one or both of an aggregate of the number of times the individual visits a particular location as well as the amount of time (for example, in seconds, minutes or hours) spent in such location. For example, if the location is indicated to be a bathroom, and sensor data additionally acquires movements consistent with tooth brushing (such as turning on a water faucet, reaching for a toothbrush or toothpaste, and repeated small movements adjacent the individual's mouth), an inference can be drawn that the individual is brushing his or her teeth. In another form, if certain devices within the building B are configured with IoT capability (such as a smart toothbrush, to continue the present example) such that they can form one or more of the peripheral nodes 200, the wearable electronic device 100 and is associated PAN P can sense such data and proceed accordingly. It will be appreciated that such ability to acquire an individual's movement and location data is particularly helpful when other sources of wireless signal transmission (such as WiFi) are not available due to location, signal blockage, depth below ground or thickness of the building B or the like.

Referring next to FIG. 10, a flow diagram of how the wearable electronic device 100 and the data acquired therefrom may be used to develop a machine learning model. In one form, the machine learning model and related algorithms and approaches disclosed herein may be part of a larger endeavor known as human-in-the-loop (HITL) learning where additional insights gleaned from the human labeling or annotation of at least a portion of the data is used along with subsequent (often empirically-based or experienced-based) validation, particularly during training and associated testing activities.

In particular, the flow diagram forms a program structure in that it is depicted as an ordered sequence of particular and tangible steps associated with the previously-mentioned machine learning workflow 1000. In one form, this ordered sequence may be used to provide predictive analytics to assist in contact tracing or related diagnoses as discussed herein. This sequence may include one or more of the following steps: (1) a raw data acquisition (first) step 1100; (2) a raw data cleansing or preprocessing (second) step 1200; (3) a feature extraction (third) step 1300 of derived values which may include placing the data into feature vector or related form; (4) a training (fourth) step 1400 for iterating the machine learning algorithm through testing, calibration or (in the case of HITL) additional insights gained from human experience or other observations; and (5) a model use or (fifth) step 1500 with which to operate the trained machine learning model on some or all of the acquired data in order to draw inferences from such acquired data. It will be appreciated that the first three steps 1100, 1200, 1300, as the data management portion of the machine learning workflow 1000, may be performed independently—as well as part of—the training step 1400 and inference step 1500 for any particular machine learning-based analysis. Likewise, some or all of these steps may be performed on a remote computing platform, where at least the first, second, third and fifth steps may be performed either on the wearable electronic device 100, and that all such variants are within the scope of the present disclosure. In one form, the process of converting data that is taken from sensors $S_1, S_2, S_3 \ldots S_n$ into a form suitable for use in a machine learning algorithm may form part of an activity known as extraction, transformation and loading (ETL) that may make up part of the previously-discussed second and third steps 1200, 1300 of the machine learning workflow 1000. Within the present context, ETL may be used to decompose multi-sensor data into a suitable feature vector within a given feature space.

The use of the information generated by collection of sensed data (such as the aforementioned LEAP data, including data acquired by the various sensors $S_1 \ldots S_n$) by the wearable electronic device 100 and PAN P may be done in a spatio-temporal way that helps to better perform a time series analysis to in turn better identify the likelihood of spread of a communicable disease. In one form, the time series nature of the acquired data (for example, ambulatory data) can be subjected to predictive analytics (including analytics arising out of the use of one or more of the machine learning models discussed herein) as a way to predict or otherwise forecast arbitrary future location, activities or behaviors.

Such temporal data may include—in addition to time stamping—frequency of occurrence, duration of occurrence, elapsed time between occurrences, running averages of occurrences or the like. In one form, the measurement of the temporal data helps in establishing norms, such as those that may form part of an inter-patient or intra-patient baseline data. This indexing of the data over the time dimension is valuable in helping to identify movement traits, patterns or the like that in turn may be correlated to interactions with other people and which may bring to bear additional data for the determination of a possible spreading event. As with other forms of acquired data, the temporal data may be subjected to a feature extraction process (such as included in step three of the machine learning workflow 1000) in order to allow comparison of potentially disparate pieces of information. For example, because various activities $S_1, S_2, S_3 \ldots S_n$, it may be beneficial to recognize such activities over one or more time-sampled sliding windows. Because the received data is unlikely to be identical (even for the same individual performing the same activity), it may be helpful to use statistical or structural filters in order to transform the raw data into a set of feature vectors for each given window.

Figure 11:
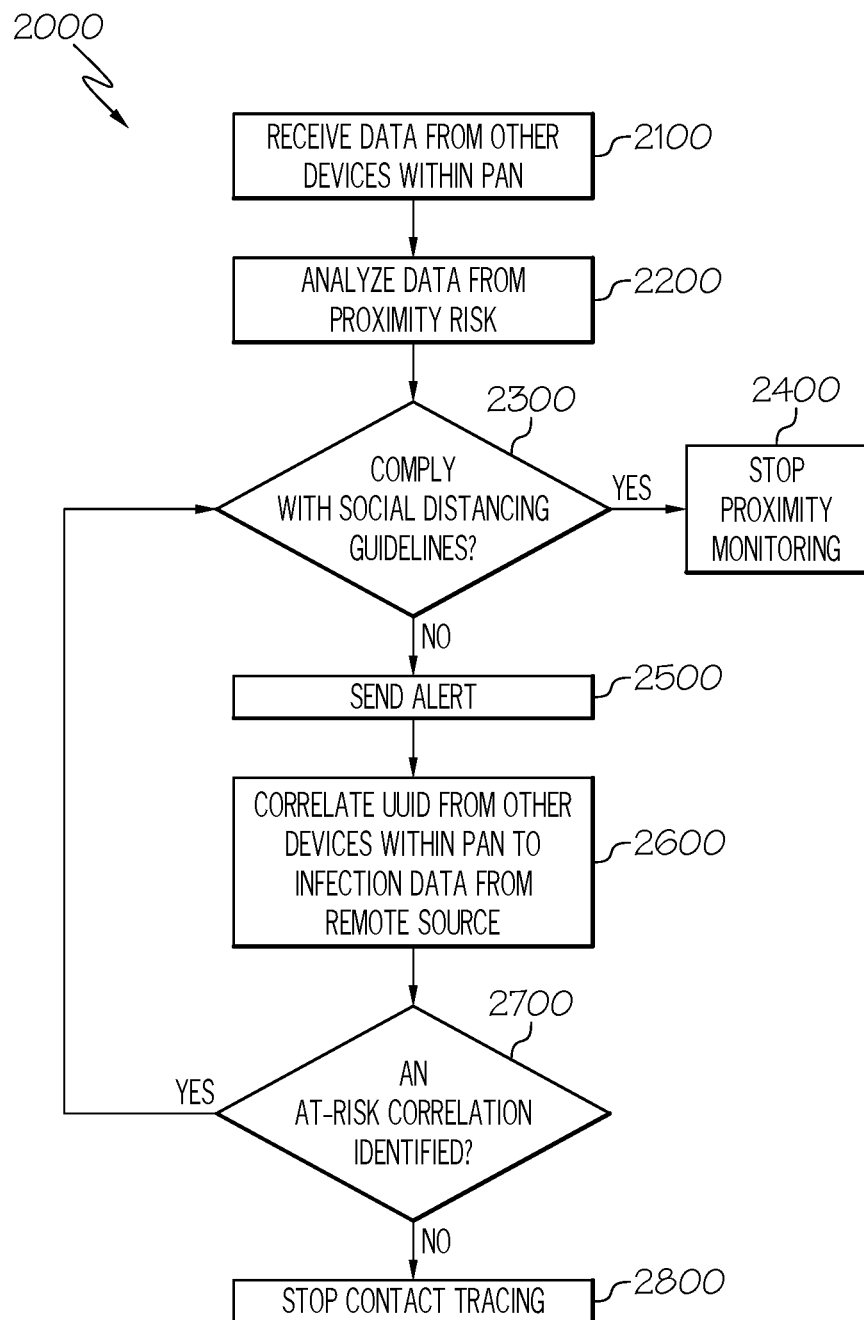
FIG. 11 depicts a program structure in the form of a flow diagram of how to perform at least one of contact tracing, proximity monitoring and hotspot detection.

Referring next to FIG. 11, a program structure 2000 in the form of a flow diagram of how to perform at least one of contact tracing, proximity monitoring and hotspot detection is shown. Although not shown, it will be appreciated that the geofence G of FIG. 3 may be set up in addition to—or in place of—one or more of these functionalities. In one exemplary form, the flow diagram forms the program structure 2000 while various arrays (including multidimensional arrays) of event data, linked lists, trees or the like form data structures. Both of these forms of structures constitute specific, tangible features or elements that may recited in one or more of the claims and that help to illustrate the architecture and operation of the various forms of the wearable electronic device 100, PAN P and system 1. Thus, by describing the various computer software elements in conjunction with the various functional activities that are depicted in the flow diagram of FIG. 11 (as well as all related flow diagrams that are not presently shown but that correspond to particular contact tracing, proximity monitoring, hotspot identification or geofencing activities as discussed herein), the machine code 173E cooperates with one or both of the processor 173A and memory 173B to perform a set of particular manipulations of the acquired event data (including its LEAP data variants) to constrain the operation of one or both of the wearable electronic device 100, PAN P and system 1 in a particular way for the purposes of identifying patterns that may be useful in preventing the spread of a communicable disease.

Initially, event data is received from one or more of the peripheral nodes 200 (which may correspond to one or more devices associated with, carried by or worn by other people) into the wearable electronic device 100, this is shown as event 2100. Second, proximity risk data may be analyzed based at least in part on location data that corresponds to a distance between the wearable electronic device 100 and the peripheral node (or nodes) 200, this is shown as event 2200. Next, an inquiry may be made in event 2300 may be generated to determine if social distancing guidelines are satisfied by the proximity risk data. In the event that such distancing guidelines are satisfied, no further proximity monitoring may be needed, as shown in event 2400, while event 2500 shows that an alert be sent in the event that social distancing guidelines are not satisfied by the proximity risk data. Event 2600 includes correlating information that uniquely identifies particular ones of the peripheral nodes 200 to infection data (such as that from the cloud 500 or other remote database) in order to determine at event 2700 whether or not a contact risk has been confirmed. Depending on whether there is or is not a risk determines whether the inquiry returns to event 2300 or terminates at event 2800).

In one particular form (not shown) of the program structure 2000, a method of contact tracing may include configuring a wearable electronic device to form a source node for a personal area network, determining, by the wearable electronic device, if at least one peripheral node is within wireless signal communication of the personal area network, acquiring, by the wearable electronic device, event data that is being transmitted thereto from the at the least one peripheral node, wirelessly transmitting, by the wearable electronic device, at least a portion of the acquired event data to a receiver using an LPWAN that is enabled by the wireless communication module, wirelessly receiving over the LPWAN, by the wearable electronic device, information pertaining to a first individual, correlating, by the wearable electronic device, the information pertaining to the first individual to the at least one peripheral device and in the event that the correlation establishes a positive match, informing, by the wearable electronic device, a second individual that such second individual is at risk of being exposed to a communicable disease.

Figure 12:
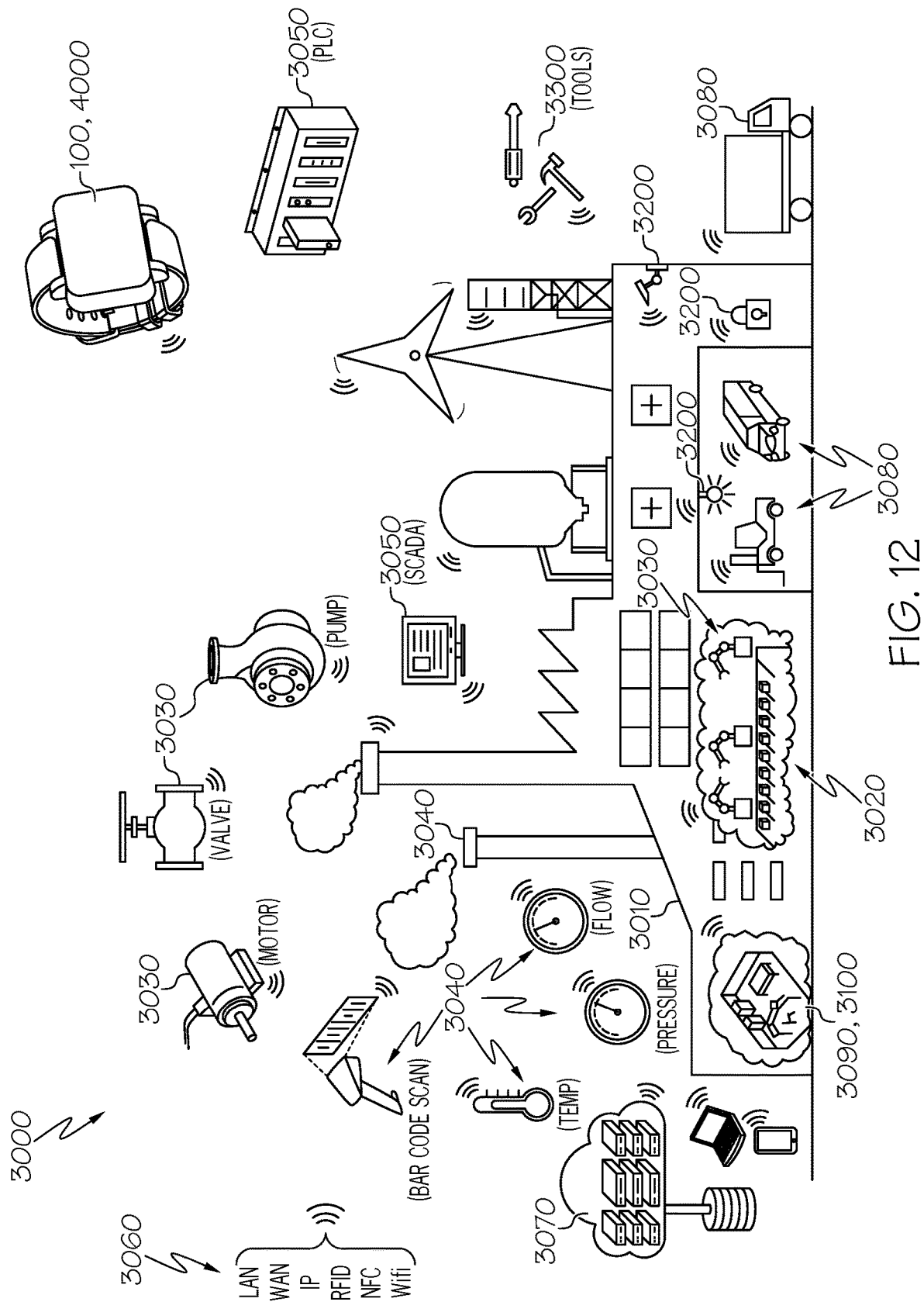
FIG. 12 depicts an industrial setting that is configured to operate with the wearable electronic device of FIGS. 1 and 2.

Referring next to FIG. 12, the wearable electronic device 100 forms the basis for a scalable technology stack (also referred to herein as an IoT platform) that may be used as an enterprise platform, industrial control system or network, industrial analytics platform, data processing system, system for the performance management (including optimization) or related control of one or more IoT devices, process automation or the like to build systems with or manage the operation of various connected devices or assets (in either case, the so-called "smart devices" as previously discussed) and their applications within an industrial setting 3000. In such a stack or platform, as will be discussed in more detail as follows, a layered architecture promotes the modular interconnection of software, hardware, communication, data management and end user applications through the wearable electronic device 100 and its long-range mode of wireless connectivity, optionally in conjunction with the short-range mode of wireless connectivity through the PAN P in order to extract actionable insights from the various connected assets. In such case, both the wearable electronic device 100 and the PAN P become an industrial device, industrial asset, industrial system, industrial communications platform or the like.

In one form, the industrial setting 3000 may include (among other things), numerous industrial assets in the form of one or more buildings 3010 (which in one form may resemble the aforementioned building B), one or more production lines 3020, robotic equipment (which may include ancillary or standalone components such as pumps, valves, filters, motors, tanks, piping or the like) 3030, actuators and related IoT edge data gathering and manipulating devices (collectively referred to as field devices) 3040 that are applied at or near a process and used for registering or influencing inputs, outputs, equipment or other parts of an industrial processes, control equipment (such as programmable logic controllers (PLCs), power equipment and ancillary components) 3050, networking infrastructure (including wired or wireless WANs and LANs and internet equipment with associated protocols) 3060, computers (including servers and other data management or related equipment made to interface with or provide some of the functionality of the PLCs and other control equipment, as well as for mobile or portable platforms such as phones, tablets, laptops or the like that may perform one or more of computation, control and communication functions) 3070, industrial vehicles (such as trucks, forklifts, farm equipment or the like, including autonomous driving variants of each) 3080, data center 3090 and administration 3100. It will be appreciated that the listing of various components or equipment for the various industrial assets is used for semantic purposes only. For example, servers, computers and related data processing and networking equipment will be understood to exist in one or both of the networking infrastructure 3060 and computers 3070 such that these and variants thereof are deemed to be within the scope of the present disclosure. While not shown as distinguishing between the various levels that take place within the industrial setting 3000, it will be appreciated that some of the assets shown are commonly associated with device level functionality, some with system level functionality and some with the business (that is to say, enterprise) level functionality as will be discussed in more detail in relation to the ISA-95 standard that may be applied to the industrial setting 3000. In a similar way, the manufacturing operations management (MOM) and processes disclosed herein that may be performed in the industrial setting 3000 may be represented pictorially by the so-called five-layer (or five-level) automation pyramid of management, planning, supervisory, control and field functions that may generally correspond to various enterprise, business unit, facility, production line and field operations.

The building 3010 may be embodied as a single building (as shown) or numerous buildings (including those that are contiguous or otherwise connected, as well as those in disparate structures as present in a campus-like setting) such that all such variants are deemed to be within the scope of the present disclosure. Within such a building 3010, various subsystems in addition to the assets and equipment that are the focus of the industrial setting 3000 enterprise, such as elevators, heating, ventilation and air conditioning (HVAC), lighting and electric, security, air quality monitoring or the like (collectively subsystems 3200) may all be configured to be monitored or operated upon in a manner similar to the other items identified in the industrial setting 3000 by a communication network 4000 various embodiments of which will be discussed in more detail in conjunction with FIGS. 13 through 17. As will be discussed in more detail as follows, various forms of the communication network 4000 may be broken down into various sub-networks within the industrial setting 3000, such as depending on whether such sub-network is predominantly or completely associated with either the short-range wireless communication functionality of the PAN P or the longer-range wireless communication functionality of the LPWAN. For example, a first industrial setting communication sub-network may correspond to the PAN P while a second industrial setting communication sub-network may correspond to the LPWAN. Likewise, the breakdown of the various sub-networks may be based on the various architectures of the communication network 4000 as shown in FIGS. 13 through 17. In addition to subsystems 3200, stock items 3300 (such as tools, high-valued finished articles, products or the like) may also be similarly monitored or operated upon by the communication network 4000. When suitably configured with such a communication network 4000, the building 3010 may acquire autonomous features where smart devices, edge computing, machine learning and the resulting analytics impart at least some self-sustainable attributes without the need to seek recourse to the cloud 500 or other extra-enterprise data processing and analytics. In one form, the deployment of the assets within the industrial setting 3000 is relatively fixed such that once in place, the assets tend to be stationary. In another form, the deployment of the assets within the industrial setting 3000 may be somewhat arbitrary, such as to accommodate changes in scaling, layout, new equipment, news processes or the like. It will be understood that the particular manner of asset deployment under one or the other of these forms may dictate the topology of the communication network 4000.

As was previously noted, the authors of the present disclosure have developed PAN P to collect data from nearby sensors or other devices and then wirelessly send the data to a larger network (including, as presently described, the communication network 4000) through the wearable electronic device 100 and its LPWAN mode of long-range wireless connectivity. Within the present disclosure, such other devices include the field devices) 3040 that in one form include actuators in general and linear or rotary actuators (either electrical, pneumatic or hydraulic (including fluidic versions of this last)) in particular. These and other actuators are commanded to change state (for example, opening or closing) by either the wearable electronic device 100 as the source node within the PAN P, the cloud 500 or elsewhere within the backhaul. In the case of such actuator being commanded by the cloud 500 or other parts of the backhaul, then the data corresponding to such command may be routed from either the wearable electronic device 100 or a suitably-equipped local peripheral node (that is to say, one that includes a processor with suitable communication and input/output functionality) to an actuator system made up of the actuator plus its means of communication, whether wired or wireless. It will be appreciated that data that is acquired or generated by the field devices includes (but is not limited to) calibration data, control data, device identification data, diagnostic data, historical data, measurement data, parametric data, production data (such as quantities, qualities or throughput of manufactured goods), state data or the like.

Although the industrial setting 3000 is presently shown as a factory, it will be appreciated that it may also include a foundry, warehouse, production facility, supply chain facility, laboratory, research facility, clean room, agricultural farm, underground or above-ground mining or processing facility, real estate building control system, shipping container port or the like, including such sites, facilities or locations where such operations take place within a single building 3010, a campus-like setting with multiple buildings 3010 (or even without any buildings 3010) or other related structure or set of structures where articles that are intended to be introduced into the stream of commerce may be made, fabricated, stored, created, invented, assembled, grown, mined or the like. Relatedly, the industrial setting 3000 is understood to include those found in industrial titles described by the North American Industry Classification System (NAICS) Code and its respective sub-titles. Relatedly, other enterprises or industries, such as commercial air, marine and ground transportation, mining and related mineral extraction, oil & gas (including one or more of extraction, refining, transportation or storage, particularly including offshore oil platform operations), chemical or nuclear processing, energy production (including electric power utilities and related grid electric demand management), wastewater treatment, order-fulfillment operations or commercial enterprises related to healthcare, hospitality or the like are understood to qualify as the industrial setting 3000. It will be appreciated that these and all such variants are within the scope of the present disclosure. Furthermore, buildings 3010 unrelated to the industrial setting 3000 but that are used for other purposes that may not have direct applicability to the industrial or commercial processes disclosed herein but that nonetheless are configured where tactical situations may arise where prompt, reliable knowledge of people and their locations or access level, authorization, certification, credentials or other indicia of their identity or location may be configured with one or more the features disclosed herein as a way to improve the health, safety and accessibility of such people. Such tactical situations may include those related to firefighter, police, emergency medical technicians (EMTs), military personnel, utility installation and service personnel, as well as others where precise knowledge of locations, local conditions within such locations, activities, physiological data or other sensible information in order to perform a process or otherwise respond to a specified or rapidly-changing scenario is needed. These too, along with their variants, are within the scope of the present disclosure.

As previously mentioned, the wearable electronic device 100 may take on various form factors, depending on who or what it is to be affixed, attached or otherwise secured. It will be appreciated that in some embodiments where the wearable electronic device 100 is affixed or otherwise situated on or near a particular industrial asset, it may assume a non-wearable form, including those with supplemental means with which to affix it to such asset. Such supplemental means may include adhesives, fasteners or other related and known approaches. In such form factors, each is still referred to as the wearable electronic device 100 notwithstanding that it is not actually worn by an individual. In a similar manner, the sensors $S_1$, $S_2$, $S_3$ . . . $S_n$ and related peripheral nodes 200 (which themselves may have sensing and related data acquisition capability, as well as optional embedded data processing and other so-called "intelligent" functionality) may, depending on whether they are (i) physically secured to or otherwise form a part of the wearable electronic device 100, or (ii) discrete components that are separate from, but in wireless communication with, the wearable electronic device 100 (such as through the PAN P), be configured as either mobile or stationary, static devices, depending on the role they play in data gathering in the industrial setting 3000. Relatedly, it will be understood that in form factors where the wearable electronic device 100 is used exclusively in a non-human-wearing capacity, the PAN P remains as (that is to say, functions in the same manner as) a personal area network even though there is no personal human involvement. In use cases where the wearable electronic device 100 takes on a non-wearable form factor, or in use cases where mobility is not required, the wearable electronic device 100—as well as other end nodes such as the sensors $S_1, S_2, S_3 \ldots S_n$ and related peripheral nodes 200—may be adapted to have mains-based power or other forms of supplemental power, such as through a low-voltage USB adapter or the like. As with the nomenclature for the listing of components or equipment for the various industrial assets, it will be appreciated that the terms used to describe the various source nodes or devices, peripheral nodes or devices and end nodes or devices are used for semantic purposes only, as the context will make it clear which term is being applied to a particular one of such node or device.

There are various ways to use the communication network 4000 as a control network that may exploit one or more of the computers 3070, data center 3090, administration 3100 and other assets in order to carry out management-based actions or related various activities that are associated with operating the industrial setting 3000 as a data-driven enterprise. In one form, the wearable electronic device 100 forms the basis of a wireless version of such control network such that the cooperation of one or more of the computers 3070, data center 3090, administration 3100 or the like may conduct an analysis on the acquired data, such as which end nodes of the various connected devices will be used to provide the data, which types of data, which analytics to use on the data, which systems are connected to the data and what actions may be taken in order to continue or alter operations of one or more assets within the industrial setting 3000. Each of the layers of such a control network that is based on the IoT platform are discussed briefly as follows.

Connected control stations or base stations may be established as the end user application layer. In one form, event data, identifier data for one or both of a user and the various devices, analytics and other intelligence that is generated either within connected devices, at the edge, facility WAN (often with dedicated servers or the like) or cloud 500 (which may be understood to include a serverless architecture notwithstanding possible server-based passthrough connectivity as shown in FIG. 1) is presented for the purpose of providing one or more of process visualizing, simulation, monitoring, alerting, life cycle analysis and control, as well as integration of business systems, security or the like to administration 3100 or other interested users within the enterprise that is associated with the industrial setting 3000. Moreover, use of the wearable electronic device 100 within a wireless control network promotes ease of network reconfigurability that may be needed as processes, layouts and particular equipment needs change. Furthermore, by using the LoRa-based communication that is inherent in the wireless communication module 175, difficulties associated with full environmental coverage of the wireless control network is reduced, as the lower frequency mode of transmission and large link budget are capable of reaching pieces of equipment that may otherwise suffer from electromagnetic interference (EMI), shadowing or other range-reducing problems. In addition, as will be discussed in more detail as follows, wireless mesh-like arrangements of the wearable electronic device 100, various end nodes, gateways 300 and intermediate nodes enable one or both of P2P and multi-hop connectivity and data packet relay or routing. Such a configuration further improves wireless control network range, reliability, coverage and related figures of merit.

In one form, the data management layer of the IoT platform provides cloud or platform analytics and related insights on the acquired data, such as through Microsoft IoT, the aforementioned AWS IoT Core or the like. As discussed elsewhere within the present disclosure, where such data is actually collected, preprocessed and analyzed may take place in numerous locations and through devices including—in an edge-based configuration—the wearable electronic device 100, whether through machine learning models or a priori-based algorithms. Examples of operations performed within this layer include one or more of data warehousing, the formation of one or more rules engines, ETL and machine learning and related data analytics. Significantly, the edge-related functionality enabled by the wearable electronic device 100 may be configured commensurate with the needs of the industrial setting 3000. In this way, the allocation of computational activities between the wearable electronic device 100 as the edge and the backhaul resources (which may be less constrained in energy use, processing power, memory capacity or the like) may be made to take place either exclusively at the edge, exclusively within the backhaul, or as a hybrid combination of both.

In one form, the communication layer of the IoT platform provides the management of the connected equipment or assets. Examples of operations performed within this layer include protocols for routing and relaying of acquired data, as well as for the modes of operation of the LPWAN. In some abstractions, the functionality of the data management and communication layers may overlap; for example, relating to when and how analytics are performed, such as within equipment traditionally associated with either purely communication or analytics capability now being capable of performing operations within each other's traditional domain.

In one form, the hardware layer of the IoT platform provides numerous services with which to cooperate with the various devices within the communication network 4000. Examples of such services include one or more of device monitoring, OTA upgrades, network control network deployment configuration and SDKs for suitable libraries, drivers, modules or the like. As with the functionality that may bridge the data management and communication layers, in some abstractions, the functionality between the communication and hardware layers may overlap, such as for edge-based functions of the gateway 300 that enables a flow of the data. In one form, the gateway 300—along with choices in operating systems, hardware, logic device 173 processing paradigms or the like—may be used on intelligence-capable (that is to say, IoT-based, connected) devices as well as legacy-based ones. In some configurations, the gateway 300 may act as an edge-connected translator between disparate communications protocols that are present along the data-gathering, LPWAN and backhaul continuum. In one form, the gateway 300 and wearable electronic device 100 may cooperate in an edge-based autonomous configuration where real-time data generation, analysis and process control may be automated without having to rely on cloud 500 or other backhaul functionality as a way to provide actionable insights, such as to administration 3100.

A technical problem within traditional forms of an industrial environment relates to how to control the operation of machinery, equipment and other industrial or tactical assets, as well as to how to establish secure, reliable control of a flow of information between such assets in an efficient way that does not contribute to infrastructure cost and complexity, whether as part of ongoing operating expenses (OPEX)

or longer-term capital expenses (CAPEX). For instance, in a typical industrial environment, where configurational changes to machinery, equipment or the like may need to be made, the time and effort required to upgrade, retrofit and integrate such changes can result in significant production downtime, as well as possibly impact equipment reliability and interoperability or worker safety. Moreover, such traditional modes of operation make it difficult to ensure that information relating to machine or equipment operability, access and productivity is being conveyed promptly and accurately to users and decision-makers. Likewise, because many modern factories, warehouses, production facilities and related industrial environments have significant investments in communication equipment with which to provide the needed exchange of sensing, operating, personnel, equipment or asset monitoring, security, inventory control and other forms of data, any changes or impairments to the timely and reliable flow of such data would be detrimental to the affected enterprise.

Another technical problem within such settings relates to how to detect proximity and location between personnel and the assets with which they may interact. Modern facilities have myriad and complex communication needs that can be incompatible with one another, as well as some that do not work as intended, particularly where numerous competing wireless protocols may be present simultaneously, where the facility is spread over numerous floors or different buildings, or where machinery, equipment and facility structural needs may hamper traditional wireless communication operability some of which may suffer from one or more of line-of-sight, bandwidth, range, power use or other shortcomings.

In this regard, aspects of the present disclosure utilize various combinations of data capture, data integration, transmission and analysis to provide the information and data being generated by disparate pieces of equipment or machinery as a technical approach to achieving process or sequence optimization and related production or configuration improvements within the industrial setting 3000. In particular, the approach disclosed herein uses location, proximity and other information in conjunction with remote, edge-centric data-informed analytics in order to provide real-time or near real-time understanding of the operation of one or more pieces of equipment or personnel within the industrial setting 3000. A technical benefit arising from the use of the advanced data gathering, analysis and operational control of the communication network 4000 within the industrial setting 3000 is thereby ensured, even in situations where changes to one or more pieces of equipment (including their operational status, as well as the interaction of personnel with such equipment or machinery) has been made.

The technical solutions disclosed herein bring about several technical effects. One aspect of the technical solution to the aforementioned problems is to automatically collect data related to industrial or tactical assets and personnel that interact with such assets, as well as to automatically communicate the data over disparate wireless communication protocols and over different architectures of the communication network 4000. Another aspect is to analyze, report and—if necessary—act upon the collected data. Both of these aspects are achieved for the industrial setting 3000 by using the wearable electronic device 100 and PAN P of FIG. 1. In this way, the wearable electronic device 100 acts as a platform for data collection, edge computing, wireless device connectivity and machine learning, thereby simplifying software- and hardware-combined solutions for the operation of an industrial or tactical process. Another aspect of the technical solution is to improve machine-to-machine (M2M) communication, as well as improve environmental and situational awareness by fusing together data collection, transmission, analysis and reporting, as well (as needed) to perform some or all of the analytics in a distributed, hardware-agnostic manner. As such, the IoT platform based on the wearable electronic device 100 enables one or more of the aforementioned assets that make up the industrial setting 3000 to work together to collect data in order to track operational characteristics either instantaneously or over time to provide business intelligence or related analytics that would be impractical or impossible with existing technologies.

As was previously discussed, predictive or preventative maintenance (rather than traditional condition-based maintenance, with its attendant preventive attributes based on static, pre-determined criteria) of a particular device is one form of predictive analytics that may be performed. For example, the various connected devices within the industrial setting 3000 may be subjected to software that is performing a predictive maintenance solution in order to maintain or even improve the up-time of the various assets, equipment or the like. In one particular form, such predictive maintenance may be performed autonomously through the edge functionality and machine learning provided by the wearable electronic device 100 and its connected equipment, nodes or the like. With particular regard to the various components, pieces of equipment and buildings depicted in FIG. 12, the IoT platform and its associated communication network 4000 can also provide transparent insights into what is actually happening within the process, as well as correlate past and current events taking place within the industrial setting 3000, which is particularly valuable for situations where one or more conditions within the process, equipment or environment change.

In one non-limiting example, in automating or otherwise performing an industrial process, the robotic equipment 3030 is responsive to control signals being provided by other equipment, such as the control equipment 3050 in general and one or more PLCs in particular. By way of example, this extends the connected device paradigm such that a mere on-premise mode of operation (such as a PLC providing direct control over one or more pieces of equipment such as a pump, valve, motor or—in the case of robotic equipment 3030—a robotic controller, robotic arms, servo driver and motor, imaging equipment or the like) is either supplemented or supplanted by providing real-time, edge-based analytics and control over such equipment. Significantly, remote control or monitoring of connected assets may be implemented by using the LPWAN-based wireless communication capability of the wearable electronic device 100 (either in its mobile form or when some or all of its functionality, such as the wireless communication module 175) is physically affixed or otherwise associated with a particular connected piece of equipment, machinery or related asset. In a particular manner, remote PLC control may be established through the wireless connectivity discussed herein. Such remote forms of control are particularly advantageous in industrial settings 3000 that may be inaccessible or otherwise present significant health or safety risks to personnel, such as in or around chemical or nuclear processing equipment, oil and gas (including one or more of extraction, refining, transportation or storage) or related energy production facilities (including electric power utilities and related grid electric demand management), offshore oil platforms, steel plants, automobile assembly lines, wastewater treatment facilities, order-fulfillment facilities, scrap metal recycling facilities or the like. Moreover, by freeing up PLCs from application-specific modes of operation, they become much simpler to modify in response to changes in equipment, process, manufacturing, production or other needs within the industrial setting 3000. In a similar manner, remote monitoring through the communication network 4000 is particularly useful in connected devices or nodes that are inaccessible where mere read-only modes of operation are needed. It will be understood that the PLCs and related pieces of equipment that function as controllers, actuators or the like may be considered as a source of data that can be analyzed by the IoT platform.

Next, a technical rationale for implementing the communication network 4000 as part of an IIoT approach is provided. In one form, the physical layer devices or pieces of equipment depicted in FIG. 12 are in signal communication with various data processing and storage infrastructure that perform many of the service layer functions through one or more communication or network layer protocols, such as Bluetooth, WiFi, 4G, 5G, RFID, API, TCP/IP, message queue telemetry transport (MQTT) or LPWAN. With regard to the connectivity between the wearable electronic device 100 and the backhaul and administration 3100, the authors of the present disclosure have discovered that using LoRa as a physical layer as part of an LPWAN-based protocol is the best way of implementing the communication network 4000, particularly as a way to provide low frequencies and greater link budgets for longer communication ranges and in-building signal penetration than configurations based on nearer-field protocols, while avoiding the high-bandwidth costs of cellular-based or geosynchronous-based satellite networks. Moreover, they have discovered that of the LPWAN protocols (and depending on the degree of scalability required for the communication network 4000), LoRaWAN is particularly beneficial for certain operational activities, including those where single-hop (or even multi-hop in some cases, as will be discussed in more detail as follows) wireless communication is being used for at least a portion of the communication network 4000 within the industrial setting 3000. Lastly, they have discovered that in situations where LoRaWAN is not the most appropriate protocol, it may be supplemented or supplanted by other mesh-centric protocols, including those used either (i) on top of the LoRaWAN MAC layer or (2) instead of the LoRaWAN MAC layer, in either case to provide the corresponding relaying or routing functionality.

Management and control of the various service layer functions, including data, event, resource and backup/security, may be used to permit application (or content) layer interfacing, analytics and decision-making, whether at administration 3100 or elsewhere the latter of which may be the case where control functions and systems are based on distributed architectures. In one form, the devices, systems and methods disclosed herein may be used as part of an industrial software-based approach to either supplement or supplant more traditional industrial automation operations such as supervisory control and data acquisition (SCADA), remote terminal units (RTUs), building automation system (BAS), building management system (BMS) or other operational technology is deployed within the industrial setting 3000. It will be appreciated that the communication network 4000 that is centered around the wearable electronic device 100 is configured (that is to say, designed or constructed to be used in a particular machine, component, piece of equipment or related asset within the industrial setting 3000 in a particular way) to provide the data required to allow timely decision-making about a particular asset, process and related operations by promoting edge, cloud (whether public or private, including architectures involving the use of multiple clouds) or facility-based networking and database management of such operations. Moreover, by incorporating the intelligence that arises out of the data acquisition, processing, analytics and wireless communication that is enabled by the IoT platform into enterprise or manufacturing software such as enterprise resource planning (ERP), enterprise resource management (ERM) or manufacturing execution systems (MES), control over and scalability of the industrial setting 3000 is improved, particularly when operations and processes performed therein can be viewed in conjunction with other parts of the aforementioned automation pyramid.

Significantly, even in legacy-based ERP, ERM or MES situations, the machine learning and edge functionality enabled by the wearable electronic device 100 results in system upgrades where a simpler machine connectivity approach can improve data-informed insights to process control and management operations relative to apriori algorithms that rely upon fixed parameters and static thresholds from which to take action. Examples of where such improvements are possible include input/output, PLCs, DCS or the like, regardless of being implemented in a serverless cloud-native per-use as-a-service (aaS) platform or an edge, facility, container-based or related autonomous platform. In one non-limiting form, the data being generated by the connected assets within the industrial setting 3000 and analyzed locally (that is to say, either partly or substantially entirely on the wearable electronic device 100) or elsewhere (such as the servers 400 or the cloud 500) may correspond to how parameters of a given process, assembly line or piece of equipment may be changing over time. For example, the data may be subjected to one or more of the machine learning models discussed herein for the purpose of providing predictive or related analytics in order to help a decision-maker (such as in administration 3100) make adjustments to the given process, including plan for equipment maintenance, upgrading or replacement. In another particular form, MES—coupled with the communication network 4000—may be used as part of a digital simulation or virtualization of an actual or contemplated industrial process; this will be discussed in more detail elsewhere. Regardless of their implementation, the various ERP, MES or MOM, SCADA, control (such as PLC or DCS) and field operations will be understood to fit within their respective portions of the aforementioned five-layer automation pyramid.

As noted elsewhere, one way to promote data management for the purpose of conducting edge computing operations is to perform certain amounts of data pre-processing, such as to reduce the burden on memory, connectivity or bandwidths associated with the various nodes that make up the communication system 4000. Such processing (which may include various forms of data compression such as cleansing, dimensionality reduction, telematics-based dark data management or the like) may pertain to any or all of the data that is generated or transferred between the PAN P and the wearable electronic device 100, as well as between one or more of the servers 400, cloud 500 (either public or private), internet I (including an industrial internet), facility WAN (that is to say, on-premise server-based network, regardless of in a wired or wireless format) and the wearable electronic device 100. As with the machine learning process that leads to the trained (that is to say, inference-ready) model itself, additional machine learning may be provided once the model has been trained; such additional machine learning may be used to optimize model performance through compression-based pruning, precision modulation or compiling activities. Such model optimization is particularly beneficial for model deployments on energy-constrained devices, where edge-based model running and related analytics may be made to take place with lower power consumption. Additional edge functionality is enabled by one or more of open architectures and distributed approaches (including distributed processing) that may be used herein. For example, communication or network layer protocols, such as the previously-discussed MQTT (either directly or on top of another broker such as a websocket secure (WSS), hypertext transfer protocol (HTTP) or other such related middleware approach), may be used for data-laden messaging as part of such an open architecture, while open platform communications (OPC) and its Unified Architecture (UA) may be used for process control (including automated machine vision variants some of which may employ machine learning-based analytics as discussed herein) and other forms of industrial-based automation. In this way, various services related to device software, data and control may be implemented in the wearable electronic device 100 in order to allow it and other devices that are cooperative therewith to operate in a more universal (that is to say, agnostic) manner, regardless of particular hardware or software configurations. In conjunction with this, semantic data structures and their associated models may be used to further promote interoperability among disparate hardware and software implementations, including for various information models, MES and SCADA-related storage, accessing and sharing. In a particular form, such an edge intelligence platform may be configured to operate as or in conjunction with the PLCs as a way to control the operation of robotic equipment 3030, assembly lines, monitoring equipment or other equipment and processes of FIG. 12.

As previously mentioned, the long-range network communication channel or channels may be formed from an LPWAN-based protocol stack in general and one based on LoRaWAN specifically with suitable layers within the TCP/IP or Open Systems Interconnection (OSI) models. In a similar way, the basic architecture for managing the flow of data between the one or more of the PAN P and the wearable electronic device 100 and the various pieces of equipment that make up the industrial setting 3000 may be thought of a modular one where the IoT platform as a technology stack is made up of a physical (or device) layer, communication (or network) layer, a middleware (or service) layer and an application (or content) layer. In one form, the communication layer is where the communication protocol (such as Modbus, Simple Network Management Protocol (SNMP), OPC UA, Building Automation and Control networks (BACnet) or the like) is established between the wearable electronic device 100 and the various assets, components or other pieces of equipment within the industrial setting 3000. In view of the use of LoRa-compatible protocols discussed herein, a protocol interface or converter gateway (which in one form may mimic or otherwise incorporate some or all of the features of the gateway 300 discussed herein) may be included in order to facilitate input/output communication between the wearable electronic device 100 and the connected assets, equipment, components that make up the industrial setting 3000 and some of which may be using one or more of the Modbus, SNMP, OPC UA or BACnet protocols. In one form, such conversion may include going from wired to wireless connectivity, depending on the nature of the asset. In one form, and as with the gateway 300, such converters, interfaces or gateways may include field-selectable modes of operation commensurate with their level of involvement in the communication. Thus, they can include full gateway modes, as well as those with reduced capacities as bridges or repeaters. Such flexibility is particularly useful within the industrial setting 3000 where mixed used of the assets (such as between new assets and retrofit or legacy assets) may be present. In one form, the functionality provided by such interface, converter or gateway allows control system or network overview of the acquired, processed and analyzed data to be displayed, either within administration 3100 (either with or without SCADA, RTUs, BAS, BMS or a related operational technology supervision or oversight), a separate display 900 or on the wearable electronic device 100.

In such an architecture, the various components, such as the production lines 3020, robotic equipment 3030, field devices 3040, control equipment 3050, networking infrastructure 3060, computers 3070, industrial vehicles 3080 or the like, may be abstracted as part of the physical layer. Similarly, various management-related activities of resources, events, data and system recovery may be abstracted at the service layer in order to analyze the various pieces of data in order to put such data into a form that may be used by a decision maker, such as one or more individuals that may be associated with administration 3100. In addition, the content (that is to say, the end user application) layer may abstract how information is presented to a user, such as through a suitable stationary or mobile dashboard-based interface of FIGS. 6 and 7, including those that function as human-machine interfaces (HMIs) or graphical user interfaces (GUIs)), analytics or the like. In a similar way, graphical control functionality such as an HMI or GUI may be included within the wearable electronic device 100. In this last form, the wearable electronic device 100 is configured to control at least a portion of an operation of at least one piece of equipment within the industrial setting 3000 by receiving an instruction generated by an application executed on the wearable electronic device 100 and that is responsive to a user interacting with GUI or HMI that is formed on a touchscreen of the wearable electronic device 100. In this way, the wearable electronic device 100 may form a low-code or no-code platform for the creation and operation of a suitable API in such a way that reliance upon a highly-trained information technology staff is reduced or eliminated. In one form, the wearable electronic device 100, with its microcontroller-based logic device 173 and radio-based wireless communication wireless communication module 175—in addition to allowing connectivity to one or more assets (such as pieces of machinery), sensors $S_1$, $S_2$, $S_3$ ... $S_n$ and related peripheral nodes 200 in the manner already discussed—may use such an interface as the GUI or HMI in its machinery monitoring or control activities.

In one form, container-based software approaches may be used with or acted upon by the logic device 173 such that the various communication and data acquisition and processing activities (including those related to one or more operational parameters of the asset) may be viewed within a display or related portion of the GUI or HMI as part of a manufacturing control system. As previously mentioned, the wireless communication module 175 with its LPWAN functionality may be made to be compatible with known communication protocols such as Modbus, SNMP, OPC UA, BACnet or the like through a suitable converter, interface or gateway where LPWAN-to-asset protocol cooperation can locally process, decrypt, extract and map data from the LPWAN data packet header without having to pass such data or data manipulation back and forth between the immediate communication network 4000 and the servers 400, cloud 500 or other parts of the backhaul that otherwise may be used to perform one or more of data storage, database management, networking or software-related functions. In such edge-related form, data being generated and conveyed may achieved through various framework headers such as those previously discussed. In a similar manner, such edge-based data generation and conveying may include header information (within for example, DevAddr, DevEUI or the like) that can be used to help identify which particular device that originated such data. As such, the edge functionality discussed herein (including that which takes place either partially or wholly on the wearable electronic device 100) may be used in order to perform on-premise analytics. In a similar manner, the data may be sent to one or more of the aforementioned SCADA, BAS, BMS, RTU or other operational technology hardware and software within administration 3100 to assist or replace their dedicated, direct control or monitoring, as well as to a local session protocols some of which have been previously discussed and others of which will be discussed in more detail as follows.

Also as previously mentioned, automated control equipment such as PLCs may benefit from containerized cooperation with the wearable electronic device 100 (including configurations where the wearable electronic device 100 and its edge computing capability takes over or otherwise assumes many or all of the functions of the PLC), as well as with various hardware-based assets, thereby promoting software portability. In this way, traditional GUIs and related HMIs can become agnostic relative to the architecture of a particular PLC, thereby simplifying any reconfiguration activities in response to changed operational circumstances. In this way, the control equipment (such as the PLC) 3050 acquires significant software-based attributes such that machine, workloads and related automation associated with the operation of a production line or related operation within the industrial setting 3000 become virtualized, which in turn promotes distributed modes of equipment operation and execution. In one form, such virtualization of the software-based PLC variant of control equipment 3050 is through placement within or on top of a hypervisor that will be discussed in more detail as follows.

In one form, an open API approach may be implemented where non-device-specific APIs are used as a user or system interface, such as those that cooperate with the wearable electronic device 100, the dashboard 700 of FIG. 6, the display device 900 of FIGS. 7 and 8 or other related mobile device or stationary screen. In such case, an open standard application layer protocol such as the advanced message queuing protocol (AMQP) may be used in order to further promote the interoperability between the wearable electronic device 100 and the various assets of FIG. 12. It will be understood that this may be used to help define the service layer for middleware message activity within the distributed components of these and other industrial or tactical assets. Relatedly, when distributed assets such as those shown in FIG. 12 need to be upgraded, reconfigured, added or removed, interoperability may be further promoted through a representational state transfer (REST) architecture. In such an approach, issues related to scalability, interfacing, hardware-to-software portability, statelessness or the like may be simplified, including for use in so-called zero-touch or related device onboarding and related connectivity approaches. Moreover, by using the edge functionality and multi-faceted wireless communication capability of the wearable electronic device 100, such scaling can be further simplified, as can production-specific machine learning implementation and (as will discussed in more detail as follows) multi-hop—or P2P-based wireless connectivity for a route.

In one form, the wearable electronic device 100, either on its own as an enabler of some of all of the aforementioned IoT equipment within the communication network 4000, may include hypervisor functionality. In this way, rather than having a particular piece of application software running on top of the operating system software, the wearable electronic device 100 and its associated edge computing functionality can decouple (that is to say, abstract) the software from the hardware, which in turn would allow it—as a hypervisor—to run numerous different applications and operating systems, thereby reducing the amount of interconnected or support equipment computing resources. In one form, the wearable electronic device 100 or its attendant functionality may form the basis for standardized control equipment hardware. This in turn would enable other equipment, such as a PLC, to function in a virtualized manner such that the operation of such other equipment may take place in a hardware-agnostic form on top of the wearable electronic device 100 or at least with reduced reliance in on-premise computational equipment such as servers or the like. In this way, the PLC such as that depicted in FIG. 12 and associated with control equipment 3050 may instead be configured as a software-based variant. This so-called "soft PLC" that can provide more flexible control operations, especially when used along with real-time operating systems, edge computing and an optional HMI in order to interface with the various production lines 3020, robotic equipment 3030, field devices 3040, control equipment 3050, networking infrastructure 3060, computers 3070, industrial vehicles 3080, data center 3090, administration 3100 or the like. It will be appreciated that the soft PLC approach mimics some of the functionality of the wearable electronic device 100 and other nodes as discussed herein where firmware- or software-based component upgrades may be used to reconfigure MAC layer portions of the protocol stack that may not be feasible for hardware-specific embedded devices. In one form, such soft PLC capability allows for real-time edge-based data input and output, control, analytics and visualization using open platform configurations and associated open standards (such as Linux or related operating systems), with interchangeable (that is to say, agnostic) hardware.

In one form, using the edge-based functionality enabled by the on-band processing of the wearable electronic device 100 could also be used to completely remove the need for one or both of on-premise server-based operation or cloud-based operation as a way to increase platform modularity or portability. In a related way, both a cloud-based serverless configuration (referred to herein as platform as a service (PaaS)) and an edge-based configuration may use container-based software approaches rather than traditional core module approaches. In this way, only enough code—along with select operating system libraries and certain dependencies—is used in order to allow the code to be abstracted away from a specific computing platform or environment without having to commit resources to scalable and modular platforms. Significantly, such an approach facilitates modular use at the software element level that in turn reduces expenses and burdens placed on hardware, such as the processors 173A and memory 173B of logic device 173.

In one particular form, this may help make the various functions such as LPWAN-based communication between the wearable electronic device 100 and the gateway 300 or other backhaul equipment that is unique to the industrial setting 3000 cooperate, regardless of the configuration of the data-gathering, transmission, analysis and management oversight functions. Similarly, such an approach will make it easier to run different types of workloads simultaneously. Thus, in addition to using the edge-based functionality for possible machine learning predictive analytics or the like, containerizing the various hardware and software functions may be used to more efficiently perform process monitoring involving one or more of the aforementioned components that make up the industrial setting 3000, network monitoring or other applications where intelligent edge platforms and associated activities are needed. In one form, the edge functionality of the wearable electronic device 100 and its container-based operation that uses fewer memory and computational resources may be adapted to operate in conjunction with a PaaS-based approach. As is discussed elsewhere within this disclosure, such a configuration can form the basis for a local PAN or WAN network, as well as one that cooperates with the cloud 500, all as part of an intelligent edge architecture. Thus, as discussed throughout the present disclosure, the wearable electronic device 100—whether in conjunction with the PAN P or on its own—may function as a platform for communications, analytics and control of various commercial, industrial, tactical or other processes or activities as a way to provide or coordinate one or more of device management, data management, cloud storage and backhaul connectivity. In one particular form, it provides a machine learning platform with wireless connectivity for the operation and management of one or more of the assets discussed herein that make up a particular industrial setting 3000. For example, the wearable electronic device 100 is configured as a platform-based edge computing device where its wireless communication module 175 and its LoRa-based radio functionality in combination with its cooperative processor 173A and executable machine code 173E may activate an LPWAN gateway 300 as a container to form a local network (such as private cloud or the like) in order to signally communicate with an end node 200 that may or may not be configured to have its own LoRa-based communication functionality.

As previously discussed, the collection, registration, processing and control of the data being acquired by the sensors $S_1, S_2, S_3 \ldots S_n$ (such as part of the PAN P, as well as those associated with various industrial assets such as the buildings 3010, production lines 3020, robotic equipment 3030, field devices 3040, control equipment 3050, networking infrastructure 3060, computers 3070, industrial vehicles 3080, data center 3090 or the like) may be done through a superordinated unit, such as the aforementioned PLC, computer-based controller or other process control system (PCS) in order to provide for asset configuration, startup and operation, as well as for monitoring, diagnosis, visualizing, configuring or the like. In this regard, the various industrial assets may be equipped with sensors similar in construction or functionality to sensors $S_1, S_2, S_3 \ldots S_n$ or other peripheral equipment such as actuators (for example, relays, switches, servomechanisms, linear or rotary actuators, stepper motors, solenoids, electric motors or other pump, valve or related means for influencing one or more industrial process variables), input-output (I/O) or radios in a manner similar to that associated with the wearable electronic device 100 in order to carry out various control-related functions in a manner similar to PLCs, PCSs or the like. Also as previously mentioned, in another form, the collection, registration, processing and control of the data may be performed through distributed processor systems, including those that form the basis of a DCS. As is discussed elsewhere in the present disclosure, data being acquired or otherwise registered by the sensors $S_1, S_2, S_3 \ldots S_n$ may include one or more of measurement data, calibration data, parametric data, diagnostic data, state data, control data, historical data or the like, some of which may be dark. In an industrial process-related context, some of the sensors $S_1, S_2, S_3 \ldots S_n$ may measure various process variables such as temperatures, currents, flows, pressures, fill levels, vibration or the like. In one form, process control may be used as a part of a quality inspection system to ensure that goods being produced by a production-based operation within the industrial setting 3000 are satisfactory. In such a system, one or more of machine vision, virtual reality (VR) and augmented reality (AR) along with edge-based machine learning may be employed by the wearable electronic device 100, either alone or in conjunction with other components or systems within the communication network 4000 as a way to provide augmented operations. In one form, such operations may include fault detection of equipment or processes.

As previously discussed, machine learning model optimization is particularly beneficial for energy-constrained edge computing devices. In particular, edge functionality enabled by logic on the wearable electronic device 100 may exist as part of an SDK that in turn may be implemented within or in conjunction with a runtime framework (and supporting libraries and processor cores) some of which are discussed in conjunction with the aforementioned U.S. patent application Ser. No. 16/233,462. Thus, when operated upon by the logic device 173, the SDK helps to create specific applications that may be deployed on the wearable electronic device 100, as well as be containerized such that the resulting software is bundled along with its dependencies to form a complete file system without regard to the specifics of the hardware or operating system. In this way, the wearable electronic device 100 can manage the various industrial assets within the industrial setting 3000 through the use of energy-conscious edge-based operations, as well as provide connectivity to the facility WAN, servers 400, cloud 500 or other backhaul as a way to function as a state machine. In such a configuration, the wearable electronic device 100 and its associated software stack can function as connected device technology elements, such as in the form of an industrial control system or network gateway. In addition to its LPWAN functionality, the wearable electronic device 100 may implement session protocols (such as the previously-discussed MQTT or AMQP, as well as others) as part of these technology elements to allow it to publish and subscribe to matters (that is to say, topics) handled by an appropriate message broker connection (such as Apache ActiveMQ, HiveMQ GmbH or the like) without having to keep track of each of the devices. This in turn simplifies certain processes, such as those used for device identification, registration or the like, as well as user identification where it will be understood that identification data corresponding to both user and device fall within the broader description of identifier data. For example, in one form, the MQTT protocol for use in device connectivity may be implemented through a wearable electronic device 100 SDK, including for both persistent and non-persistent connectivity. In one form, AMQP, MQTT, constrained application protocol (CoAP), hypertext markup language (HTML), web sockets or the like may be used as an application layer protocol in order to aggregate the (oftentimes relatively small amount of) data that is being collected by the connected devices and subsequently presented to administration 3100, such as through the dashboard 700 of FIG. 6 or on the display device 900 or a related mobile device or stationary screen. In IoT-based situations, the relatively low energy use requirements, coupled with low overhead makes AQMP, CoAP and MQTT good candidates for various parts of the end-to-end connectivity within the communication network 4000. Moreover, and as previously discussed, the runtime frameworks, libraries and a suitably-equipped processor core within the logic device 173 and ISA allow the wearable electronic device 100 to offer full machine learning functionality in order to perform various monitoring, analytics and control of the equipment and associated process of the industrial setting 3000.

One platform-based embodiment of the wearable electronic device 100 acts as a software hosting architecture such that it resembles a hybrid on-premise-to-cloud configuration within the industrial setting 3000. In this way, the distributed and edge-to-cloud or edge-to-facility configurations define a flexible hosting architecture (which may be one form of the aforementioned open architecture, especially as it relates to scalability of one or more networks within the industrial setting 3000), including when the edge-based activity includes machine learning and other forms of distributed analytics. Furthermore, such hypervisor functionality may make it easier to implement either facility WAN or cloud-based hyperscaling, including for purpose-built or use-specific industrial operations within the industrial setting 3000. Moreover, the digitalization that is enabled by having a wearable electronic device 100-based platform promotes the aforementioned automation of operations where control systems, disparate asset connectivity, data analytics (including machine learning variants) and equipment monitoring, upkeep and (if necessary) replacement may be data-informed. It will be appreciated that in its capacity as an enterprise platform, the wearable electronic device 100 may leverage one or more pieces of associated IoT equipment in the fulfillment of such functionality as a basis for a facility-based distributed control network, such as a PCS for an industrial environment as disclosed herein.

In one form, the wearable electronic device 100 and its LPWAN and other modes of communication may be used in conjunction with a virtual private network (VPN) such that scaling up or down the size of the network may be effected relatively quickly and seamlessly as production or other needs of the industrial setting 3000 change. For example, the wearable electronic device 100 and PAN P may form a private VPN as a way to host the IoT platform disclosed herein to share wireless connectivity between trusted end-user devices, whereas in another example, the resulting VPN may have hybrid attributes such that a portion of it has wireless communication while another portion has wired communication, and in another example still where routing functionality is included within the VPN such as described in conjunction with FIGS. 14 through 17. Thus, by abstracting into various levels, the details related to libraries, computer architectures and other hardware or operating system specifics promotes enhanced interoperability and portability of the wearable electronic device 100 as a platform. In such situations, its connectivity to and cooperation with cloud-based software and associated activities may be used as an aaS (such as equipment as a service, infrastructure as a service, PaaS, SaaS or the like) type of enterprise, allowing operators such as those of the industrial setting 3000 to offload the costs, inventory, upgrade, upkeep and related concerns of purchasing, stocking and maintaining the data-gathering, analyzing and management equipment that is used in the communication network 4000.

In one form, where data or personal privacy and other forms of communication security need additional protection, the use of the internal bus 173C that makes up a portion of the logic device 173 may be used in conjunction with other components of the wearable electronic device 100 in order to effect embedded hardware security, such as through the inclusion of physical unclonable functions (PUF), secure elements (SE), hardware security modules, trusted platform modules or the like. Likewise, cryptographic key management and key injection may be formed in or with the PUF or SE and to verify the secure identity or a user associated with the wearable electronic device 100. Such a configuration promotes more secure device management without having to resort to the use of proprietary communication protocols and associated networking interfaces that could otherwise result in higher integration and oversight costs for the wearable electronic device 100 and connected devices within the PAN P or industrial setting 3000.

As previously discussed, identification, authorization and related credentialling, authentication or registration of individuals that are being given access to the industrial setting 3000 and related tactical environments may be made through the wearable electronic device 100. In one form, the wearable electronic device 100 is part of a cloud-based or WAN-based activity such that safety, security and related measure particular to the industrial setting 3000, as well as to different access levels within specified parts of the industrial setting 3000. For example, a security system may include identity-based authorization or authentication, such as through certificates, tokens or the like as a way to create and manage the wearable electronic device 100 through suitable policies or certificates.

As previously mentioned, beacons and other BLE-capable devices 200 may include various means of identification, including device UUID (which in some forms may be rotating) and personal UUID. This in turn means that when these devices 200 are being distributed for use in PAN P-capable environments where the dissemination of personal information is a possibility or concern, the devices 200 may be configured with anonymizing capability so that when being tracked (through either the cloud or a facility WAN, for example), such tracking is only done through the unique ID that is associated with each device 200. In this way, assigning a beacon number to a particular user or wearer (such as a worker within an industrial facility, a fireman, tactical response personnel, police officer or the like) may be performed outside the cloud, facility WAN or other such administration 3100 control center. Thus, the correlation of a particular beacon or related tag to a particular individual is performed on the so-called "customer" side, thereby promoting additional layers of security and data privacy.

The PAN P that is used to acquire event and identifier data as disclosed herein may include security features and as such includes a security protocol that in one form may apply cryptographic algorithms and protocols as part of a cryptographic communication scheme, such as through the use of one or more of (i) authentication for one or both of data and the entity attempting to send or retrieve such data, (ii) key agreement, creation or escrowing, (iii) independent protocol negotiation, (iv) non-repudiation, (v) secret sharing approaches, (vi) secure transport-layers, (vii) time stamping or the like. Security may further be enhanced through the use of the device and user identifier data. For example, the assignment of the wearable electronic device 100 to a particular individual or piece of equipment for the purpose of unique identification within the industrial setting 3000 is part of the identifier information that may be tracked, initiated or otherwise managed through a mobile API that may be accessed and maintained through the data center 3090, administration 3100 or other device or location where supervisory, security or related personnel may need access to the wearable electronic device 100 as well as systems in communication therewith that are within the communication network 4000. In a similar way, software or firmware updates (including OTA updates) may be made through a comparable mobile manager API; such an approach may be used in lieu of significant (or in certain cases) complete software updates or overhauls.

As previously discussed, within the PAN P, the wireless communication module 175 of the wearable electronic device 100 receives beacons of the various peripheral nodes that are within range of the PAN P, such as for device identification, data exchange or the like. Relatedly, connectivity between the wearable electronic device 100 (whether fixed or mobile) and the gateways 300 (whether in their full or partial communication functionality) may be based on a beacon, such as one sent by the gateway 300 to the wearable electronic device 100 that is within range such that a join request and ensuing coupling that is part of the LoRa-based functionality of the wireless communication module 175 may take place.

Regardless of whether at least some of the analytics and business decisions (including, for example, enterprise-level decisions, whether with or without the assistance of machine learning) that are being made concerning the industrial setting 3000 takes place in one or the other of the facility WAN or the cloud 500, the data being collected by the various connected assets may be conveyed (such as through—either partly or wholly—the wearable electronic device 100) through the backhaul for suitable cleansing, preprocessing, model-building and related steps in order to put the results into business-relevant decision analytics. In turn, these analytics may be used for visualization, equipment or component maintenance, process control and anomalous behavior detection, prediction and corresponding alerting, among others. From this, suitable instructions may be sent back to the assets or equipment being analyzed for updates to their ongoing operation, operating status or the like. The choice between using cloud-based or facility WAN-based data gathering, processing and analysis may be based on various factors, such as latency, processing and storage capability, security and connection interoperability. The configurations disclosed herein are configured to have one or more fluid computing attributes so that they can be performed by the wearable electronic device 100 as one level of edge asset, other levels of edge asset (such as a factory, vehicle, piece of machinery or the like) within a particular enterprise, somewhere in the backhaul (such as a facility with servers 400, whether on-premise or remote), a piece of communication edge equipment (such as the gateway 300) that connects to the backhaul, on the cloud 500, or as a combination of some or all of these devices and systems; it will be appreciated that all such variants are within the scope of the present disclosure. As previously noted with regard to cloud-based modes of operation, the wearable electronic device 100 will forward the data to an AWS IoT Core or related backhaul, as well as to have frontend APIs to present the data and associated analytics to interested personnel, such as through the previously-discussed dashboard 700, display device 900 or other HMI. It will be appreciated that in situations such as this where access to cloud-based storage, computation and related functionality is readily-available, at least some of the aforementioned platform-related functionality associated with the wearable electronic device 100 may instead take place at least partially in the cloud 500 or other portions of the backhaul. In such configurations, the backhaul may be conceptualized as numerous modular functional entities or blocks of which (using AWS as an example) the AWS IoT Core is one, along with other server data, data storage and logic processing entities such as AWS Lambda, AWS DynamoDB Device Data and AWS API Gateway, respectively as part of a larger enterprise platform.

As previously mentioned, the communication network 4000 is used to provide insight into what is actually taking place within a process being monitored within the industrial setting 3000. In one form, the PAN P and wearable electronic device 100 may form part of a training or simulation for an actual system within the industrial setting 3000 of FIG. 12. For example, by combining the IoT-based data acquisition with MES, decision-makers can more readily adapt to changing needs or operational capabilities within the industrial setting 3000. In this way, it can act as a real-time digital (that is to say, virtual) representation or abstraction that in turn may be used to perform various forecasting representations of an actual procedure or component (including industrial assets such as those mentioned herein). For example, by taking into consideration various levels of the product or process, as well as project planning and execution phases and type of use for the virtual representation, a model-based platform for optimization of a corresponding actual, physical industrial setting 3000 activity may be formed. As noted elsewhere within the disclosure, such activity includes (but is not limited to) fabrication, assembly, process or related activity within a factory or manufacturing facility, as well as those for research, commercial or tactical settings. It will be understood that regardless of the nature of the industrial setting 3000, all real and virtual activities may involve complex interworkings or scenarios among various input parameters. Thus, by using a virtual representation in place of or alongside an actual working model, cost-prohibitive, timewise-prohibitive or harmful situations can be reduced or avoided altogether. In one form, such simulation may be performed in conjunction with the aforementioned AR or VR as a way to (for example) improve training of personnel. Accordingly, such a virtual representation-which in one form may use real-time data-helps to better understand the performance characteristics of the simulation's physical counterparts. In one form, the use of a virtual representation may allow parametric analyses to be performed in advance of actual implementation in order to fine-tune a certain procedure. This in turn permits a decision-maker, such as that associated with administration 3100, to make information-based decisions on the process rather than rely on prior experience. For example, administration 3100 may perform complex event processing based on the predictive analytics discussed herein, including for real-time and near real-time situations where the wearable electronic device 100 is providing edge computing and machine learning-based such predictive (or data) analytics. In one form, such machine learning workflows, models, analysis and related capability that takes wholly or partly in place on the wearable electronic device 100 arise out of the use of embedded machine learning chips, including application-specific integrated circuits (ASICs), field-programmable gate arrays (FPGAs), graphics processing units (GPUs), neural processing units (NPUs) or the like as part of its logic device 173. In a similar way, embedded secure elements (eSEs), PUFs or the like may also be included in order to enhance the security (including data security) of the logic device 173 and other chipsets that are embedded into the wearable electronic device 100. Such security measures may be used in conjunction with, or in place of, other security measures discussed herein, such as the use of unique identity keys, auditing activities, cross-stack measures, user-selected device identification or the like. In a similar way, the use of these embedded machine learning chips may significantly improve the ability to perform edge-based analysis for an ongoing process within the industrial setting 3000, including those related to neural network-based models where machine vision, object detection or the like is needed. In a particular form, such embedded chip implementation may be used in conjunction with the aforementioned aaS-based enterprise.

Referring next to FIGS. 13 through 17 in conjunction with FIG. 12, various architectures of the communication network 4000 and its interaction with various physical layer devices for the industrial setting 3000 of FIG. 12 are shown. In one form, such an architecture includes one or more attributes of a distributed control system (DCS) that forms the basis for so-called Industry 4.0, Industrial Internet of Things (IIoT) or related applications. In one non-limiting example of an IIoT-based mode of operation, a production line 3020 may have a piece of robotic equipment 3030 that has been outfitted with one or more field devices 3040 (which, in one form, may mimic or be the same as sensors $S_1, S_2, S_3 \ldots S_n$, as well as be in other common form factors such as meters, gauges or other such data-gathering means known to be used in industrial environments as a way to measure temperatures, pressures, flows and flow rates, positions, power, motion, acceleration, proximity, visual images—including those used for subsequent image processing and related process control—or the like), control equipment 3050 (particularly, a PLC) and networking infrastructure (such as a facility WAN) 3060, all cooperating to send information and receive instructions through one or more computers 3070 (which may mimic, operate in conjunction with or even be the same as servers 400) with administration 3100, possibly along with information storage, retrieval and business analytics such as produced in a data center 3090, the cloud 500 or—in some cases—on the wearable electronic device 100 as a machine learning-enabled decision maker. Thus, in addition to its ability to collect and act upon its own acquired data, the wearable electronic device 100 may act as a coordinator of data collection from other sources or end nodes that are in one or both of long-range and short-range communication therewith, as well as to coordinate communication of acquired data (either in raw, partially-processed or fully-processed form) to other pieces of equipment that are within the communication system 4000 in order to achieve not only traditional connectivity and computerization functions, but also to provide insight into what is actually taking place within a process being monitored within the industrial setting 3000. Significantly, as previously mentioned, the systems and methods disclosed herein provide transparent insights into what is taking place within the process, as well as provide preparedness by analyzing and predicting what will happen and (if necessary) engage in some measure of self-healing or adapting of the process to changed or ongoing circumstances.

Next, a technical rationale for choosing a particular architecture for the various embodiment of communication network 4000 of FIGS. 13 through 17 is provided. As previously discussed, one form of data being gathered from the sensors $S_1, S_2, S_3 \ldots S_n$ or other devices 200 (which in one form may include other wearable electronic devices 100 one or more of which may be acting in a non-source node capacity) within the PAN P, and that is being communicated with the wearable electronic device 100 that is acting a source node may include time-based data, topology-related data, control data or the like, as well as event data pertaining to the various assets within the industrial setting 3000. In particular, the topology-related data could include routing information as evidence of which other nodes or intermediate links may have formed a part of an extended mesh-like network. As will be discussed in conjunction with FIGS. 14 through 17 in particular, in such a scenario, the communication network 4000 may be used as part of an ALOHA-free protocol in order to take into consideration the temporal, routing or related multi-hop nature of some of the acquired data, as well as to communicate either among the various end nodes, between the wearable electronic device 100 and the various end nodes or between the wearable electronic device 100 and one or other remote devices such as one or more gateways 300 or the backhaul. In this last scenario, the communication protocol may be adapted to take advantage of less than full LoRaWAN functionality of the other remote device or devices. In one form, such a protocol (which could still be could based on the LoRa-based radio (or PHY layer) functionality present within the wireless communication module 175) may be used as a way to tailor the MAC layer through packet routing or relaying in order to improve the control or packet overhead as a way to ensure the operability and efficiency with which the wearable electronic device 100 communicates with the data-gathering and using assets within an industrial system that is present within the industrial setting 3000.

Significantly, the payload portion of the LoRa packet structure may be adjusted to accommodate differences in packet transmission needs relative to those of the LoRaWAN protocol. For example, by having each end node receive a beacon (such as for wake up, sub-network joining or the like) for time synchronization-sensitive events, the protocol may (subject to data latency, collision avoidance, routing overhead or other restrictions, and while keeping the same amount of memory available to the payload portion of the packet header) use flooding-based routing, particularly for scenarios where the end nodes or data-gathering and using assets are either relatively small in number, stationary (that is to say, non-mobile) or not energy-constrained. Significantly, this would work between the various end nodes even if some of them are configured as an intermediate node or link within a multi-hop route version of the communication network 4000. Moreover, such a protocol does not interfere with the wireless signal transmission capability of the wireless communication module 175 that uses a chirp spread spectrum based broadcast mode (for example, LoRa, with its ability to create virtual channels) with its attendant increases in range, signal adaptability, modulation and security the last of which is present by virtue of a large link budget that permits signal reception even below a very low noise floor. Thus, in scenarios where the communication network 4000 employs end nodes that are one or more of stationary, battery-powered and not densely populated (including those that are affixed to or otherwise cooperative with static equipment or assets within a production environment such as shown in FIG. 12) using a modified MAC layer to combine routing-whether based on synchronized flooding or not-allows for multi-hop IoT modes of data gathering and equipment control and monitoring. In such an approach, discovery of a preferred route, maintaining the route through dynamic (including self-organizing) adapting to avoid disconnections and other breaks in the chain of communication, and determining a maximum number of permissible hops are all things the MAC layer could do in order reduce the protocol overhead required of the various end nodes. By way of example, discovery of a route typically involves having the various end nodes or other portions of the communication network 4000 make data forwarding decisions based on knowledge of the topology of the network, which may include changes to the topology when one or more nodes within the network fail, are offline or the like. Of course, such route discovery requires more overhead (and hence, battery power for energy-constrained devices) than simpler relay-based devices where, for example, static tables may be used.

In situations where the end nodes that are not acting as a source node are configured to be one or both of stationary and mains-powered, concerns over routing protocols consuming inordinate amounts of node battery power, processing or transmitting time are not as great as when the nodes are both energy-constrained and mobile. In such case, non-LoRaWAN MAC layer implementations of a scheduling or routing protocol may instead use something else, such as one based on carrier sense multiple access with collision avoidance (CSMA/CA), TDMA or hybrids thereof, depending on various factors such as the number of anticipated end nodes within a particular network, as well as tradeoffs between end node functionality, latency, data accuracy, communication reliability and cost. These implementations may differ on whether or not they are coordinated; for example, the more probabilistic CSMA/CA may be used as part of an uncoordinated coexistence approach where efficiencies in latency are valued, while the more deterministic TDMA (as well as related channel-hopping time slot methods) may be used as part of a coordinated, scheduled approach as a way to synchronize the time slots or contention periods, such as to define wake up times for the various end nodes, as well as for relays or other intermediate devices that may be subjected to a wake up signal being sent from the wearable electronic device 100. Such deterministic mode of communication is particularly beneficial for energy-constrained end nodes and other devices within the communication network 4000 where always-on modes of data-conveying operation may be incompatible for battery-powered devices.

Figure 16:
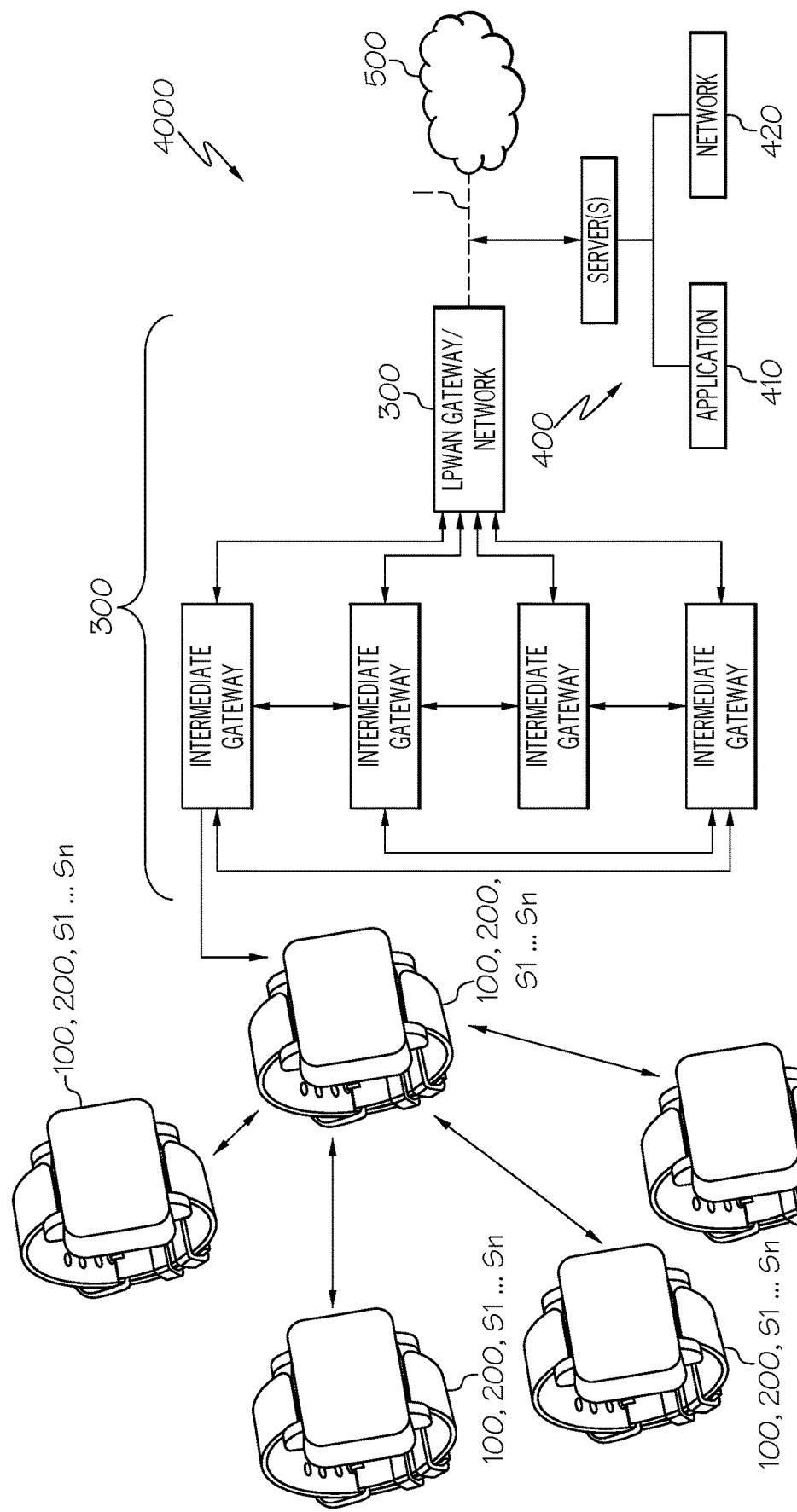
Figure 17:
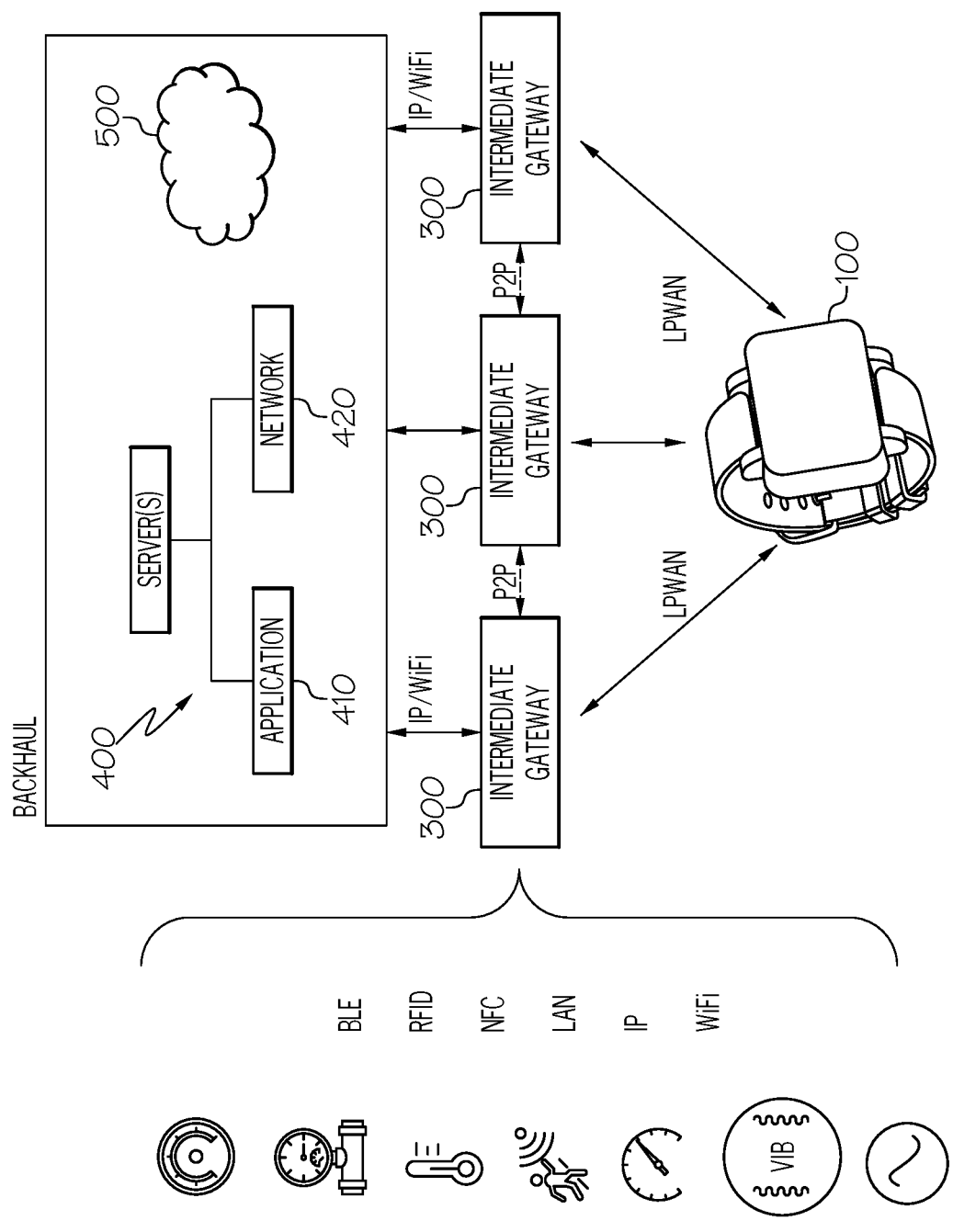

Moreover, as discussed elsewhere in the present disclosure, when the wearable electronic device 100 is configured with edge computing capability (such as through its machine learning functionality), significant amounts of battery power that would otherwise be consumed in routing information that may (or may not) be germane to the node in question may be saved by performing operations locally, which in turn will reduce the amount or frequency of data being transmitted. Examples of operations that may be performed locally on the wearable electronic device 100 may include one or more of dimensionality reduction, routing selectivity and parsing and on-band analysis using a fully-compiled, trained machine learning model, as well as others. Moreover, because the wearable electronic device 100 may operate with adaptive capability, including those related to its network credentials, channel selection or diversity, data rates, payload size or the like, it can respond to dynamic situations or industrial setting 3000 configuration changes without having to be subjected to significant hardware or software updates; such adaptability (for power, transmission modes or the like) also is useful in situations where scaling of the communication network 4000 is contemplated, expected or likely to occur, particularly in situations where the LoRa-based transmission of signals and data is being done with a low spreading factor. Furthermore, in situations where numerous gateways 300 such as in FIGS. 16 and 17 are used within the communication network 4000, TDOA-based location determination backed with time-based synchronization may be used in order to provide more context and accuracy to the data being collected by the one or more end nodes, as well as for situations where some of the end nodes may be used in a mobile capacity. In another form, an LPWAN-based communication protocol such as this may also pursue cross-layer coordination or integration through different modes of transmission; such an approach may be relatively easy to implement, particularly in some of the higher layers of the IoT protocol stack. For example, at a stack layer closer to end user APIs or the like, the previously-discussed CoAP may be used as a simplified signaling approach in order to more closely match the interaction or transmission patterns between the various pieces of equipment or related assets being monitored or operated upon within a particular industrial setting 3000. Likewise, at the other end of the stack, such coordination can help to reconcile the relatively rapid improvements being made in the PHY layer with the comparatively slower changes in the higher stack layers.

In mesh situations where the use of gateways 300 is limited, such as through cost, network and computational complexity, interoperability with other components, RSSI values, bandwidths, signal-to-noise ratios, packet delivery rate requirements or the like, one LPWAN approach that still can take advantage of the LoRa PHY layer of the wearable electronic device 100 would be to allow some or all of the LoRa-capable devices within the communication network 4000 to act in a mesh-based multi-hop route capacity, such as through part of a direct network between numerous wearable electronic devices 100 that are within wireless signal range of one another, or where some end nodes may forward their acquired data to such wearable electronic devices 100. In either event, communication with the gateway 300 may take place in a sequential rather than simultaneous manner, as not every end node (be it a wearable electronic device 100, sensors $S_1$, $S_2$, $S_3$ . . . $S_n$ and related peripheral nodes 200) need directly reach the gateway 300. Moreover, each end node may be passively listening for signals containing data packet or beacon information (such as to mimic the Class A mode of operation within the LoRaWAN protocol), thereby extending battery life for energy-constrained end nodes that are affixed to static equipment or assets within the industrial setting 3000 where dynamic route updating is not a significant design consideration.

In yet another form, the number of gateways 300 may be kept low by extending their reach, such as through adapting the LoRaWAN MAC layer with a proactive multi-hop routing protocol such that the latter can be made to operate as an abstraction middleware on top of the former. In this way (and using a LoRa data packet that is present within the wearable electronic device 100), multi-hop LoRaWAN may be enabled. In one form, a simplified version of a destination-sequenced distance vector (DSDV) routing allows the various pieces of communication equipment within the communication network 4000 (including the wearable electronic device 100 and gateways 300, for example) to be segmented into data-originating nodes and routing (intermediate) nodes. Significantly, the DSDV protocol was originally set up for mobile nodes through the addition of a sequence number field to the already-present fields (such as active neighbors, destination, expiration time, next hop, number of hops and sequence number) within its routing table; as such, its use may be particularly beneficial in communication network 4000 configurations where embodiments of the wearable electronic device 100 are affixed to a mobile or ambulatory target and the need for relatively low protocol overhead is present. In one form, the use of a DSDV-based protocol within the communication network 4000 is modified (that is to say, simplified) to have it work within the LoRaWAN single-hop paradigm that is already present between the wearable electronic device 100 and gateway 300 in configurations where the LPWAN connectivity between them is specifically LoRaWAN. For example, the data-originating end nodes (which, as stated elsewhere herein, may be mobile or static and include the wearable electronic device 100, sensors $S_1$, $S_2$, $S_3$ . . . $S_n$, other wearable electronic devices 100 that are not acting as a source node such that they are the functional equivalent of one or more of the peripheral devices 200) may continue to function in a manner consistent with an unaltered LoRaWAN protocol, while the routing nodes (which are typically static) may be powered by larger sources of electric power, such as bigger batteries, mains power or the like. In this way, the routing nodes are able to handle more complex routing overhead—such as additional packet data, modification to its routing tables, routing algorithms (including for route discovery, selection, maintenance, data forwarding and route representation), synchronization or the like that may not be possible with flooding-based protocols, as well as for mobile, energy-constrained end nodes—in order to accommodate the additional wireless data transmission modes that are associated with the type of regular, frequent routing updates associated with the wireless transmission of mobile end data. Thus, for example, one or more of route selection, maintenance and data forwarding will be part of a dynamic signal path computation needed in order to ensure that data-forwarding paths are maintained while keeping the need for keeping routing overhead low (at least in configurations where the end nodes are energy-constrained). It will be appreciated that such data forwarding (such as through packets) is more than range extension where frames are merely repeated, such as through directional antennas or the like. In situations where packet routing complexity is expected to be relatively high, the communication network 4000 may use metadata for various authentication, identification, proper gateway, bandwidth, cloud connectivity or related functions. Moreover, in a configuration such as this, the gateways 300 that are disclosed herein may have two levels of functionality, including simpler versions that are used as the routing nodes, as well as a more comprehensive version such as that associated with the other versions of LPWAN disclosed herein where such gateways 300 act as a relaying intermediary between the wearable electronic devices 100 (and, in the multi-hop scenario, the simplified routing node versions of the gateways 300) and the servers 400, cloud 500, facility WAN and related backhaul.

Within the present disclosure, it is noted that when a device such as the more comprehensive version of the gateway 300 possesses a (packet) relaying functionality, it is not necessarily operating as a routing device, as the former merely involves moving packets of data from one node to a next while the latter includes intelligence related to where such data is to be sent, particularly within a dynamic, self-configuring, mobile-based ad hoc topology of the communication network 4000. Thus, even though one version the gateway 300 is noted as being more comprehensive and the other being more simplified, it does not necessarily mean that the one is more comprehensive in every regard; it will be appreciated that these and other distinctions will be apparent from the context. Furthermore, it will be appreciated that in topologies of the communication network 4000 that require routing, additional MAC layer overhead is also needed relative to those where mere relaying and associated packet forwarding is needed. In this way, wherein a mesh architecture is present in at least one of the sub-networks of the communication network 4000 and configured to have a relaying-based protocol, the data forwarding taking place between at least one of the plurality of peripheral nodes, the source node and the gateway 300 (whether as a primary or intermediate variant) is done without having to perform dynamic route updating.

As previously mentioned, for mesh-based configurations, proactive, reactive and hybrids of both routing protocols may be used. In one form, the reactive approach uses an ad hoc on-demand distance vector (AODV) routing where the data received be a particular node within the network is merely repeated using the same network; in this regard, it manages the flooding process in a manner that resembles a Bluetooth 5.0 mesh network approach. In one form, the AODV may be supplemented with hierarchical tree-based routing or the like. Significantly, an AODV-based flooding approach can be made compatible with the LoRaWAN routing protocol, such as through an IEEE 802.11s-based hybrid wireless mesh protocol (HWMP). In this situation, if within a multi-hop version of the communication network 4000 the route from the end node to the network server 410 is already established, packets from the end nodes may be forwarded through one or more of the gateways 300 using HWMP; if not, then a new multi-hop route is created according to an already-present AODV-based flooding. As before, multiple gateways 300 may be used such that one or more of the fields (pertaining to destinations and their sequence number, hop count, next hop or the like) within a corresponding routing table contained within each gateway 300 are updated upon receipt of uplink signals from an end node or other gateway 300, or downlink signals from the backhaul or another gateway 300, thereby allowing route discovery, packet forwarding, packet encapsulation and related activities until the data packets reach their destination. In one form, the communication network 4000—either with or without multi-hop functionality—may be thought of as a many-to-one configuration where numerous end nodes are feeding signals to a single or small number of gateways 300 or wearable electronic devices 100. Significantly, an AODV-based protocol can readily change with dynamic node linking situations with relatively little overhead usage that in turn renders it practical for energy-constrained nodes. One example of a reactive protocol that promotes end node simplicity and flooding-based functionality is a dynamic source routing (DSR) protocol, particularly for configurations of the communication network 4000 that involve mobile versions of the wearable electronic device 100 and other end nodes.

As previously discussed, intra-PAN P networks may be based on BLE. In this way, the networks may be made up of the various end nodes 100, 200 within the PAN P to have direct device-to-device, mesh-like communication functionality, specifically as a publication and subscription mode of operation that somewhat mimics (but still differs from) conventional BLE advertising and scanning approaches. In a configuration of the communication network 4000 where a BLE-based short-range mesh (such as one that incorporates or otherwise receives data that has been acquired by or within PAN P) such as this is used, it will be appreciated that its protocol stack may be abstracted in a manner generally similar to the aforementioned TCP/IP or OSI model in that it has a multilayer adaptability. In one form, this may include a BLE layer (analogous to an OSI PHY layer), a bearer layer (analogous to an OSI MAC layer), a network layer, a transport layer, an access layer (analogous to an OSI session layer), a foundation model layer (analogous to an OSI presentation layer) and a model layer (analogous to an OSI application layer). In another form, the various connectivity, link, session and transport layers may be used for IoT-based protocols as part of a more comprehensive scheme to handle all communication from the physical device connectivity to the end use analytics, including situations where protocol converters (also referred to as a protocol gateway) may be required. Furthermore, when such an intra-PAN P mesh network is then coupled to the range-extending features of the one or more LoRa-based protocol stacks that are associated with the wearable electronic device 100, such mesh is extended to have inter-PAN P features for use as one form of communication network 4000 within the industrial setting 3000.

In situations where the operation of some or all of the equipment within the industrial setting 3000 takes place in a remote environment (where, for example, connectivity to an IP-based backhaul network is limited or non-existent), one form of the communication network 4000 for range extension may include using direct communication between a network of gateways 300 as a way to provide multi-hop connectivity to such backhaul. In such case, the LPWAN protocol would—in addition to providing routing (such as through a reactive vector routing approach such as a time-on-air version of AODV)—aggregate or otherwise manipulate the data packets that are being collected and transmitted by the one or more end nodes (such as the wearable electronic devices 100, sensors $S_1$, $S_2$, $S_3$ ... $S_n$ or other devices 200 within the PAN P), as well as include a channel access, sensing or related collision-avoidance approach. In such a configuration, the pure ALOHA-based transmission protocol of LoRaWAN would be supplanted with one where increased nodal functionality may be required. In this way, the direct communication between gateways 300 is analogous to (although not identical to) that which may take place between end nodes in the aforementioned P2P environment. In a related way, in network configurations where node density is not too great and one or both of packet collision and overhead concerns overhead are low, the MAC layer may adopt a CSMA/CA-like channel access that was originally used for short-range wireless communication protocols as part of its LPWAN protocol.

In another form, range-extending modes of operation for the communication network 4000 may include using a time-synchronized MAC layer protocol for multi-hop routing between end nodes, particularly where such end nodes are energy-constrained, as well as to account for drifts in time and frequency counts for the devices being used to acquire and communicate event data. Furthermore, such an approach may be built as a hybrid with both LoRaWAN and non-LoRaWAN functionality. Such a configuration would-unlike the previous form-keep the number of gateways 300 low. In addition, it allows the end nodes to both (i) transmit their own data and (ii) forward data from other end nodes in a form of the P2P mode of communication where some of the end nodes are acting in a combined data-gathering and transmitting mode (as discussed throughout the present disclosure for one or more of the wearable electronic devices 100, sensors $S_1$, $S_2$, $S_3$ ... $S_n$ or other devices 200 of PAN P) while others are acting either predominantly or purely in a repeating capacity such that they are segmented into data-originating nodes and routing (intermediate) nodes. In this configuration, the repeating or intermediate nodes may form clusters of end nodes that use a structured TDMA-based routing algorithm to ensure adequate slotted time synchronization among the end nodes. Such a protocol may use a flooding-based approach in order to ensure that the source end nodes that are used for data-gathering or sensing are also synchronized. Significantly, such a configuration permits not only firmware and hardware commonality among them, but also avoids the need for mains power or internet access among them. Such a hybrid approach would correspond to changes in the MAC layer packet structure relative to those used for a purely LoRaWAN-based protocol, mostly in how the payload portion of the PHY layer is allocated for P2P-based communication between the various end nodes, while preserving the LoRaWAN mode of communication between the repeating, intermediate nodes and the one or more gateways 300.

In one form, a nodal connection between gateways 300 (that is to say, gateway-to-gateway communication) may be used to achieve multi-hop capability in a manner analogous to a P2P configuration of the end nodes within the PAN P. Such a configuration includes having at least one of the gateways 300 acting as an intermediate node. As such, rather than using a purely star-based topology, the gateways 300 may function as either relay-based intermediaries between the end nodes and a main gateway 300 that is connected to the backhaul, or in a clustering format each made up of numerous end nodes and a gateway 300 such that upon only having to receive and forward signals and their corresponding data from large numbers of end nodes, the communication task for each clustered gateway 300 becomes much simpler. Significantly, because the wearable electronic device 100 employs a LoRa-based radio, there are many transmission parameters that may be adjusted, depending on the needs of the communication network 4000 and industrial setting 3000; some of these include bandwidth, coding rates, spreading factor, transmission power or the like. In such a configuration, and depending on factors related to data quantity, such as packet size, on-air time, hop count or the like, an AODV-based routing protocol may be used.

As mentioned elsewhere in the present disclosure, intermediate nodes (whether they be gateways 300 or one or more end nodes such as the wearable electronic devices 100, sensors $S_1$, $S_2$, $S_3$ ... $S_n$ or other devices 200 of the PAN P) may be configured to perform either simple relay functions or more complex routing protocol functions, depending on the number of hops, node density (including duty cycle of such nodes) and related asset needs within the industrial setting 3000 and communication network 4000. Thus, in relay-based configurations, the intermediate nodes may readily adapt to the existing LoRa PHY layer in that the function they are performing resembles data packet repeating operations, whereas in routing-based configurations, some changes to the MAC layer may be required, as discussed elsewhere. In such case, network topologies may deviate from a straightforward star-based one that is associated with the LoRaWAN protocol.

In one form, the machine learning techniques disclosed herein that are performed largely or even solely on the wearable electronic device 100 may also be employed elsewhere, such as in one of the servers 400 or cloud 500 of the backhaul) to derive the efficient multi-hop communication configurations as discussed herein. Likewise, in one form, the network server 410 that is mentioned elsewhere in the present disclosure may be used to ensure proper joining, authentication and secure transmissions between the various assets within the industrial setting 3000. In such case, the network server 410 may incorporate or otherwise be cooperative with the previously-discussed join server to perform such functions, not just for a LoRaWAN-based protocol, but others as well. For example, the aforementioned identifier keys that are used with the wearable electronic device 100 and end nodes (such as DevEUI, AppEUI, AppKey, NwkSKey, AppSKey or the like) may be used to authenticate end nodes.

As is understood, the use of fixed, pre-existing infrastructure (such as routers or the like with transport or application layer modes of operation) that are common in wired networks or range extenders associated with short-range wireless networks (such as Wi Fi) is replaced in mobile wireless ad hoc networks with suitable routing protocols and nodes as a way to dynamically forward data to other nodes within the network. As discussed herein, the choice of the protocol depends on various factors that are particular to each communication network 4000. Thus, in addition to issues related to range, data throughput, overhead, latency, network reliability, ambient environmental factors, edge computing functionality or the like, some common concerns for choosing a routing protocol for the communication network 4000 depend—as previously noted-on whether the people, equipment or the like that are being monitored or otherwise participating in the network are mobile or stationary. For example, when configuring a protocol for a mobile end node, a rotatable networking environment may be superimposed on top of the MAC layer, such as through one or more of the network, transport or session layers. In particular, these additional layers may be updated in order to improve the network topology for dynamically changing scenarios, such as when one or more paths become disabled or broken, as well as for route discovery. Moreover, in situations where multi-hop connectivity is necessary, such as where the layout of the industrial setting 3000 is complex or spread over transmission-attenuating areas, the routing protocol may need to be sensitive to battery-use issues, particularly for mobile and other energy-constrained end nodes. In situations such as this, the multi-hop communication protocol may need to balance overhead control, node-to-node connectivity (for one or both of end node-to-end node and gateway-to-gateway scenarios) and energy consumption. In one form, such connectivity may use software-based instruction sets, particularly in relation to manipulating the operability of one or more of the gateways 300 in their need for efficient route discovery, load balancing or the like. By making the control plane and data agnostic to one another, such a software-defined network approach may alleviate some of the time and bandwidth consumption concerns that could arise with certain flooding-based ways of communicating data between multiple hops within the network.

Now that the technical rationale for implementing the communication network 4000 as part of an IIoT approach and for choosing a particular architecture for such network has been established, attention turns to the particular embodiments of FIGS. 13 through 17. Regarding these figures, the system 1 and its associated platform and communication network of FIG. 1 and the wearable electronic device 100 of FIG. 2 are structured to form a part of the industrial setting 3000 of FIG. 12 in a variety of protocols, topologies and system architectures that form these particular embodiments. In one form, at least some of the architectures depicted in FIGS. 13 through 17 exhibit the previously-discussed mesh or star topologies, while others exhibit hybrid attributes; such distinctions will be explained in more detail as follows for each of these figures.

As previously discussed, the use of edge computing, a LoRa-based radio and other functionality allows the wearable electronic device 100 to be configured as a platform that can be adapted for use in various communication networks (such as communication network 4000), as well as for wireless control, data-related analytics or other operations. Thus, depending on the particular needs of the network, various LPWAN protocols, such as mesh, P2P, LoRaWAN, cluster trees or various proactive, reactive or hybrid packet-routing variants thereof may be used to establish connectivity between one or more of the wearable electronic device 100, sensors $S_1$, $S_2$, $S_3$ . . . $S_n$, peripheral nodes 200, gateways 300 and backhaul that as mentioned elsewhere includes one of more of the servers 400, internet I, cloud 500, facility WAN and associated equipment that either cooperates with or makes up a part of the communication network 4000. Furthermore, factors that may affect the choice of which components and protocol to use in the communication network 4000 depend on the configuration of the equipment or process that is being controlled, operated, monitored, evaluated or the like within the industrial setting 3000. For example, situations where the various equipment or assets being used to perform an intended operation are relatively stationary (that is to say, static) may present very different protocol requirements than situations that require some degree of component or end node mobility. Likewise, situations where the various equipment or data-acquiring or transmitting end nodes being used to perform an intended operation are located within a common area with a relatively open floorplan or in a single room or related workspace may present very different protocol requirements than situations where such equipment or end nodes are spread out over numerous dwellings, separate rooms, different partitioned regions, inaccessible areas or the like. Furthermore, situations where the nature of the process, fabrication, research, tactical or related operation can tolerate a measure of latency, operational complexity, power requirements or other factors for the intended operation may present are very different protocol requirements than situations where the nature of the process, fabrication, research, tactical or related operation is time critical, cost-sensitive, power-constrained or the like. It will be appreciated that variations in these protocols needed in order to support the arrangement of the components that are within the disclosed communication network 4000 are based on these and other situational needs and as such are all within the scope of the present disclosure. Some of these protocol and associated approaches are discussed in more detail as follows in conjunction with each of the respective figures.

As previously discussed, the authors of the present disclosure have discovered that using various LPWANs in general (and of which the LoRaWAN-based protocol is a particular example) in the wearable electronic device 100 as a way to establish wireless communication between it and the remainder of the PAN P as well as other parts of the communication network 4000 is particularly beneficial in both the industrial setting 3000 and others. In other network configurations, such as those where mesh-like attributes may be appropriate (including routing-based multi-hop communication, its relay-only single-hop node-to-node direct communication (including P2P) equivalent, or where particular forms of network range extension may be desired), the authors of the present disclosure have further discovered that other LPWAN protocols may be beneficial, including those that either cooperate with LoRaWAN or supplant it. Some of these other protocols are especially useful in network configurations where the nodes are one or both of both energy-constrained and mobile, such as when one or more of the wearable electronic devices 100 forms some or all of those end nodes, as well as situations where the wearable electronic device 100 or other devices may function as an intermediate device as a way to increase the range of a wireless mesh network where both multi-hop linking capability and packet-relaying intermediate nodes are used. In configurations such as this, some of the intermediate devices (such as variations of the gateways 300) within the communication network 4000 may merely act as relaying devices rather than routing ones, including the use of MAC layer modifications to the packet header for non-standard messages as a way to identify a particular protocol. Within the present context, nodes or related devices typically only relay messages related to their own use, whereas when such nodes are engaged in a routing activity, they are forwarding data for use by or about other nodes, including signals unrelated to their own use. Also within the present disclosure, it will be appreciated that routing protocols may be classified in various ways, such as by how data packets are propagated (distance vector versus link state), route discovery topology (proactive versus reactive), network hierarchy, how routes are determined, or other ways. These will be apparent from the context, as various embodiments of communication network 4000 architectures are described next.

Figure 13:
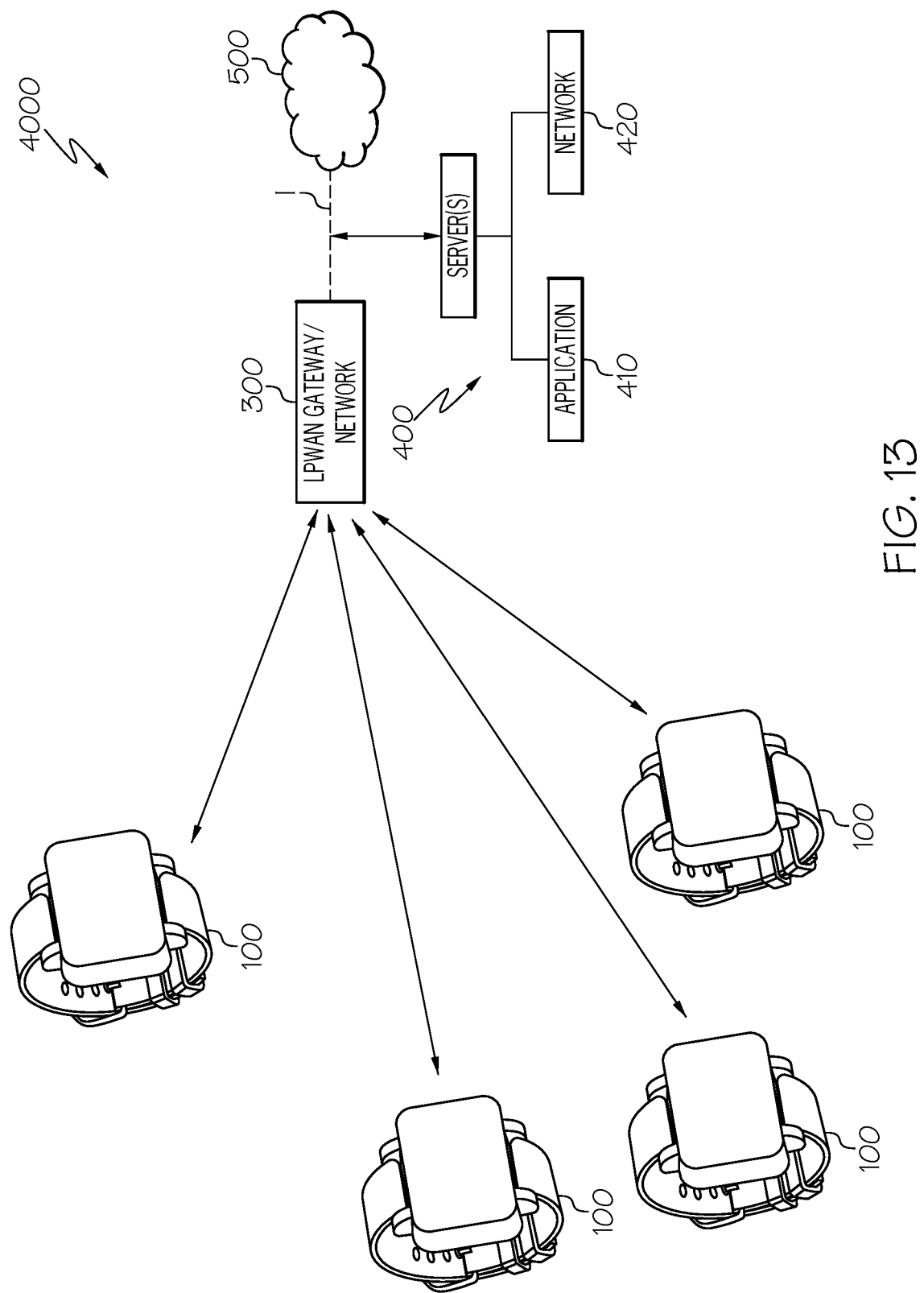
FIGS. 13 through 17 depict various architectures of a communication network for the industrial environment of FIG. 12 and the wearable electronic device of FIGS. 1 and 2.

Referring with particularity to FIG. 13, the communication network 4000 is configured (that is to say, structured) as a LoRaWAN network. In this regard, it mimics the architecture of FIG. 1 where the wearable electronic device 100 acts as an end node that wirelessly sends a LoRa-based signal directly to the gateway 300 as part of a star-based single-hop network prior to having that signal and the data it contains forwarded to the servers 400, cloud 500 or other backhaul. In such a configuration, the PAN P of FIG. 1 (as well as on-device sensors that form part of the wearable electronic device 100 none of which, for clarity, are presently shown) provides sensed or otherwise acquired event data to the wearable electronic device 100 over BLE or one of the other short-range wireless communication protocols discussed herein. In this way, relays and related intermediate devices within at least the wireless portion of the communication network 4000 are not needed. As can be seen, the gateway 300 is capable of communicating as an intermediary between numerous LoRa-equipped wearable electronic devices 100 that are acting as transmitters of event data that is acquired within the PAN P and the backhaul. As such, the second industrial setting communication sub-network that corresponds to the LPWAN portion of the wearable electronic device 100 wireless communication functionality is configured to wirelessly communicate signals between it and the backhaul (for example, one or more of the servers 400, cloud 500 and administration 3100) for at least the portion of the signal path that extends between the wearable electronic device 100 and the gateway 300, while some or all of the signal path between the gateway 300 and such backhaul (shown in FIGS. 13 through 17 as internet I or some related internet protocol) may be through wired connectivity. With particular regard to the industrial setting 3000, such event data may be that taken from smart sensors that are attached to or otherwise associated with the various industrial assets (such as those depicted in FIG. 12) such that the data corresponding to such asset may be acquired by the associated peripheral node and thereafter signally introduced into at least a portion of the communication network 4000. In one form, such event data may include production-related information, instructions, warnings or the like to either the wearer W (through the wearable electronic device 100) or an end user (through one or more of the aforementioned APIs, displays 900, HMI GUIs, dashboards or other means of providing intelligible information, all as shown in FIGS. 3, 7 and 8) related to the asset being monitored. It will be appreciated that the networking capability set forth for the LoRaWAN-specific embodiment (under the LoRa Alliance) of FIG. 13, as well as the more general forms of LPWAN discussed elsewhere, is either compatible with or forms a part of standards used to ensure proper functioning of networks such as such as IEEE 802 in general and 802.11 and 802.15 in particular, along with associated working groups such as 802.15.4 or 802.15.5, as well as those to be developed that may be responsive to the use of the LoRa-based IIoT applications disclosed herein.

As noted elsewhere, the wearable electronic device 100 is itself equipped with numerous sensors $S_1, S_2, S_3 \ldots S_n$ (such as those used to collect LEAP data). Furthermore, the multi-protocol capability of the wearable electronic device 100 promotes long-range communication with the backhaul using the LoRaWAN protocol, as well as within the PAN P using one or more short-range protocols. As is understood, LoRaWAN employs single-hop connectivity between the wearable electronic device 100 and the gateway 300. Nevertheless, the authors of the present disclosure have discovered that in configurations of the communication network 4000 where more than one wearable electronic device 100 is used within the PAN P such that both source and peripheral nodes of wearable electronic devices 100 are operating, the possibility to extend the range or related coverage of the communication network 4000 to include multi-hop connectivity through some form of relay-based intermediate connection is present. Moreover, the authors of the present disclosure have discovered that even though the long-range signal transmitting capability of the LoRaWAN protocol may allow each wearable electronic device 100 to reach more than one gateway 300, there may be comparable benefits to having multiple wearable electronic devices 100 be present within the communication network 4000 by allowing direct (that is to say, P2P) communication between them. Relatedly, the authors of the present disclosure have discovered that other parts of the communication network 4000 (such as the various sensing devices within the PAN P) may have need for either cluster-based multi-hop or self-organizing topology among themselves such as that associated with limited or no central network management. In all of these situations, the authors of the present disclosure believe different network topologies than one based solely on the LoRaWAN protocol of FIG. 13 may be used. These other topologies are discussed next in conjunction with FIGS. 14 through 17.

Figure 14:
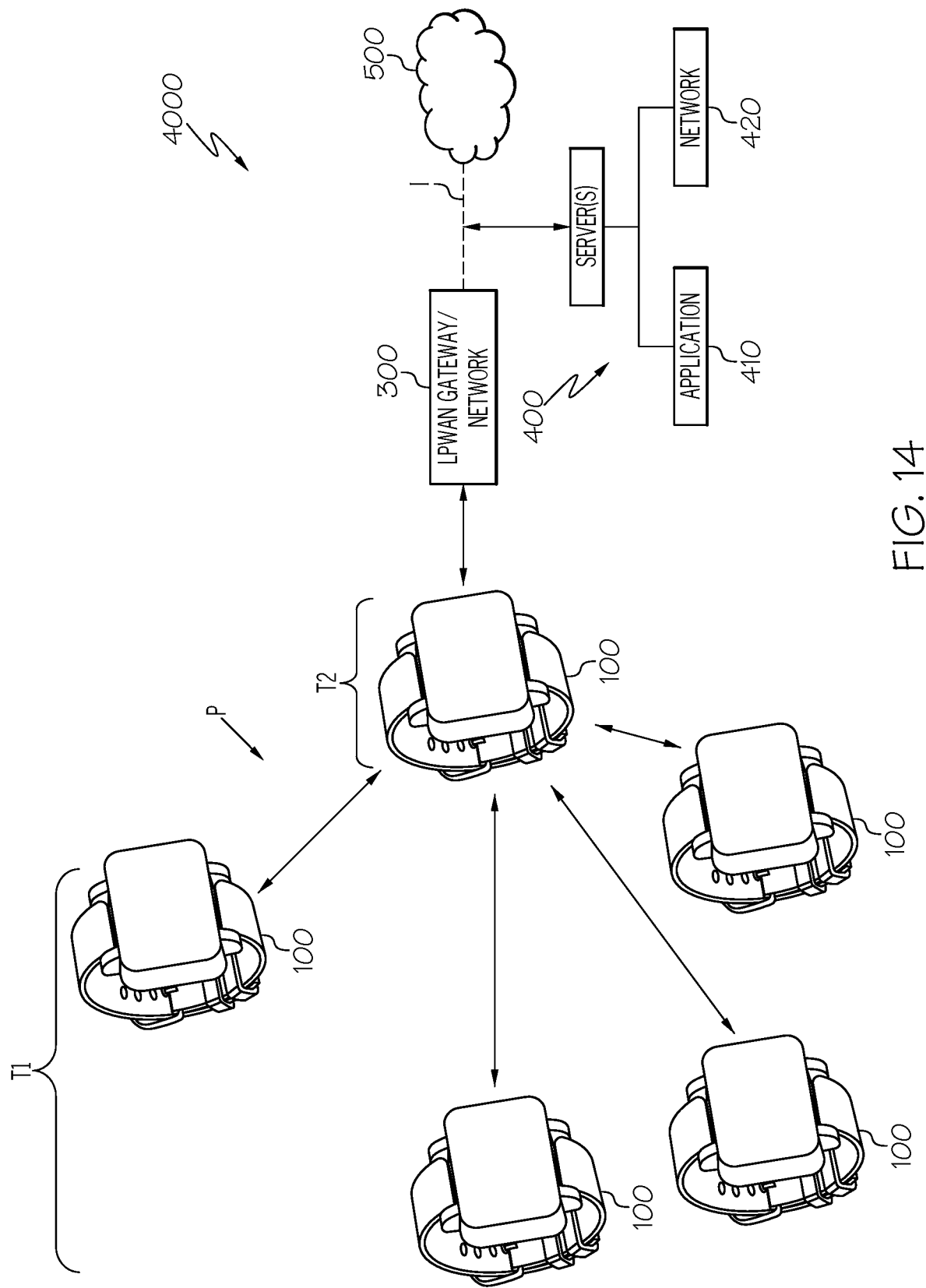

Referring with particularity to FIG. 14, one form of the PAN P that is configured to have the aforementioned mesh topology is shown. In this way, instead of the single-hop star-based topology of LoRaWAN network of FIG. 13, a cluster-based multi-hop topology with the aforementioned intermediate connections is enabled, such as for range extension and data packet relaying or routing. Within the present disclosure, the term "multi-hop" and its variants are understood to allow P2P communication (specifically including packet-based data forwarding) between nodes that may or may not have a direct communication link between them. Significantly, the mesh topology is for not just the non-source nodes 200, $S_1, S_2, S_3 \ldots S_n$, field devices 3040 and their respective short-range wireless communication protocols, but also as various tiers T1, T2 of end nodes of wearable electronic devices 100 or related LPWAN (in general) and LoRaWAN (in particular) end nodes within the PAN P. In this way, the resulting mesh topologies that are formed within the PAN P may form numerous sub-networks within the communication network 4000 in a manner roughly analogous to those formed by the various wireless communication sub-modules of the hybrid wireless communication module 175. Routing protocols or related data-forwarding modes of communication that are superfluous in single-hop modes of communication may be used to effect such multi-hop connectivity through intermediate devices that perform one or more of message forwarding and intercepting functions where in this latter mode such device ensures compatibility between the immediately adjacent links within the network. As will be discussed in more detail as follows, while multi-hop topologies are particularly beneficial when the end nodes (such as those within the PAN P) are mobile such that shared routing information is based on dynamic ad hoc (that is to say, yet to be discovered) topologies that don't possess predefined hierarchical attributes, they may also help for other topologies where some or all such end nodes are static (that is to say, fixed in space, such as when connected to one or more of the assets depicted in FIG. 12). Moreover, in some modes, the non-source nodes 200 and source nodes 100 may include similar radio functionality, such as through the use of similar hybrid wireless communication modules 175

As shown, in addition to the tier T2 end nodes having LPWAN functionality by virtue of including the wearable electronic device 100, one or more of the tier T1 end nodes or sensors may also be comparably equipped. In one form, such a topology may be used where concerns over single-hop path losses or related connectivity issues that may be associated with traditional short-range transmission protocols may be present. As shown, the tier T1 nodes are those that are operating to collect data that in turn can initiate a relay-based communication to the tier T2 node or nodes (only one of which is shown) over a tree-like topology using the PAN P or LPWAN, depending on the protocol being used. As such, and in consideration of the particular needs of the equipment within the industrial setting 3000, as well as the routing needs of the communication network 4000, the form factors of the wearable electronic device 100 (as either or both of tier T1 or tier T2 end nodes) may be made for mobile or static use, as well as having battery or mains power, as will be discussed in more detail as follows. Moreover, as noted elsewhere, in one form, the tier T2 end nodes may be configured to operate as one or more gateways 300. It will be understood that all variants of form factor, mobility, gateway 300 designation and supplied power for the various tiers T1 and T2 end nodes are within the scope of the present disclosure. In one form, these various tiers may be arranged as clusters of sub-networks such that each can be grouped, such as within a particular, dedicated PAN P in a manner analogous to FIG. 1. As can be seen, other devices besides those equipped with the wearable electronic device 100 LPWAN functionality may be used for some of the tier T1 end nodes, including any of sensors $S_1$, $S_2$, $S_3$ ... $S_n$ and related peripheral nodes 200, while the tier T2 end nodes are limited to only the wearable electronic devices 100 (whether in a mobile or stationary form factor) to ensure some form of LPWAN connectivity to the gateway 300. In a configuration where some of the tier T1 end nodes merely have short-range connectivity (such as through BLE or related protocols as depicted in FIG. 12, as well as relay-based or routing-based protocols that may either cooperate with or act independently of the various short-range wireless communication protocols disclosed herein), they interact with the tier T2 end node in a manner similar to those of the devices on the PAN P of FIG. 1. Although not shown, in configurations where a tier T1 end node is equipped with wearable electronic device 100 connectivity and further has full LoRaWAN protocol functionality (such as through the previously-discussed third wireless communication sub-module 175C), it will be understood that it may also communicate directly with gateway 300. In fact, in FIG. 14 as shown, the tier T2 end node may act as a simplified gateway for each of the various sub-networks within the PAN P in that it provides MAC layer network-forming and packet-relaying functions (along with optional node signal consolidating) without having to provide the backhaul connectivity or other communication protocol functionality in the manner of the gateways 300. In this way, the tier T2 end node may rely upon non-mains sources of electric power, while providing a two-level gateway configuration that will be discussed in more detail in FIG. 16.

In such an architecture, the LoRaWAN PHY layer is preserved, now with some measure of multi-hop capability (such as through the additional of a relay-based frame) within the MAC layer as each of the tier T1 end nodes may communicate directly with the tier T2 end nodes, although not always directly with one another or directly to the gateway 300, depending on the degree of routing protocol implementation in the T1 nodes. This way, the long-range signal capability of the LPWAN portion of the network-coupled with the mesh-like connectivity between the tier T1 and T2 end nodes-allows gateway 300 connectivity while keeping the latter's number low. Significantly, in one form, topology changes to the network are handled locally as each tier T1 end node can act as a router to a tier T2 end node, particularly for situations where the tier T1 end nodes receive mains-based power an example of which may be where they are statically mounted to a corresponding field device 3040 or other industrial asset such that dynamic route updating or energy-sensitive modes of operation are not significant design considerations. Contrarily, if some or all of the tier T1, T2 end nodes are operating as energy-constrained embodiments, they may act solely as data originating nodes while the non-energy constrained embodiments may assume more complex forms of intermediate node functionality. In such a hybrid architecture, where for example it may be desirable to extend battery life or offload complex tasks to other parts of the communication network 4000, the ones of the tier T1 end nodes that are not energy constrained may—if needed—use dynamic routing algorithms or other more computationally-intensive modes of operation, while either node may perform less burdensome tasks, such as passive signal listening for data packets or beacon information. Also, in such situations, using the aforementioned wake up approach may help to extend battery life of both the tier T1 and tier T2 nodes.

In one form, the MAC layer of the protocol is configured to ensure that signals are sent from tier T1 end nodes to tier T2 end nodes based on reactive flooding (for example, the previously-discussed AODV) in conjunction with time synchronization and time stamping for temporal-based event data (as well as for implementing wake up procedures for energy-constrained end nodes), including that where a single tier T2 end node may be communicating with numerous tier T1 end nodes simultaneously. By such a topology, the scalability, packet delivery and possible range limitations of a network that has only single-hop end nodes is overcome, particularly for those nodes that are using short-range communication protocols. Significantly, this network is self-creating or self-organizing, meaning that it can dynamically adjust based on certain changes, such as movement of one or the other tier T1 or T2 end nodes, partial route failure or related unavailability of certain nodes. Moreover, the use of reactive protocol features entails relatively small amounts of packet overhead, which in turn allows more of the tier T1 and T2 end nodes to be battery powered, particularly where frequent route discovery and updating is not required and where longer data latency may be tolerated. In another form, the MAC layer of the protocol is configured to ensure that signals are sent from tier T1 end nodes to tier T2 end nodes based on proactive vector routing (for example, DSDV) in conjunction with node-accessible destination routing tables or the like. In this latter configuration, the network may be populated with numerous tier T2 nodes (in the form of wearable electronic devices 100) rather than the single tier T2 end node shown in the figure. Likewise, certain form factors of the tier T2 end node may be mains powered to better able to handle the increased computational needs associated with dynamic network routing with is attendant sequence, hop count, time stamping or other forms of parameters needed for packet forwarding. Moreover, synchronization between the various nodes may be self-established, thereby avoiding the need for gateway 300 to do so. In another form, the data may be conveyed to the gateway 300 in a sequential rather than simultaneous manner; such an approach may help to relieve more stringent time synchronization requirements. In yet another form, the protocol may be a hybrid one such that it possesses both reactive and proactive features, such as one based on HWMP that employs both reactive flooding (such as through AODV) and proactive tree-based hierarchical routing (such as DSDV).

At least for P2P connection between numerous wearable electronic devices 100, regardless of whether the routing protocol adopts reactive, proactive or hybrid attributes, the adaptive functionality of the LPWAN (such as through its adjustability in bandwidth, coding rate, spreading factor or transmission power) allows tradeoffs between signal transmission power, data rate, time-on-air or the like. This in turn allows for the creation of the various mesh-based sub-networks depicted herein.

Figure 15:
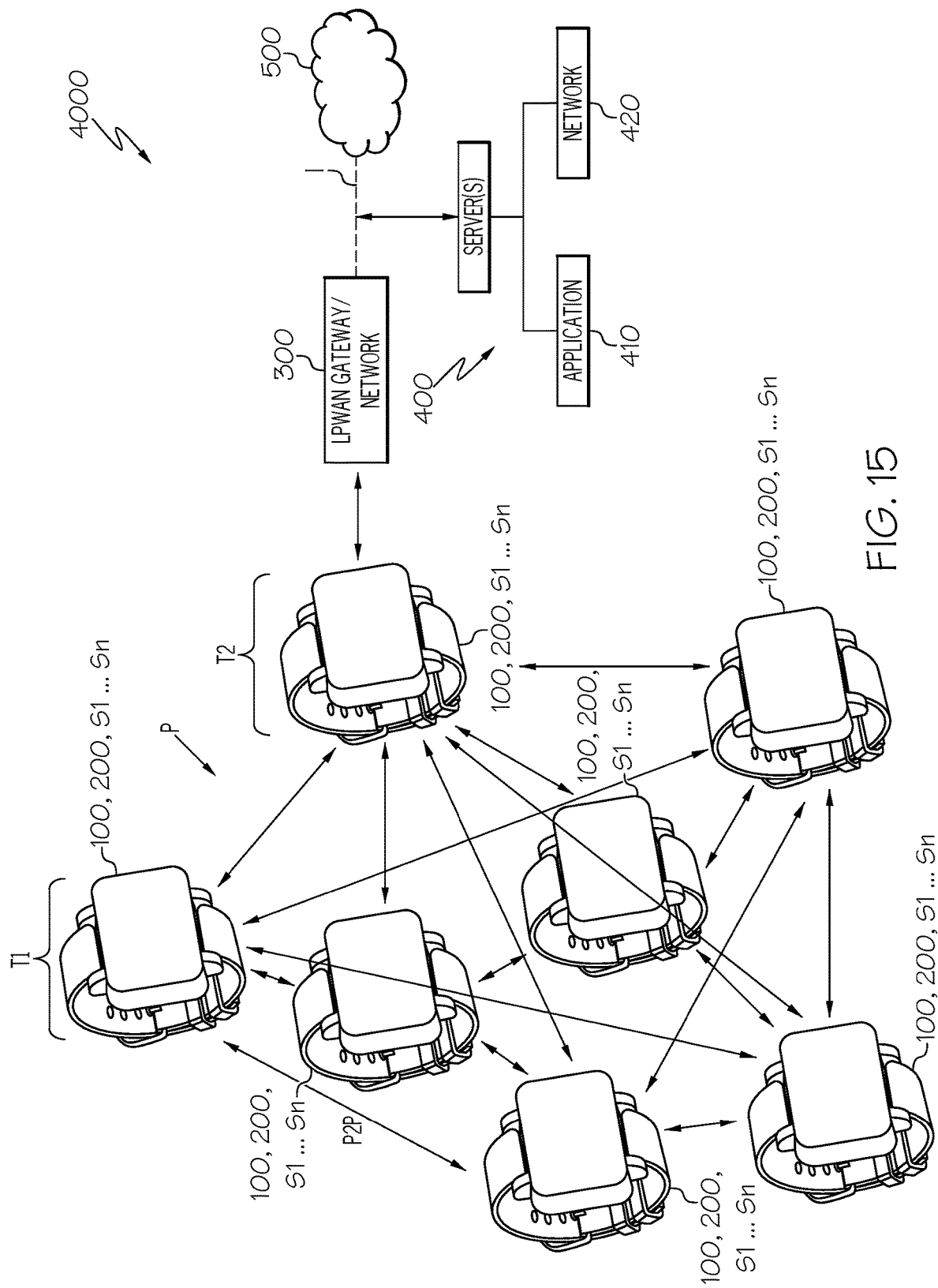

Referring with particularity to FIG. 15, the topology of FIG. 14 may be replaced with an approach where direct connectivity between tier T1 end nodes may be used within a single PAN P or other sub-network. As noted in conjunction with FIG. 14, the scalability and associated limitations of a single-hop network topology is overcome through the use of multi-hop connectivity between different tiers T1, T2 of end nodes; such scalability is further enhanced by the use of multi-hop connectivity between the same tier T1 of end nodes, even if they lack the longer-range communication of the LPWAN that is present within the tier T2 end nodes. In one form, this variant of the communication network 4000 is useful when all of a particular group or cluster of tier T1 end nodes are to be accessed by a single PAN P simultaneously. Although PAN P is presently shown as having both multi-hop links and intermediate (packet-relaying or routing) nodes (and hence, full mesh functionality), it will be appreciated that simpler versions with single-hop connection are also possible, and that both variants are within the scope of the present disclosure. Relatedly, although only a single PAN P is shown, it will be appreciated that numerous PANs P may be included, each acting as its own sub-network with a cluster of end nodes 100, 200, $S_1$, $S_2$, $S_3$ . . . $S_n$, 3040 where in addition to scalability, the choice of single-hop versus multi-hop may depend on numerous factors such as cost, complexity, mobile versus fixed end nodes, mains versus battery power or the like. As previously discussed, routing that is associated with dynamic embodiments of the PAN P can deliver high packet delivery rates; to do so may involve the use of suitable time synchronization and energy consumption considerations, as well as being prepared to have the end nodes 100, 200, $S_1$, $S_2$, $S_3$ . . . $S_n$, 3040 being in a continuous receive mode, this last especially for low-latency modes of network operation. As with the choice of one versus numerous PANs P, the comprehensiveness of data forwarding (for example, routing versus relaying) must be balanced against other communication network 4000 objectives that have been previously discussed, including cost, stationary versus mobile end nodes, battery versus mains power or the like.

Scalability concerns of FIG. 15 may be overcome by arranging the various components within the communication network 4000 to have multi-hop connectivity as a way to promote more thorough packet forwarding. In one form, the tier T1 end nodes are configured to not only transmit their own data, but also forward data they have received from other tier T1 end nodes. In such case, the tier T2 end nodes may be used as part of a tree-like structure such that dynamic topology attributes may be accommodated.

Referring with particularity to FIG. 16, another form of intermediate connectivity is shown that differs from the embodiments of FIGS. 14 and 15 in that it allows the gateways 300 to themselves be networked in a way that gives them mesh-like, attributes, while still possibly preserving some of the LoRaWAN attributes of FIG. 13. Route discovery may be made through beacons, while in one form flooding or other reactive-based route selection may be employed. Significantly, this direct gateway-to-gateway communication, coupled with the long-range signal capability of the LPWAN portion of the network and the mesh-like connectivity between the tier T1 and T2 end nodes allows for greater overall flexibility and scalability of the communication network 4000 while still keeping a low gateway 300 count. In such an architecture, some of the gateways 300 may be equipped with relatively reduced relay-like functionality, while other gateways 300 have more comprehensive router-like functionality, while yet a singular main gateway 300 acts as the final intermediary between the wireless, LoRa-based portion of the communication network 4000 and the backhaul. As noted elsewhere, the hardware of some of these intermediate gateways 300 or related devices may be in the form of the wearable electronic device 100. Accordingly, various sub-networks of the communication network 4000 may be formed, depending on the extent of gateway 300 layering or meshing. Although not shown, the tiered connectivity of the end nodes end nodes T1, T2 may be replaced in FIG. 16 as a single tier, such as when all such end nodes are configured to communicate directly with the various gateways 300 through the LPWAN capability of the wearable electronic device 100. In such a configuration, it can form a clustered star-of stars in a manner roughly similar to that of the LoRaWAN protocol of FIG. 13 such that each of the wearable electronic device 100 end nodes may communicate with one or more of the gateways 300. Significantly, using tiered or intermediate gateways 300 rather than tiered end nodes T1, T2 may help to alleviate the need for extremely precise time synchronization.

As previously mentioned, degrees of scalability of the communication network 4000 may impact decisions of overall system architecture where, for example, a relatively fixed network with little or no need to scale up may be able to readily implement a single-hop level of functionality whereas those that have the actual or potential need for significant scaling may find it advantageous to instead adopt a multi-hop level of functionality, including those with inter-node or inter-gateway topologies as a way to communicate between industrial assets or other nodes even when direct connection between them is not present, including situations where one or more of such nodes are mobile. Such network architecture choices are based on the needs of the communication network 4000 within a particular industrial setting 3000, and all are deemed to be within the scope of the present disclosure.

Referring with particularity to FIG. 17, a variation of the topology of FIG. 16 is shown with hybrid attributes where the end nodes 100, 200, $S_1$, $S_2$, $S_3$ ... $S_n$, 3040 may act in a strictly relay capacity directly with the gateway 300, assuming the latter is compatible with the end node short-range protocol and within range. In situations where the size of the communication network 4000 is very large, with numerous gateways 300 and an even larger number of end nodes 100, 200, $S_1$, $S_2$, $S_3$ ... $S_n$, 3040, time synchronization throughout this embodiment of the communication network 4000 may be managed through the backhaul in general, and the network server 420 in particular where (for example) the previously-discussed beacon-based flooding is used as part of the synchronization, particularly for data event-initiated wake ups and uplinks from the end nodes 100, 200, $S_1$, $S_2$, $S_3$ ... $S_n$, 3040.

In one form, a protocol similar to that of FIG. 16 may be used for multi-hop networking between the interconnected gateways 300 of FIG. 17. In one form, such gateways 300 may include full-functioning embodiments in conjunction with reduced functionality embodiments so that route discovery and other forms of full routing functionality may be preserved. Thus (although not shown), such an embodiment may be modified to have a two-tier gateway 300 arrangement in a manner similar to that of FIG. 16, including P2P communication between them. Significantly, the P2P connection between the gateways 300 is only needed in the event that one of the gateways 300 loses connectivity to the backhaul such that suitable signaling indicating that at least a portion of a data packet to be forwarded is currently unavailable in a multi-hop communication. Likewise, the LPWAN functionality of the wearable electronic device 100 that makes up a portion of the network may be used to promote communication between the intermediate gateways 300. In the configuration of FIG. 17, cooperation between the end nodes 100, 200, $S_1$, $S_2$, $S_3$ ... $S_n$, 3040 (while possible, such as in the manner depicted in FIG. 15) is not required.

Although not shown, the various end nodes 100, 200, $S_1$, $S_2$, $S_3$ ... $S_n$, 3040 may communicate directly to the wearable electronic device 100 rather than directly with an intermediate gateway 300. Unlike the embodiment depicted in the figure, the short-range protocol is necessarily ensured though the multi-protocol mode of operation that is inherent in the PAN P through the wearable electronic device 100. Joining of a sub-network of the mesh topology architecture of the communication network 4000 of FIG. 17 (as well as that of the other architectures depicted in FIGS. 14 through 16) may take place directly between the remote end nodes (such as nodes 100, 200, $S_1$, $S_2$, $S_3$ ... $S_n$, 3040 and tier T1) and the intermediate, relaying or related nodes having LPWAN functionality (such as, the wearable electronic device 100, tier T2 end nodes) is available, or indirectly where such remote end nodes must first communicate with one another such that the remote end node attempting to join a particular sub-network is doing so through another remote end node that is already joined to the sub-network. Furthermore, it will be appreciated that although the application server 410 is shown as a singular unit, embodiments where each of the end nodes 100, 200, $S_1$, $S_2$, $S_3$ ... $S_n$, 3040 may have its own dedicated version of the application server 410, and that either embodiment is within the scope of the present disclosure.

As noted earlier, mesh-based networks with mobile or otherwise dynamic nodes spend more time updating the routes than delivering data. Nevertheless, the self-healing adaptability of the connected devices, nodes or related components within the communication network 4000 when one or more nodes (whether such node is the wearable electronic device 100, sensors $S_1$, $S_2$, $S_3$ ... $S_n$ or other devices 200 within the PAN P) is functioning as an end node or an intermediate node (such as a gateway 300 or even the wearable electronic device 100) becomes damaged, lost, or otherwise rendered inoperable helps to maintain the integrity of the network, so long as it is operating with a suitably-equipped routing protocol. In this way, the remaining nodes within the communication network 4000 can still communicate with each other, directly or through one or more intermediate nodes through implementation within each connected device.

With regard to any of the topologies depicted in FIGS. 14 through 17, it will be appreciated that the choice of relaying versus routing as a way to achieve multi-hop wireless connectivity within one or more communication networks 4000 is dependent upon various factors that in turn may depend on the precise layout or architecture of the connected components within the industrial setting 3000. For example, in situations where component spacing is great (which in turn may lead to low signal-to-noise ratio propagation), relaying may be a preferred arrangement, whereas high density connectivity between components may preferentially employ a routing protocol. Likewise, in situations where duty cycle concerns are a factor, using a relay-based approach may not be suitable for end nodes that need to be frequently awoken. Moreover, it is understood that at least one of the sub-networks depicted in these figures defines a multi-hop route.

In the form shown, the sensors $S_1$, $S_2$, $S_3$ ... $S_n$ or other peripheral devices may be configured to detect one or more gases such as those commonly found in various production, assembly and processing facilities, carbon monoxide (CO), hydrogen sulfide ($H_2S$), oxygen ($O_2$) deficiency and combustible (LEL) gases. Likewise, for applications in the chemical process industries (CPI) or the oil & gas industries, such devices may be configured as other types of portable gas monitors as understood by those skilled in the art. Furthermore, in manufacturing industries, such sensors or devices may be configured to detect rotary or reciprocating motion of motors, pumps, fans, compressors or the like. Moreover, such sensors or devices may be configured to detect a physical presence such as flame, metals, leaks, levels or chemicals, among others while—as previously noted—some are configured to sense physical properties such as temperature, pressure or radiation, while still others can detect motion or proximity. It will be further understood that these and other sensors or devices may operate in a variety of manners and upon various measurable quantities selected from various fields such as electromagnetic fields, optics or others, and that sensors or devices so configured are within the scope of the present disclosure.

With particular regard to oil & gas production facilities (including offshore oil platforms and hydraulic fracturing facilities), such sensors or related devices may be affixed to or otherwise made cooperative with various pieces of production-related equipment, such as fluid handling devices that may include one or more of valves, pumps, storage tanks, heat exchangers, pressure exchangers, reactors (that is to say, any device where a chemical, nuclear or change of state of the substances contained therein take place), fractionators, thermal crackers, furnaces, decokers, gas processors, gas treaters, degassers, gas separation units, catalytic reformers, distillation columns, isomerization devices, blending pools, alkylation devices, separators, condensers, wellhead manifolds, desalination units, pipeline cleaners, flare gas recovery units, osmosis-based devices and combinations thereof.

In addition to the aforementioned use of different form factors for the wearable electronic device 100 and its hybrid wireless communication module 175 as a way to use the communication network 4000 to achieve multiple modes (that is to say, both short-range and long-range) of inter-device connectivity within the industrial setting 3000, the authors of the present disclosure have discovered that entirely different modes of communication may be used, including those involving a hybrid of terrestrial and satellite-based equipment. In particular, one form of the LoRa chipset (such as the LoRa Edge™ LR1120 that is manufactured by Semtech Corporation of Camarillo, California) that makes up the third wireless communication sub-module 175C may be used in communication network 4000 configurations where global geolocation connectivity is needed. Significantly, IoT-based end nodes such as those discussed herein may include such functionality natively, as well as through firmware or hardware upgrades.

As previously mentioned, the LPWAN network (which is part of the communication network 4000) is structured with distributed ledger technology such as Blockchain to verify the transmission of various data between the wearable electronic device 100 to the gateway 300. In one form, the operation of the wearable electronic device 100—either in conjunction with or independent of the PAN P—within the industrial setting 3000 (or other tactical, commercial, research or related setting) is such that it is part of a distributed control and information system or network, be it web-based, cloud-based, facility-based (including through a facility WAN or the like), LAN-based or the like. In this way, the dissemination, processing and analysis of data collected by one or more of the wearable electronic device 100, peripheral nodes 200, sensors $S_1, S_2, S_3 \ldots S_n$ or the like may not have to be controlled by larger entities whose primary or exclusive mission is the aggregation of such data. In one form, such collection and dissemination may be through one or more cryptographic-based distributed digital data transaction ledgers that are spread across numerous servers or other computer-based equipment that themselves are contained within one site or multiple sites all using mutually-compatible communication protocols. In this way, such a decentralized approach may lead to enhancements in operational autonomy, data privacy and security, as well as provide strategic or commercial advantages particular to the enterprise that is operating the machinery, equipment and related assets that are within the purview of the industrial setting 3000, while still providing transactional transparency and accountability. In one particular form, the wearable electronic device 100, possibly in conjunction with ancillary equipment disclosed herein, may be configured as one of the aforementioned platform-based approaches for the control or customization of a particular industrial, tactical, commercial or related process. As such, it may act as a seamless intermediary between a distributed network and a particular computer application or other operational software.

Even though the present disclosure emphasizes LoRa-based LPWAN-based long-range wireless connectivity through the wearable electronic device 100 as part of its multi-protocol solution to providing end-to-end connectivity over the communication network 4000 for use in the industrial setting 3000, they also have discovered that the wearable electronic device 100 may employ other protocols as part of such connectivity. Two such examples are cellular-based approaches entitled narrowband internet of things (NB-IoT) and long-term evolution machine type communication (LTE-M) that are described in US Published Application 2021/0319894 entitled WEARABLE ELECTRONIC DEVICE AND SYSTEM USING CELLULAR TELECOMMUNICATION PROTOCOLS that was filed on Apr. 6, 2021, corresponds to pending U.S. patent application Ser. No. 17/223,231 is owned by the Assignee of the present disclosure and the entirety of which is incorporated herein by reference. In a related manner, some of the aforementioned protocols (including 5G) may be used to achieve connectivity with a different part of the spectrum (for example, 1.9 GHz rather than LoRa's sub-GHz or cellular's 2.4 GHz) for the mesh-based configurations shown in FIGS. 14 through 17.

By the foregoing, in one form, the communication network 4000 is used in a method to acquire data from an industrial asset. The wearable electronic device 100 forms a source node, while one of the sensors $S_1, S_2, S_3 \ldots S_n$ or the IoT edge data gathering and manipulating devices (in the form of field devices) 3040 or even a different wearable electronic device 100 forms the peripheral node 200 to be in wireless signal communication with one another. In this way, the source node 100 and its hybrid wireless communication module 175 communicates to create numerous sub-networks within the communication network 4000, where the sub-networks include a first sub-network that bidirectionally communicates between the source node and the peripheral node over a short-range wireless communication protocol, and a second sub-network that bidirectionally communicates between the source node at least one remote device over an LPWAN protocol. In this way, and upon associating the peripheral node with the industrial asset, data (such as identifier information data and event data) that corresponds to the industrial asset is signally acquired by the peripheral node and then received from the peripheral node buy the source node.

In another form, a machine learning-based system includes a source node, a controller and an HMI. The wearable electronic device 100 forms the source node that is in signal communication with a peripheral node (such as one of the sensors $S_1, S_2, S_3 \ldots S_n$, the field devices 3040 or even a different wearable electronic device 100 than the one that is functioning as the source node) that in turn is associated with an industrial asset (such as the various devices or pieces of equipment depicted in FIG. 12) such that acquired data that corresponds to at least one of an operational parameter and device identification of the industrial asset is communicated between the peripheral node and the source node. The controller includes one or more processors along with a non-transitory computer readable medium that has machine-readable instructions stored thereon. The instructions cause the one or more processors to train a machine learning model using at least one machine learning algorithm such that the acquired data is subjected to at least one of data preprocessing, feature extraction and training to produce at least one operational parameter pattern for the industrial asset. The HMI (which may be formed on a touchscreen or related display of the wearable electronic device 100, or on the aforementioned dashboard 700 or display device 900) receives instructions from the controller in order to present at least one result generated by the trained machine learning model to one or more of a user (for human-intelligible information) or to one or more of the devices within the communication network 4000, the backhaul or the like (for machine-intelligible information).

In yet another form, the communication network 4000 that is used for an industrial asset includes a source node (such as the wearable electronic device 100) to have a wireless communication module (such as the wireless communication module 175) that is configured to bidirectionally communicate signals over numerous wireless communication protocols, as well as numerous peripheral nodes (such as one of the sensors $S_1, S_2, S_3 \ldots S_n$, the field devices 3040 or even a different wearable electronic device 100 than the one that is functioning as the source node) that are in signal communication with the source node. One or more of the peripheral nodes are configured to (i) generate device identifier information data that uniquely identifies a particular one of the peripheral nodes and (ii) sense at least one form of event data from the industrial asset. In addition, the peripheral nodes and source node cooperative with one another such that the wireless communication protocols of the source node define a first sub-network and a second sub-network wherein the first sub-network is configured to communicate signals between the source node and one or more of the peripheral nodes using a wireless communication protocol, while the second sub-network is configured to communicate signals between the source node and a backhaul using an LPWAN-based wireless communication protocol.

Within the present disclosure, the term "wearer" is meant to include a person, whether infected with a contagious disease or other known medical condition or not. In addition, the term may be applied to a person who is in need of health or location monitoring through the wearable electronic device 100, regardless of whether such person is or is not infected or at risk of becoming infected. Such other people may include those that are under the present care of a family member, doctor, nurse or other professional caregiver. In yet another form, the wearer may be a dog, cat, other pet, livestock or the like that may benefit from the geofencing capability discussed herein. Accordingly, the various terms used herein to identify the wearer of the wearable electronic device 100 as a "wearer", "person", "user", "individual" or "patient" are deemed to be equivalents within the present disclosure, and that any greater degree of specificity of such terms will be apparent from the context. Likewise, as discussed herein, in some embodiments or configurations, the wearable electronic device 100 may take on various form factors that are unrelated to those affixed or otherwise related to an animate object. Within the particular context of the industrial setting 3000, such embodiments or configurations may include those that are affixed or otherwise situated on or near a particular piece of machinery or equipment or other connected device, as well as those that may be stationary or mobile and that are in signal communication through its LoRa-based LPWAN functionality with such machinery, equipment, device or other asset. In a related manner, although much of the establishment of the communication network 4000 is described in conjunction within the context of the industrial setting 3000, it will be appreciated that such network and its components and functionality need not be so limited and as such may be used in other IoT-related scenarios outside the realm of such industrial setting 3000; such other scenarios are deemed to be within the scope of the present disclosure.

Within the present disclosure, it will be understood that the operations, functions, logical blocks, modules, circuits, and algorithm or model steps or events described may be implemented in hardware, software, firmware or any combination thereof. Moreover, if implemented in software, such operations may be stored on or transmitted over as one or more instructions or code on a computer-readable medium. The steps or events of a method, algorithm or ensuing model disclosed herein may be embodied in a processor-executable software module, which may reside on a tangible, non-transitory version of such computer-readable storage medium such that the medium be in any available form that permits access to the events or steps by a processor or related part of a computer. By way of example, and not limitation, such non-transitory computer-readable medium may comprise RAM, ROM, EEPROM, CD-ROM or other optical disk storage, magnetic disk storage or other magnetic storage devices, flash memory or any other form that may be used to store desired program code in the form of instructions or data structures and that may be accessed by a processor or related part of a computer. Combinations of the above should also be included within the scope of non-transitory computer-readable media. Additionally, the operations of a method, algorithm or model may reside as one or any combination or set of codes or instructions on a tangible, non-transitory machine readable medium or computer-readable medium, which may be incorporated into a computer program product.

Within the present disclosure, terms such as "preferably", "generally" and "typically" are not utilized to limit the scope of the claims or to imply that certain features are critical, essential, or even important to the disclosed structures or functions. Rather, these terms are merely intended to highlight alternative or additional features that may or may not be utilized in a particular embodiment of the disclosed subject matter. Likewise, it is noted that the terms "substantially" and "approximately" and their variants are utilized to represent the inherent degree of uncertainty that may be attributed to any quantitative comparison, value, measurement or other representation. As such, use of these terms represents the degree by which a quantitative representation may vary from a stated reference without resulting in a change in the basic function of the subject matter at issue.

Within the present disclosure, the use of the prepositional phrase "at least one of" is deemed to be an open-ended expression that has both conjunctive and disjunctive attributes. For example, a claim that states "at least one of A, B and C" (where A, B and C are definite or indefinite articles that are the referents of the prepositional phrase) means A alone, B alone, C alone, A and B together, A and C together, B and C together, or A, B and C together. By way of example within the present disclosure, if a claim recites that data is being acquired from at least one of a first sensor, a second sensor and a third sensor, and if such data is being acquired from the first sensor alone, the second sensor alone, the third sensor alone or any combination of the first, second and third sensors, then such data acquisition satisfies the claim.

Within the present disclosure, certain terms are used to establish a degree of connectivity or related structural, physical, electrical, signal or other cooperation between various components, as well as between such components and users or wearers of the wearable electronic device. Such terms, such as "associated with" or the like, are understood to form an exclusive or non-exclusive relationship between the components or wearers to which they refer, and will be understood as one or the other, depending on the context.

Having described the subject matter of the present disclosure in detail and by reference to specific embodiments, it is noted that the various details disclosed in the present disclosure should not be taken to imply that these details relate to elements that are essential components of the various described embodiments, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure may be identified as preferred or particularly advantageous, it is contemplated that the present disclosure is not necessarily limited to these aspects.

It will be apparent to those skilled in the art that various modifications and variations can be made to the described embodiments without departing from the spirit and scope of the claimed subject matter. Thus it is intended that the specification cover the modifications and variations of the various described embodiments provided such modification and variations come within the scope of the appended claims and their equivalents.

What is claimed is:

1. A method of using a communication network to acquire data from an industrial asset, the communication network comprising a source node and a peripheral node in wireless signal communication with one another, the method comprising:
    configuring the source node to have a hybrid wireless communication module such that it communicates to create a plurality of sub-networks within the communication network, the sub-networks comprising:
        a first sub-network configured to bidirectionally communicate with the peripheral node over a short-range wireless communication protocol; and
        a second sub-network configured to bidirectionally communicate with at least one remote device over a low power wide area network wireless communication protocol;
    associating the peripheral node with the industrial asset such that data comprising at least one of device identifier information data and event data that corresponds to the industrial asset is signally acquired by the peripheral node; and
    receiving the data by the source node from the peripheral node.

2. The method of claim 1, wherein the communication network further comprises at least one gateway that is configured as the at least one remote device.

3. The method of claim 2, wherein at least one of the first and second sub-networks is configured to have a mesh architecture such that at least one of (i) a plurality of peripheral nodes communicate with directly the source node within the first sub-network, (ii) a plurality of peripheral nodes communicate directly with each other within the first sub-network, (iii) the source node communicates directly with at least one intermediate gateway that is placed signally between the source node and the gateway within the second sub-network, and (iv) a plurality of peripheral nodes communicate directly with at least one intermediate gateway that is placed signally between the source node and the gateway within the second sub-network.

4. The method of claim 3, wherein the mesh architecture comprises a routing protocol that performs at least one of route discovery, route selection, route maintenance, data forwarding and route representation.

5. The method of claim 3, wherein the mesh architecture comprises a relaying protocol where at least one of the plurality of peripheral nodes, the source node and the at least one intermediate gateway perform data forwarding without having to perform dynamic route updating.

6. The method of claim 3, wherein at least one of the sub-networks defines a multi-hop route.

7. The method of claim 1, wherein the bidirectional communication between the source node and the peripheral node forms a personal area network within the first sub-network.

8. The method of claim 1, wherein the source node comprises a wearable electronic device.

9. The method of claim 1, wherein the peripheral node comprises a wearable electronic device.

10. The method of claim 1, further comprising that upon performing analytics on the received data, using the source node to control at least one operational parameter of the industrial asset.

11. The method of claim 10, wherein the source node is used to perform the analytics on the received data.

12. The method of claim 11, wherein the source node comprises a machine learning-based analysis engine such that a trainable machine learning model operated thereupon performs at least one of:
    pre-processing the received data that has been acquired by the industrial asset;
    extracting at least one feature from the pre-processed data, wherein the at least one feature corresponds to an operational parameter associated with the industrial asset;
    training at least one machine learning algorithm using a portion of the extracted at least one feature;
    upon becoming a trained machine learning model, performing an inference in order to generate a pattern corresponding to the operational parameter associated with the industrial asset; and
    presenting the generated pattern as a human-intelligible output to at least one individual associated with an industrial setting into which the industrial asset is situated.

13. The method of claim 10, further comprising that upon performing analytics on the received data, using the source node to control at least one operational parameter of the industrial asset.

14. The method of claim 10, further comprising that upon performing analytics on the received data, using the source node to provide predictive maintenance to the industrial asset by:
    performing an analysis on the received data that corresponds to at least one operational parameter;
    determining, based on the analysis, whether the at least one operational parameter associated with the industrial asset requires adjustment; and
    if the at least one operational parameter associated with the industrial asset requires adjustment, using the source node to provide a network control signal to the industrial asset in order to adjust the at least one operational parameter.

15. The method of claim 1, wherein the industrial asset comprises at least one of a valve, a pump, a motor, an actuator, a storage tank, a heat exchanger, a reactor and combinations thereof.

16. The method of claim 1, wherein at least one of the first and second sub-networks is configured to have a mesh architecture such that at least one of (i) a plurality of peripheral nodes communicate with directly the source node within the first sub-network, (ii) a plurality of peripheral nodes communicate directly with each other within the first sub-network, (iii) the source node communicates directly with at least one intermediate device that is placed signally between the source node and the at least one remote device within the second sub-network, and (iv) a plurality of peripheral nodes communicate directly with at least one intermediate device that is placed signally between the source node and the at least one remote device within the second sub-network.

17. A machine learning-based system comprising:
 a source node that is in signal communication with a peripheral node that is associated with an industrial asset such that at least one sensor that is configured to acquire data corresponding to at least one of an operational parameter and device identification of the industrial asset is communicated between the peripheral node and the source node;
 a controller with at least one processor and a non-transitory computer readable medium storing machine-readable instructions that cause the at least one processor to train a machine learning model using at least one machine learning algorithm such that the acquired data is subjected to at least one of data preprocessing, feature extraction and training to produce at least one operational parameter pattern for the industrial asset; and
 a human-machine interface cooperative with the controller to present at least one result generated by the trained machine learning model to a user.

18. The machine learning-based system of claim 17, wherein the controller comprises a portion of the source node such that the source node defines an edge computing platform.

19. A communication network for an industrial asset, the communication network comprising:
 a source node comprising a wireless communication module configured to bidirectionally communicate signals over a plurality of wireless communication protocols; and
 a plurality of peripheral nodes that are in signal communication with the source node and at least one of which is configured to (i) generate device identifier information data that uniquely identifies a particular one of the plurality of peripheral nodes and (ii) sense at least one form of event data from the industrial asset, the plurality of peripheral nodes and source node cooperative with one another such that the plurality of wireless communication protocols of the source node define a first sub-network and a second sub-network wherein:
  the first sub-network is configured to communicate signals between the source node and at least one of the peripheral nodes that make up the plurality of peripheral nodes using a wireless communication protocol; and
  the second sub-network is configured to communicate signals between the source node and a backhaul using a low power wide area network wireless communication protocol.

20. The communication network of claim 19, wherein the first sub-network defines a mesh architecture.

21. The communication network of claim 20, wherein at least one of the first and second sub-networks is configured such that at least one of (i) the plurality of peripheral nodes communicate with directly the source node within the first sub-network, (ii) the plurality of peripheral nodes communicate directly with each other within the first sub-network, (iii) the source node communicates directly with at least one intermediate device that is placed signally between the source node and at least one remote device within the second sub-network, and (iv) the plurality of peripheral nodes communicate directly with at least one intermediate device that is placed signally between the source node and at least one remote device within the second sub-network.

* * * * *